United States Patent
Stoin et al.

(10) Patent No.: US 12,492,832 B2
(45) Date of Patent: Dec. 9, 2025

(54) METHOD AND APPARATUS FOR PURIFYING AIR FROM BIOLOGICAL AGENTS AND VOLATILE ORGANIC COMPOUNDS

(71) Applicant: AIROVATION TECHNOLOGIES LTD., Ness Ziona (IL)

(72) Inventors: Uri Stoin, Jerusalem (IL); Yoel Sasson, Tel Aviv (IL); Marat Maayan, Ramat-Gan (IL); Evgeny Gamerman, Petah-Tikva (IL); Avraham Zakay, Tel Aviv (IL)

(73) Assignee: AIROVATION TECHNOLOGIES LTD., Ness Ziona (IL)

( * ) Notice: Subject to any disclaimer, the term of this patent is extended or adjusted under 35 U.S.C. 154(b) by 453 days.

(21) Appl. No.: 17/991,630

(22) Filed: Nov. 21, 2022

(65) Prior Publication Data
US 2023/0089967 A1 Mar. 23, 2023

Related U.S. Application Data

(63) Continuation-in-part of application No. PCT/IL2021/050592, filed on May 21, 2021.
(Continued)

(51) Int. Cl.
*B01D 53/78* (2006.01)
*B01D 50/00* (2022.01)
(Continued)

(52) U.S. Cl.
CPC .............. *F24F 8/133* (2021.01); *B01D 50/00* (2013.01); *B01D 53/02* (2013.01); *B01D 53/78* (2013.01);
(Continued)

(58) Field of Classification Search
CPC ................................ B01D 53/02; B01D 50/00
See application file for complete search history.

(56) References Cited

U.S. PATENT DOCUMENTS

2008/0182506 A1 7/2008 Jackson et al.
2010/0320294 A1 12/2010 Neumann et al.
(Continued)

FOREIGN PATENT DOCUMENTS

CN 2675130 Y 2/2005
CN 201389450 Y * 1/2010
(Continued)

OTHER PUBLICATIONS

International Search Report dated Sep. 14, 2021, for PCT/IL2021/050592, 7 pp.
(Continued)

*Primary Examiner* — Robert A Hopkins
(74) *Attorney, Agent, or Firm* — Nixon & Vanderhye PC

(57) ABSTRACT

A method for improving indoor air quality in a room, comprising drawing air from the room and guiding the air into a gas/liquid contactor charged with aqueous alkali hydroxide/$H_2O_2$ solution, passing the air through a perforated membrane installed in the gas/liquid contactor below the surface level of the aqueous alkali hydroxide/$H_2O_2$ solution, such that bubbles produced travel through said solution, and getting treated air with improved quality from said gas/liquid contactor, said treated air is characterized by having: reduced carbon dioxide levels; and/or reduced VOC levels; and/or reduced microbiological load. An air purifier to carry out the method is also provided.

22 Claims, 39 Drawing Sheets

Related U.S. Application Data

Figure 3A:
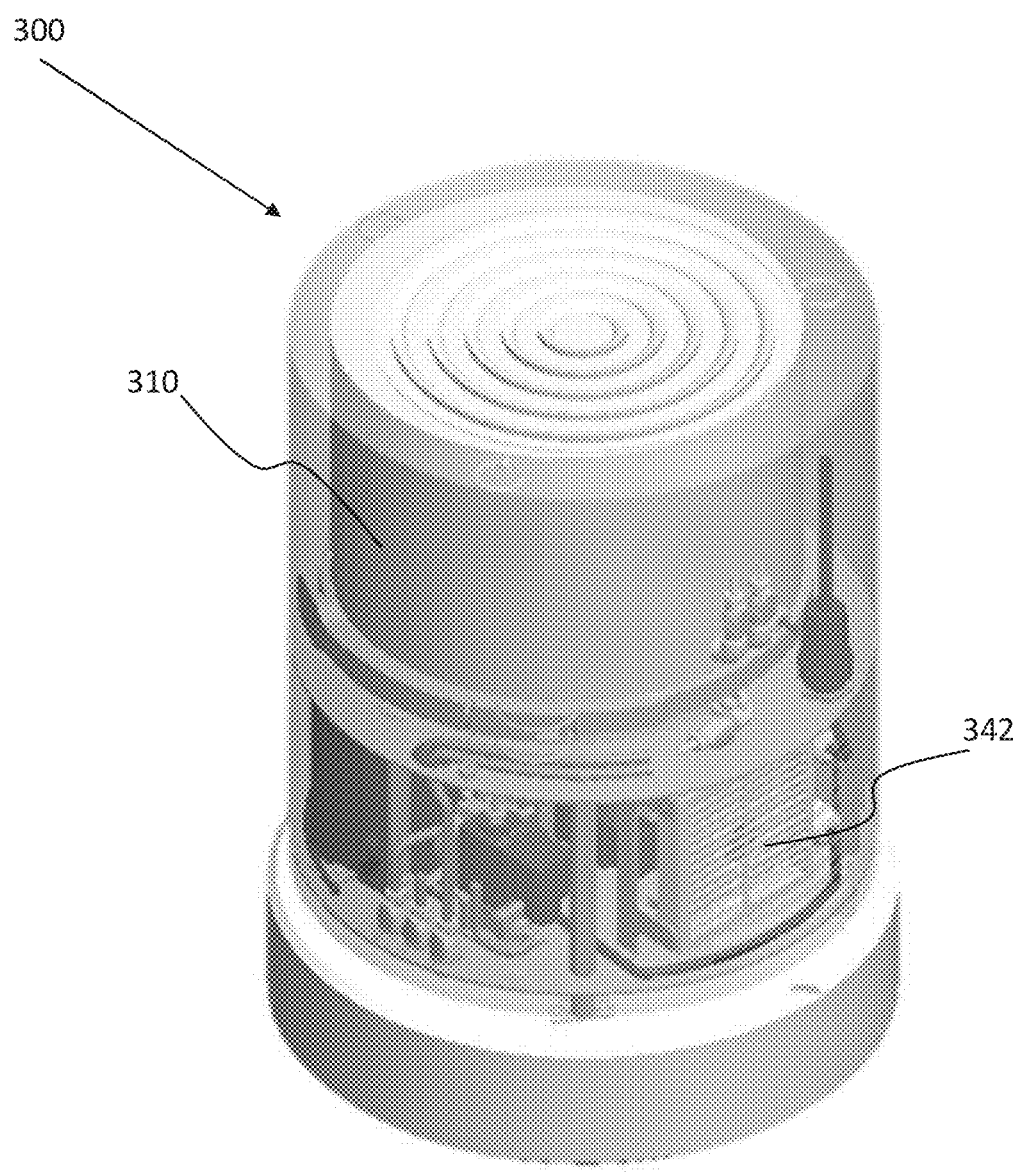

(60) Provisional application No. 63/282,322, filed on Nov. 23, 2021, provisional application No. 62/704,664, filed on May 21, 2020.

(51) Int. Cl.
    *B01D 53/02*     (2006.01)
    *F24F 8/133*     (2021.01)
    *F24F 8/15*     (2021.01)
    *F24F 110/66*     (2018.01)
    *F24F 110/70*     (2018.01)

(52) U.S. Cl.
    CPC .......... *F24F 8/15* (2021.01); *B01D 2251/106* (2013.01); *B01D 2257/708* (2013.01); *B01D 2257/91* (2013.01); *B01D 2258/06* (2013.01); *F24F 2110/66* (2018.01); *F24F 2110/70* (2018.01)

(56) References Cited

U.S. PATENT DOCUMENTS

| | | | | |
|---|---|---|---|---|
| 2011/0005389 | A1* | 1/2011 | Webley | B01D 53/229 95/96 |
| 2011/0271839 | A1* | 11/2011 | Kim | B01D 53/72 96/111 |
| 2017/0106333 | A1 | 4/2017 | Zhu | |

FOREIGN PATENT DOCUMENTS

| | | |
|---|---|---|
| CN | 105032151 | 11/2015 |
| CN | 207159673 | 3/2018 |
| CN | 109803749 | 5/2019 |
| CN | 110617602 | 12/2019 |
| CN | 110846083 | 2/2020 |
| JP | 2001-062239 | 3/2001 |
| JP | 2003-161482 | 6/2003 |
| WO | 2013/093903 | 6/2013 |
| WO | 2015/170317 | 11/2015 |
| WO | 2017/162453 | 9/2017 |
| WO | 2018/002710 | 1/2018 |
| WO | 2018/048204 | 3/2018 |
| WO | 2019/081651 | 5/2019 |

OTHER PUBLICATIONS

Written Opinion of the ISA dated Sep. 14, 2021, for PCT/IL2021/050592, 6 pp.

Uri Stoin et al., "In situ Generation of Superoxide Anion Radical in Aqueous Medium under Ambient Conditions", ChemPhysChem, vol. 14, 2013, 1212-4158-4164.

May 1, 2025 Office Action issued in Chinese Patent Application No. 202180036331.9, pp. 1-11.

\* cited by examiner

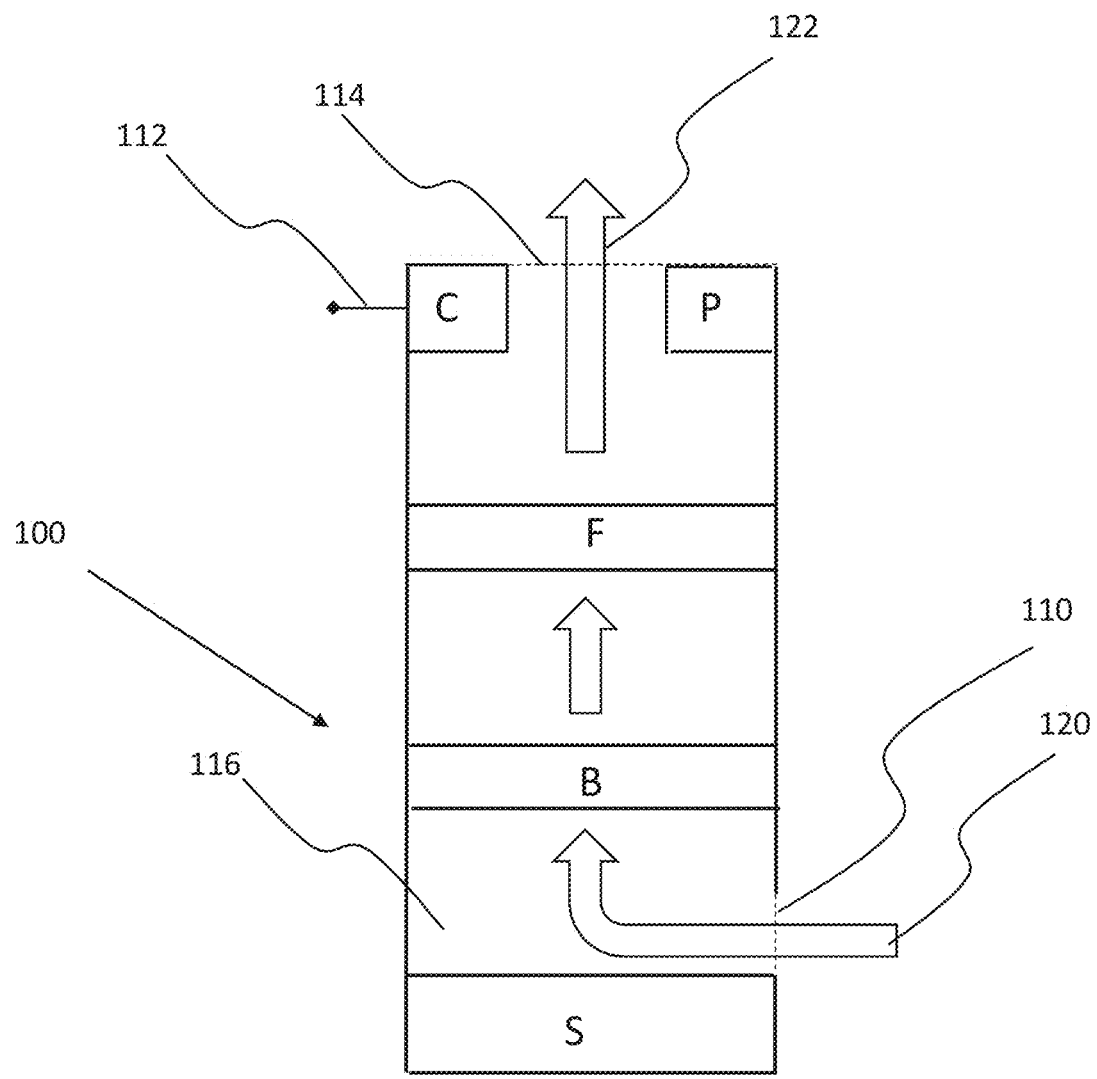
Fig. 1 – Prior Art

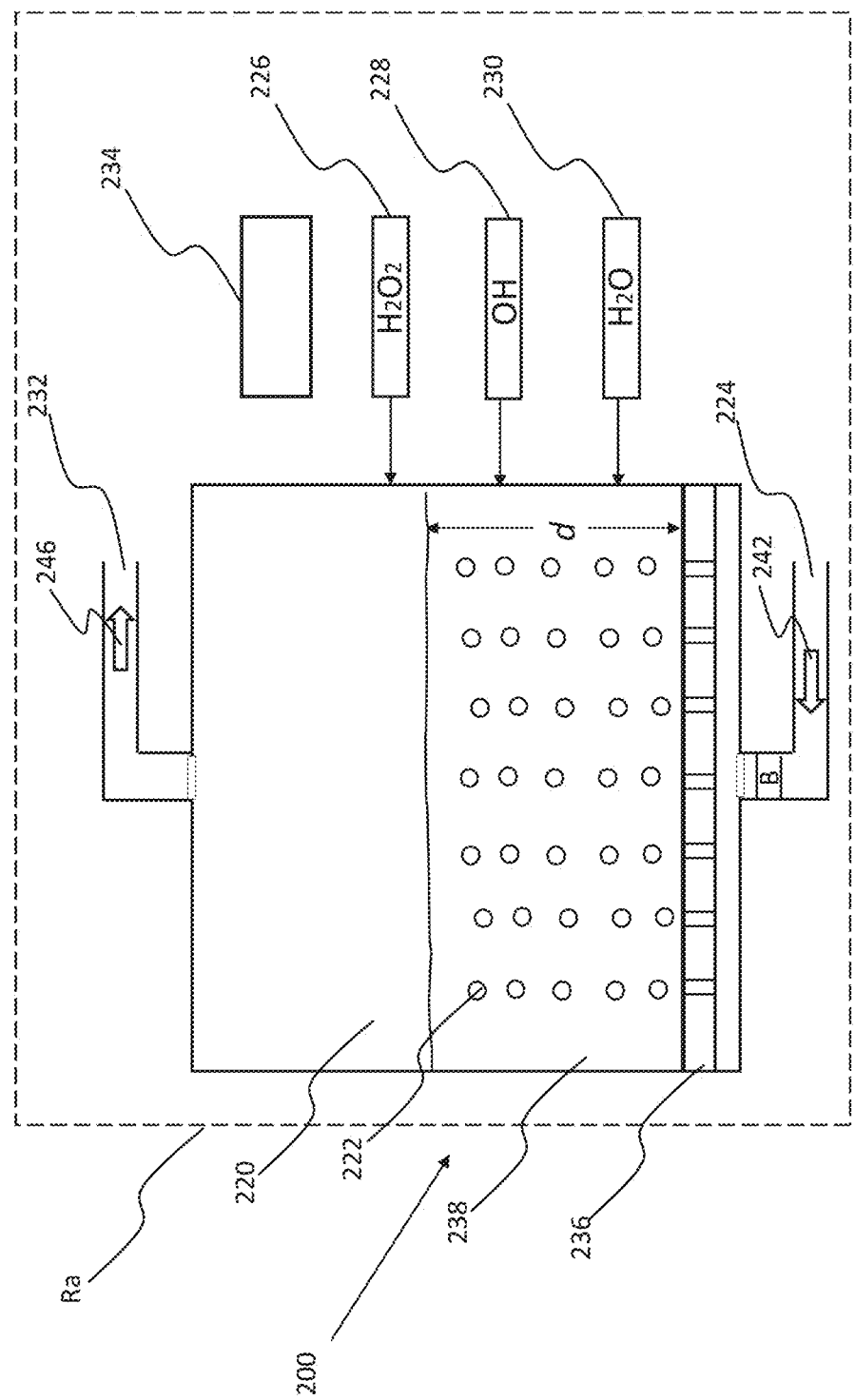
Fig. 2 — Prior Art

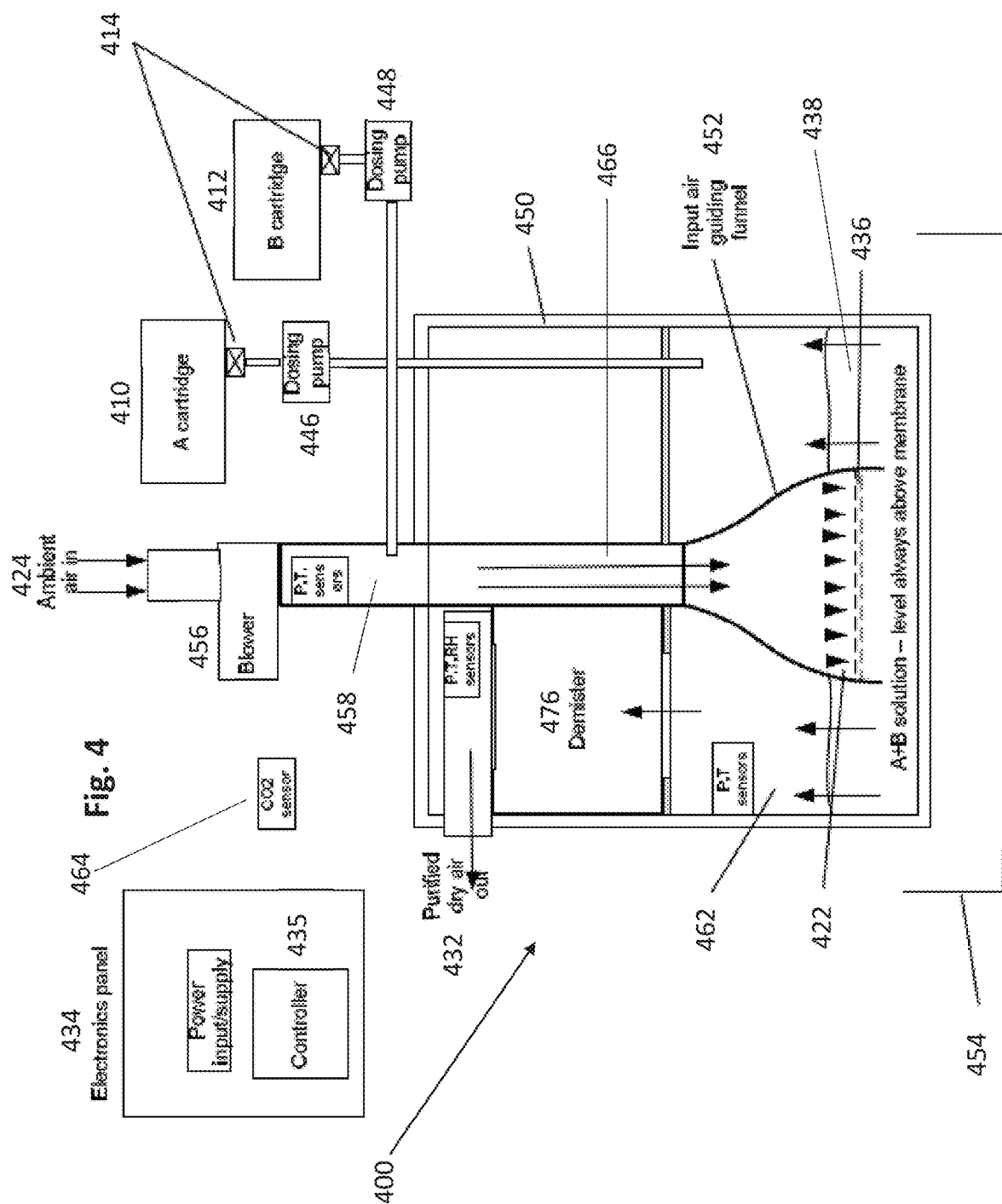

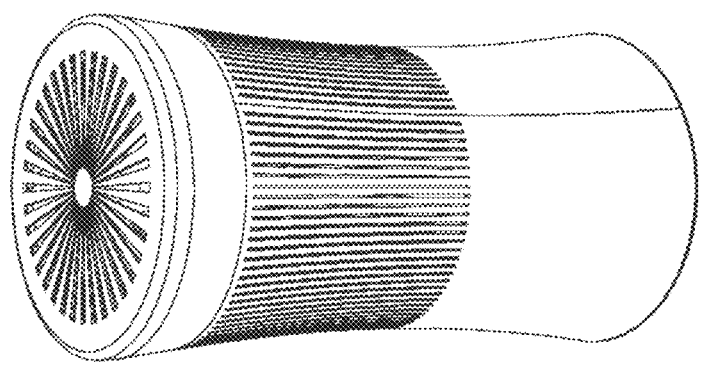
Fig. 16a
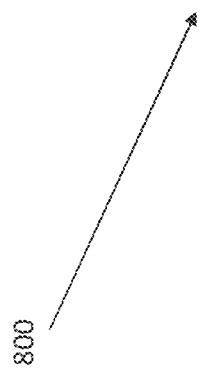
800

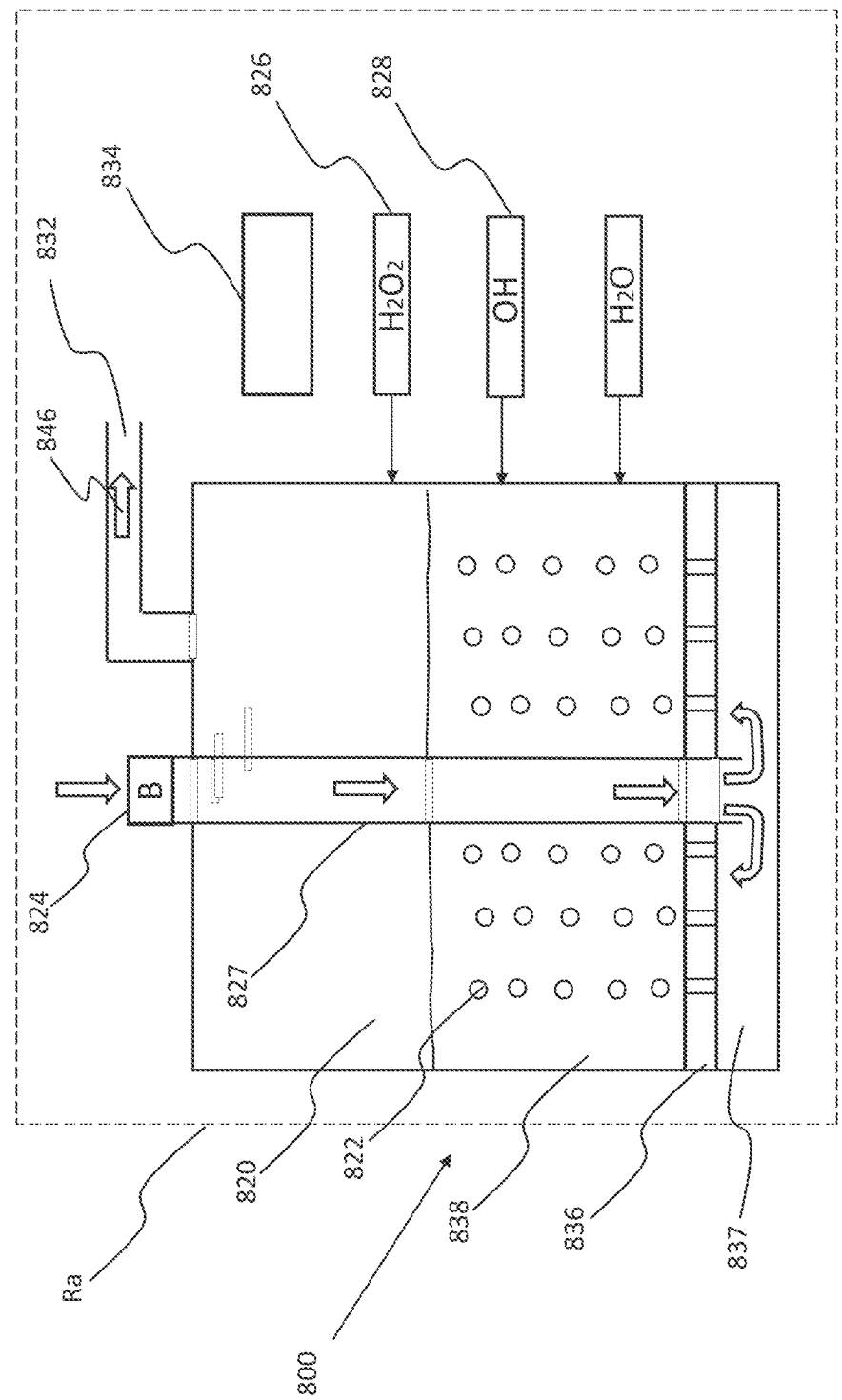

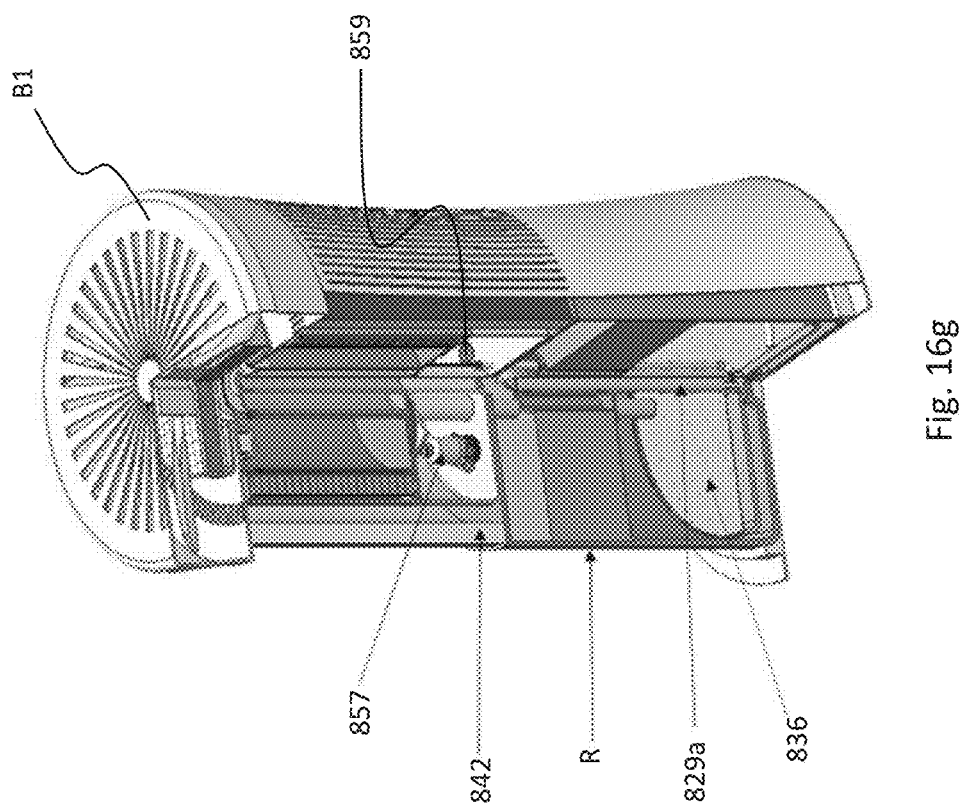

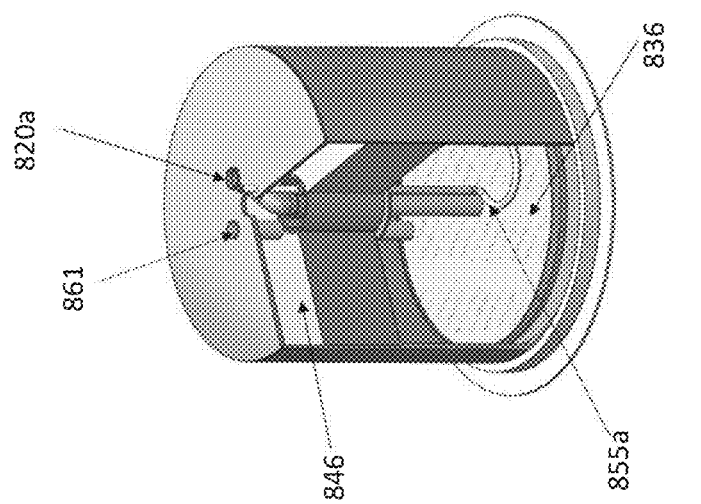

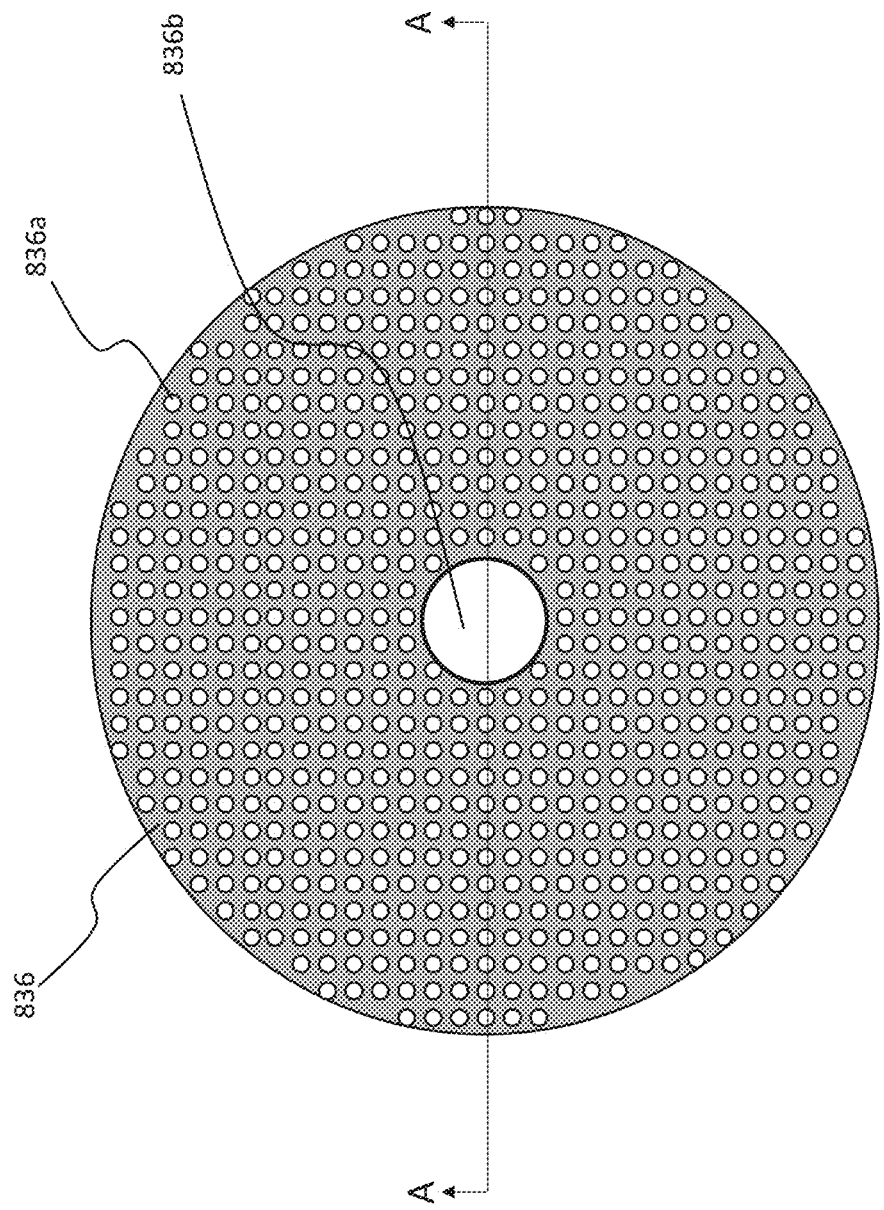

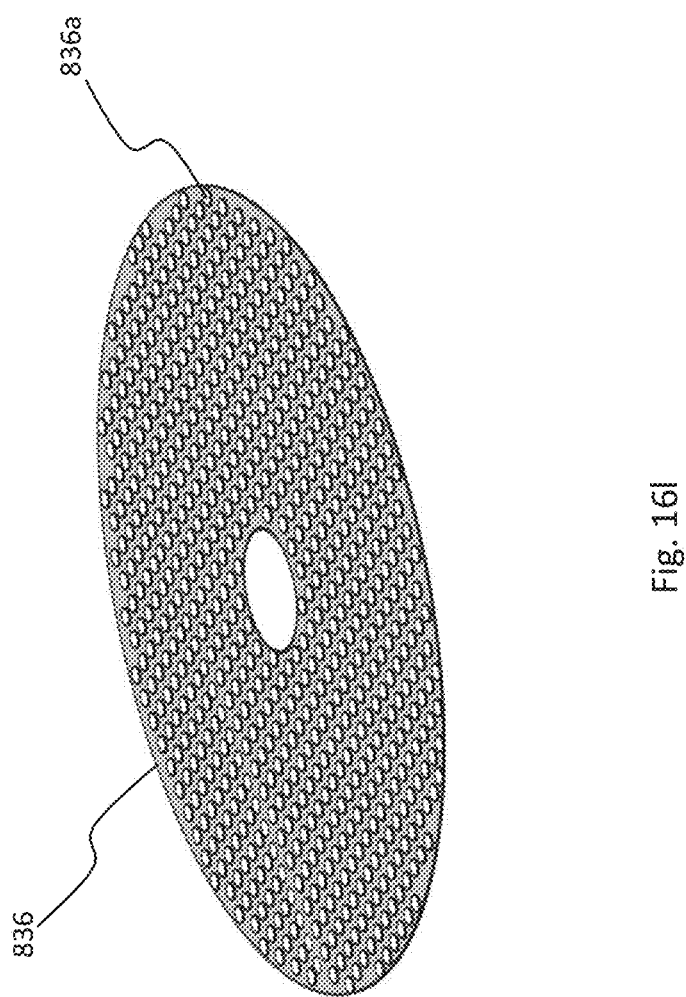

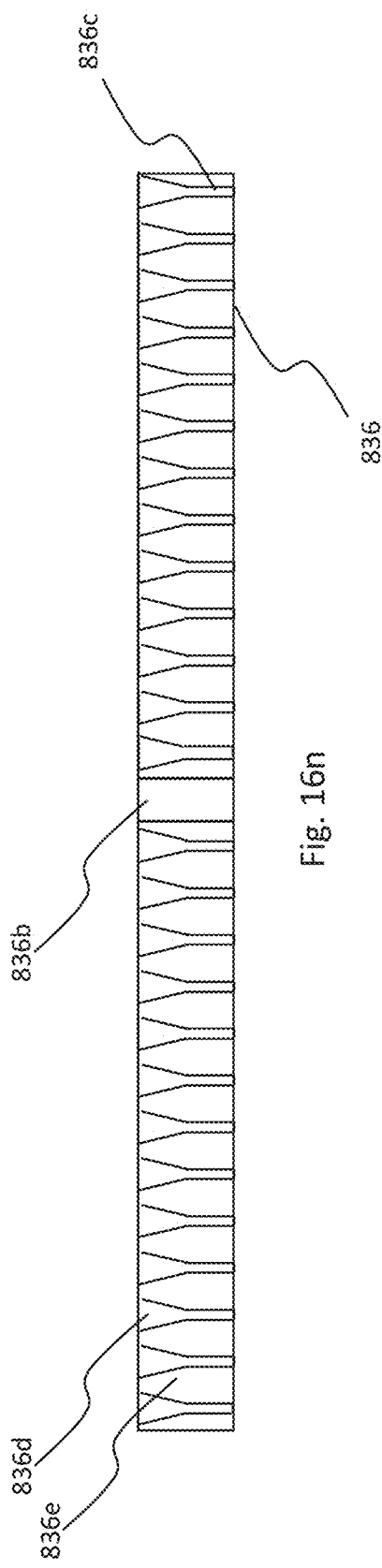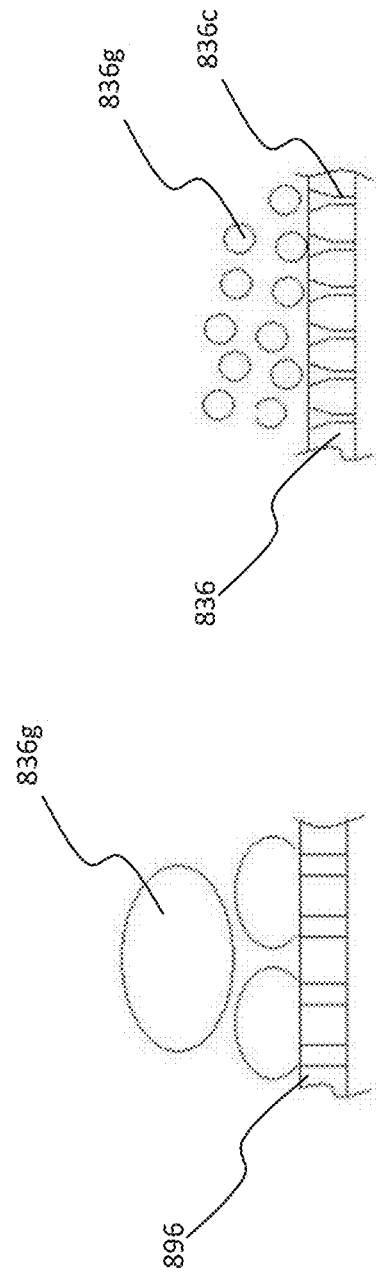
Fig. 16n
Fig. 16o
Prior Art
Fig. 16p

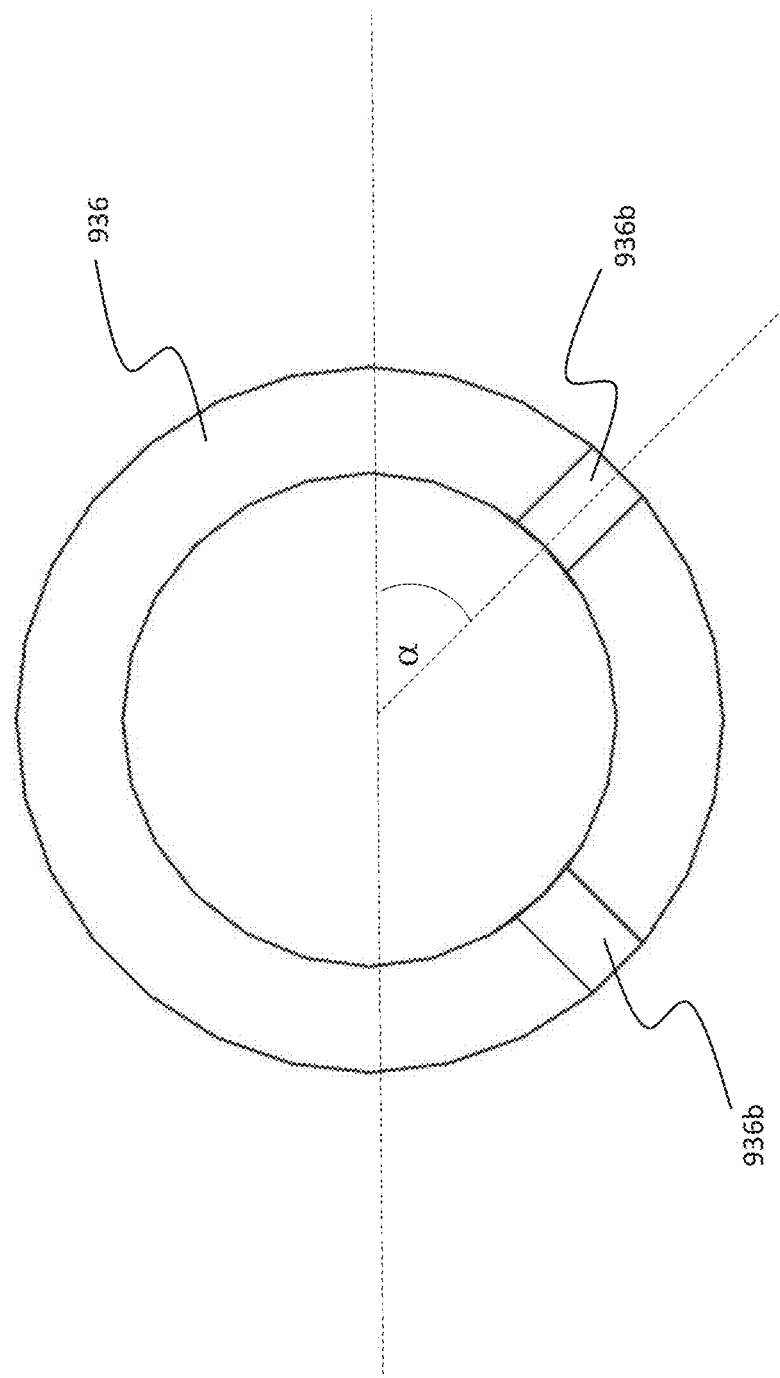

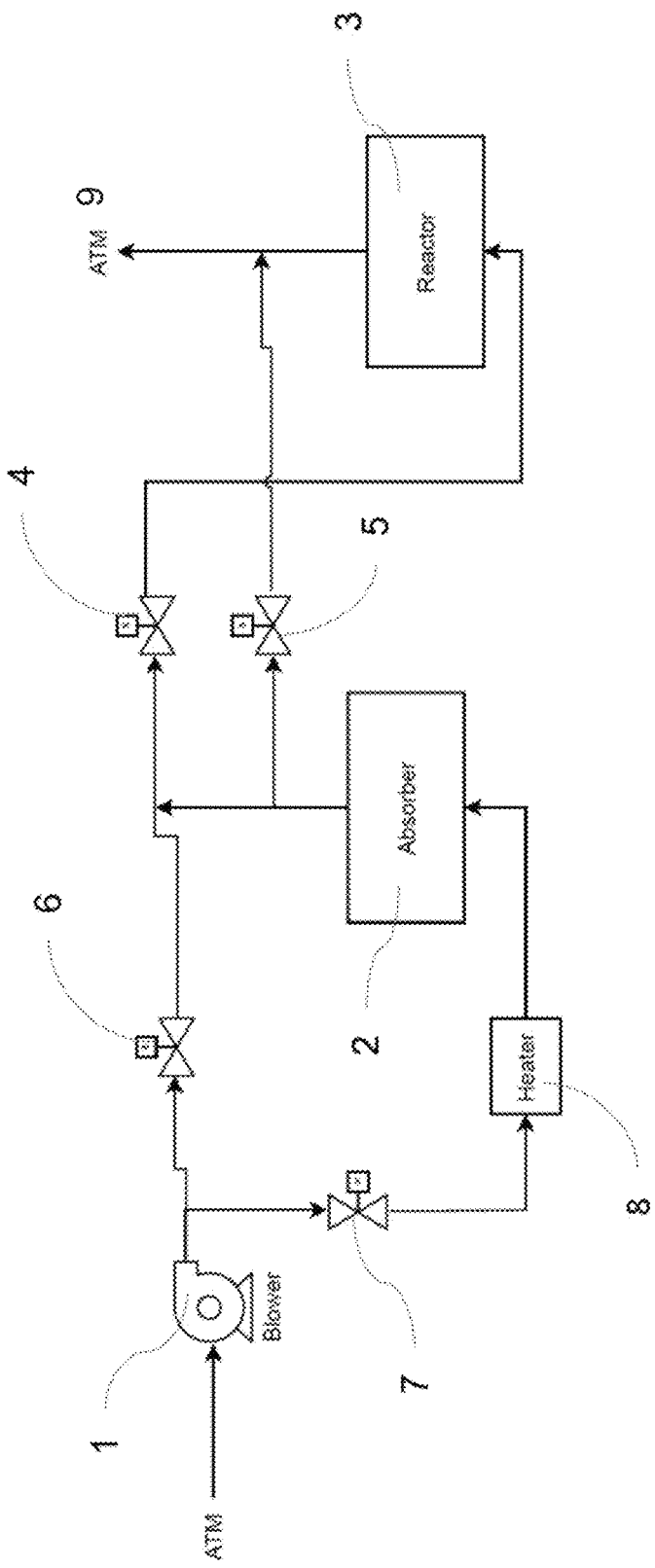

METHOD AND APPARATUS FOR PURIFYING AIR FROM BIOLOGICAL AGENTS AND VOLATILE ORGANIC COMPOUNDS

CROSS-REFERENCE TO RELATED APPLICATION(S)

This application is a continuation-in-part of International Application No. PCT/IL2021/050592 filed May 21, 2021, which designated the U.S. and claims priority to U.S. Provisional Patent Application No. 62/704,664 filed May 21, 2020, and this application also claims the benefit of U.S. Provisional Patent Application No. 63/282,322 filed Nov. 23, 2021, the entire contents of each of which are hereby incorporated by reference.

FIELD OF THE INVENTION

The invention generally relates to systems and methods for air treatment. More specifically, the invention relates to a method for purifying air from chemical and biological pollutants, such as Volatile Organic Compounds (VOCs), formaldehyde, viruses, bacteria, etc., and to a domestic system for air purification, achieving reduction of $CO_2$ levels and biological load.

BACKGROUND OF THE INVENTION

Heating, ventilation and air conditioning (HVAC) systems used in homes and offices facilitate the accumulation of air pollutants within air-regulated closed spaces. A central HVAC system that operates in an office building accumulates outdoor air, regulates its temperature and moisture, and circulates the regulated air within spaces of the building. However, the air which is brought from the outdoor to the system is in many cases polluted, resulting in a conveyance of micro-particles of, for example, dust, smoke, smog, chemicals, etc. into the closed space, and additional micro-particles are added from within the spaces themselves. The situation is similarly problematic in the air-conditioning of small homes, where the indoor air is circulated in a closed-loop, without even adding outdoor refreshing air into the loop. Both cases (i.e., of office-buildings and small homes) result in the accumulation of solid particles and gases, such as dust, smoke, smog, and bio-hazards such as viruses and bacteria, within the air-regulated spaces. These micro-pollutants impair health and productivity.

A variety of domestic air purifiers (hereinafter also referred to as "home-purifiers" or "room purifiers" that are used in individual rooms at homes, offices, hospitals, medical clinics, waiting rooms, etc.) that are supplementary to existing HVAC systems have been developed to reduce the accumulation of polluting particles in closed spaces. These are stand-alone devices that typically include a quiet blower and a set of one or more fine filters. These air purifiers are designed to circulate the room's air through the set of fine filters, thereby capturing particles in sizes ranging from 1 μm to 10 μm and larger. 1 μm particles generally originate from smoke and smog, 2.5 μm particles originate from motor-vehicle exhausts and wood-burning fires, and 10 μm and larger particles originate from general dust. While capturing up to 99% of those micro-sized particles, these traditional air purifiers are usually not effective against a multitude of chemical and biological contaminants, i.e., reduction of carbon dioxide indoor levels, alongside Volatile Organic Compounds (VOCs), (e.g., formaldehyde), allergens, bacteria, viruses, etc.

There exists a need to provide a domestic air purifier having the capability of removing airborne chemical and biological pollutants.

Incorporation of chemistry into air purifiers to improve the quality of indoor air by reduction of biological load is described in JP 2003-161482 (electrochemically generated $H_2O_2$ solution), JP 2001-062239 and CN 2675130 (the treated air is passed through chemical solutions arranged successively, including alkali hydroxide and sodium peroxide).

An aqueous alkali hydroxide/$H_2O_2$ solution (i.e., an alkali hydroxide solution to which $H_2O_2$ is added, hereinafter also named "MOH/$H_2O_2$ reagent"; M stands for the alkali metal, e.g., sodium, potassium or a mixture thereof) has been previously reported as a generator of the superoxide radical anion ($O_2$—·). In a series of publications (WO 2013/093903; Stoin, U. et al. ChemPhysChem, 2013, 14, 4158 and WO 2015/170317), it was shown that the aqueous MOH/$H_2O_2$ reagent is a powerful oxidizer that could be used to serve several useful purposes:
 absorbing carbon dioxide from flue gases;
 destroying bulk carbon tetrachloride and other chlorinated methane and ethane compounds; and
 remediating soil from diesel oil and crude oil contaminants.

In co-assigned WO 2018/002710, the focus was shifted to air treatment, proposing using the aqueous MOH/$H_2O_2$ reagent for removing target gases from the air, mainly carbon monoxide arising in case of fire. Other target gases which the MOH/$H_2O_2$ reagent could neutralize are listed on page 15 of WO 2018/002710. The system described in WO 2018/002710 includes an inlet that receives a flow of contaminated air from the treated space and a reaction chamber that contains an aqueous solution such that an amount of one or more target gas species contained within a plurality of bubbles are reduced through reaction with the solution. The treated air that flows out of the solution is then returned into the treated space. WO 2018/002710 demonstrates the efficiency of the reaction chamber in converting toxic gases (such as carbon monoxide, carbon dioxide, NOx, etc.) to harmless chemical substances, e.g., oxygen, therefore facilitating breathing, particularly in the case of highly contaminated air during a fire. However, the state of a home or office room in a normal condition is substantially different from the state of the fire-polluted air treatment as demonstrated by WO 2018/002710, as the concentration rate of contaminants in the case of fire is several orders higher compared to a room in normal conditions.

In another aspect, a conventional domestic air-purifier is a stationary unit, requiring the positioning of a dedicated unit in each room to be treated, no matter whether the rate of contaminants in the room in a given time is above a harmful threshold or not. This configuration results in waste of resources or compromise of air-quality in rooms where a home-purifier is not positioned.

It is an object of the present invention to provide a novel home-purifier for reducing bio-hazards.

Another object of the present invention is to provide a home-purifier that reduces hazardous or harmful gases and bio-hazards.

Another object of the invention is to provide said novel home-purifier in a compact size and quietness of operation.

Still another object the invention is to provide a single home air purifier capable of treating a plurality of rooms within an office or home.

Still, another object of the present invention is to provide a compact reactor within said compact and quiet home air purifier for reducing bio-hazards and hazardous or harmful gases.

It is still another object of the present invention to integrate the home air purifier of the present invention with a traditional home air purifier.

Other objects and advantages of the invention become apparent as the description proceeds.

SUMMARY OF THE INVENTION

The present invention is specifically aimed at addressing the need to maintain good indoor air quality. Contaminants found in indoor air in buildings and structures are classified into two groups: chemical contaminants and biological contaminants.

A major chemical contaminant is formaldehyde, a colorless, pungent-smelling gas which is considered by the United States Environmental Protection Agency to be an important hazardous air pollutant, arising from glues and foams used in furniture, some textiles (e.g., carpets), and from combustion processes such as cooking and smoking. The major biological contaminants are bacteria, fungi, and viruses.

Experimental work conducted in support of this invention indicates that the $MOH/H_2O_2$ reagent can reduce VOC levels (e.g., formaldehyde) in indoor air. The $MOH/H_2O_2$ reagent has demonstrated high, steady conversion rates of gaseous formaldehyde into harmless by-products over a long test period, challenging characteristic formaldehyde levels (few tenths of a milligram per cubic meter, ~0.2 mg/m$^3$). Likewise, low carbon dioxide concentrations in indoor air could also be effectively targeted by the $MOH/H_2O_2$ reagent, leading to essentially complete elimination of carbon dioxide with a potential benefit of oxygen generation ($O_2$ is by-product of $CO_2$ oxidation by superoxide).

Results reported below also indicate that the $MOH/H_2O_2$ reagent possesses air-sanitizing action. That is, it acts on airborne microorganism. The $MOH/H_2O_2$ reagent may therefore be used to control microbiological load in indoor air, specifically by eliminating bacteria. Hydrogen peroxide is known to act on bacteria, but the antibacterial effect of the $MOH/H_2O_2$ reagent is surprising, bearing in mind that hydrogen peroxide decomposes instantly in an alkaline environment. Experimental work conducted in support to this invention shows that when air stream that was loaded with a bioaerosol (produced from bacteria (*K. rhizophila*) was treated with the $MOH/H_2O_2$ reagent, high log reduction of bacterial load was measured versus control. The $MOH/H_2O_2$ reagent is also effective in combatting viruses: in the experimental model described below, a removal rate of more than 99.9% was measured (the tested virus was a corona virus, e.g., human coronavirus such as OC43).

As shown below in reference to the drawings, several reactor configurations could be used to achieve an efficient contact between the incoming indoor air stream and the aqueous $MOH/H_2O_2$ reagent, mainly based on the creation of air bubbles that are forced to travel through the bulk reagent.

One major aspect of the invention is therefore a method for improving indoor air quality in a room, comprising drawing air from the room and guiding the air to a gas/liquid contactor charged with aqueous alkali hydroxide/$H_2O_2$ solution, passing the air through a perforated membrane installed in the gas/liquid contactor below the surface level of the aqueous alkali hydroxide/$H_2O_2$ solution, such that bubbles produced travel through said solution, and getting treated air with improved quality from said gas/liquid contactor, said treated air is characterized by having:

reduced carbon dioxide levels (from 1000-200,000 ppm, e.g., from 1000-10,000, down to less than 1000 ppm, e.g., down to 400-700 ppm); and/or reduced VOC (e.g., formaldehyde) levels; and/or reduced microbiological load (e.g., at least 1-log reduction of bacterial load and/or viral load, e.g., at least 2-log reduction). Another benefit gained is oxygen enrichment in indoor environment, up to 233.

The term "perforated membrane", as used herein, relates to a perforated element allowing passage of air therethrough, to disperse the air stream and create bubbles within a solution. It can have a flat geometry, (e.g., membrane 836 as shown in FIG. 16*l*) or a tubular geometry (e.g., membrane 936 as shown in FIG. 18*a*, where the membrane has a perforated spiral tubing configuration). The terms "reactor" and "gas/liquid contactor" are used herein interchangeably.

The invention also relates to an air purifier for eliminating chemical and biological pollutants from a room, which comprises: (a) an inlet air channel; (b) one or more air sucking components configured to direct air from the room into said inlet channel, and to direct the air via said air channel into a perforated membrane mounted in a chemical and biological pollutants-elimination reactor; and (c) an outlet air channel configured to receive treated air from the reactor; (d) wherein the reactor comprises: (d.1) a reservoir configured to contain a purifying aqueous alkali hydroxide/$H_2O_2$ solution; wherein during the purifier's operation, said perforated membrane is positioned below a surface level of the solution such that air passing through the perforated membrane is converted into bubbles that travel through the solution and towards said outlet channel; and wherein the air purifier further comprises a removable storage unit positioned above the reactor, said removable storage unit is configured to contain and supply alkali hydroxide, hydrogen peroxide, and optionally water to said reactor.

In an embodiment of the invention, said inlet air channel conveys air in a downwards direction, the inlet air channel passes through an opening in said perforated membrane towards an air compartment located below the perforated membrane.

In an embodiment of the invention, a bottom outlet of said inlet air channel is sealed against a top surface of the perforated membrane, thereby allowing passage of air from the inlet air channel only through the perforations of the membrane towards a section of the reservoir below the membrane, and wherein the diameter of said membrane is smaller than the diameter of the reservoir of alkali hydroxide/$H_2O_2$ solution.

In an embodiment of the invention, each perforation at the membrane has a diameter in the range of 40 μm and 1200 μm.

In an embodiment of the invention, each of the perforations has top and bottom openings, respectively, at top and bottom surfaces of the perforated membrane, the diameter of said top opening is larger than a diameter of said bottom opening.

In an embodiment of the invention, each of the perforations is divided into two sections in cross-section, a lower section having a cylindrical shape, and an upper section having a frustoconical shape.

In an embodiment of the invention, a bottom outlet of said inlet air channel is configured to lead contaminated air to a perforated membrane, said perforated membrane having a spiral tubing configuration and positioned at a lower portion of said purifying solution's reservoir.

In an embodiment of the invention, each said perforations is positioned at a lower portion of the tubing in cross section, thereby directing air outlet through the perforation downwards.

In an embodiment of the invention, each of said perforations is positioned at least 30° lower than the tubing horizontal diameter in cross-section. In this embodiment of the invention, each of said perforations has a diameter in the range of between 40 μm and 1200 μm.

In an embodiment of the invention, a distance between each two perforations is in the range of 2-50 of the perforation's diameter.

In an embodiment of the invention, said storage unit comprises an alkali hydroxide container, a $H_2O_2$ container, and optionally a water container.

In an embodiment of the invention, the air purifier has an essentially cylindrical shape, wherein said alkali hydroxide container, said $H_2O_2$ container, and said water container are arranged concentrically within the storage unit.

In an embodiment of the invention, the alkali hydroxide container is configured to contain alkali hydroxide tablets in a releasable arrangement.

In an embodiment of the invention, the alkali hydroxide container comprises a plurality of columns, each column is configured to store alkali hydroxide tablets.

In an embodiment of the invention, the alkali hydroxide container is configured to angularly revolve, thereby to position a single column above an opening to a passage leading to said solution reservoir, thereby to allow a periodical feeding of the solution by hydroxide tablets.

In an embodiment of the invention, the air purifier has a blower and a HEPA filter fitted in the inlet channel upstream to the reactor.

In an embodiment of the invention, the air purifier is integrated with a domestic room purifier having a HEPA filter, wherein the inlet air channel is a branch from an inlet air channel of the domestic room purifier diverging downstream to the HEPA filter, and wherein the outlet channel joins an outlet channel of the domestic room purifier.

In an embodiment of the invention, the air purifier further comprising a sensor for measuring a concentration of $CO_2$ at the room-air, and wherein a schedule and a period of operation of the device is based on $CO_2$ measurements by said sensor.

The invention also relates to a home air purifying system, comprises: (a) a plurality of air-quality sensors, each sensor being positioned at another room of the home; (b) a docking station which is configured to: (b.1) host a mobile, air purifier; (b.2) receive air quality measurements from all said plurality of sensors, and determine when a level of contamination at a room exceeds a predefined contamination threshold; and (b.3) communicate with said mobile air purifier, and at least send to it an indication of a room in which a contamination above said predefined contamination threshold has been detected; and (c) said mobile air purifier, which is configured to: (c.1) communicate with said docking station, and at least receive from it an indication of the room in which the contamination above said predefined contamination threshold has been detected; (c.2) upon receipt of said indication, navigate to the contaminated room, operate there to purify the room, and upon completion, return to the docking station.

In an embodiment of the invention, said contamination comprises one or more chemical and biological contaminants.

In an embodiment of the invention, said mobile air purifier comprises: (a) an inlet air channel; (b) one or more air sucking components configured to suck air from the room into said inlet channel, and to direct the air via said air channel into a perforated membrane mounted at a bio-hazards elimination reactor; and (c) an outlet air channel configured to receive treated air from the reactor, and to return the treated air into the room; wherein the bio-hazards elimination reactor comprising: (d) a reservoir configured to contain a purifying aqueous alkali hydroxide/$H_2O_2$ solution; wherein during the purifier operation said perforated membrane is positioned below a surface level of the solution such that air passing through the perforated membrane is converted into bubbles that travel through the solution and towards said outlet channel; and wherein the air purifier further comprising a removable storage unit positioned above the reactor, said removable storage unit is configured to contain and supply alkali hydroxide, hydrogen peroxide, and water to said reactor.

For example, an aqueous alkali hydroxide/$H_2O_2$ solution is charged to the gas/liquid contactor either by feeding alkali hydroxide solution prepared beforehand, or by dissolving solid alkali hydroxide (e.g., in a tablet or granular form) in water supplied separately to the gas/liquid contactor, with continuous or periodic addition of hydrogen peroxide solution to the alkali hydroxide solution.

For example, air bubbles (created by forcing the incoming air stream to flow across a membrane as described in detail below) are caused to travel through the alkali hydroxide solution (e.g., NaOH or KOH, or their mixture), to which $H_2O_2$ stream is periodically or continuously added (for example, by injection beneath the level of the alkali hydroxide solution, in close proximity to the perforated membrane, i.e., in the vicinity of the perforations). Concentration of the alkali hydroxide solution varies from 5% to 48%-50% by weight, e.g., from 10 to 48%-50% by weight. The concentration of the hydrogen peroxide solution added to the alkali hydroxide solution is from 3%, 4% or 5% up to 35% by weight, e.g., from 10 to 30% by weight. Acceptable addition rate of the $H_2O_2$ stream may vary from 0.01 ml/min to 10 ml/min, e.g. up to 2, 3 or 4 ml/min. The volumetric ratio between the solutions in the range of 2:1 to 10:1 in favor of the alkali hydroxide solution. The proportion can be adjusted according to the profile of pollutants. As mentioned above, chemical pollutants targeted by the invention include carbon dioxide and VOC; biological pollutants include bacteria and viruses such as corona virus, e.g., human coronavirus such as OC43.

A perforated membrane with flat (planar) geometry is preferably horizontally mounted in the vertically positioned air-purifier. Suitable perforated membranes are 1-10 mm thick, made of chemically inert materials (stainless steel, plastic, etc.), and have 40-1200 μm diameter holes, which are generally evenly distributed over the membrane. The diameter of a hole may be constant, i.e., it does not vary within the membrane thickness, such that the two opposing sides of a passage (a hole) are equal in diameter. One design of the perforated membrane involves variation of the diameter of the perforations (holes) through which the air flows to cross the membrane. Preferably, the air is passed through the membrane via perforations whose diameter increases across the membrane thickness (in operation, the diameter increases from the bottom surface to top surface of the membrane); the perforations are passages consisting of a cylindrical section (with diameter ($D_{cylinder}$) in the range from, e.g., 0.08 mm to 1 mm) joining an inverted frustoconical section facing the solution (the diameter of the small base of the frustoconical equals $D_{cylinder}$; the diameter of the large base of the frustoconical section, facing the solution, is 1.3 to 2.0 times larger than $D_{cylinder}$, with separation between the perforations (passages) being at least 3 times larger than $D_{cylinder}$). Alternatively, the passage is shaped as a frustrum of a cone having a small base and a large base; the air passes through the membrane by entering through the small base and exiting through the large base facing the solution. The benefits received from this geometry are explained below.

With the aid of HEPA filter (high-efficiency particulate filter) added and a blower, the device described above can function as a stand-alone air purifier that reduces the chemical and microbial load of an indoor environment. Alternatively, it may be coupled to conventional air purifiers or HVAC systems. As pointed out above, a conventional air purifier (equipped with a static filter) or HVAC system could benefit from an auxiliary unit integrated thereinto to treat a secondary air stream that has been diverted from the main airflow, with the aid of the $MOH/H_2O_2$ reagent. The chemically and/or biologically decontaminated air thus generated (e.g., with reduced formaldehyde and/or $CO_2$ levels and/or reduced microbiological load) is guided to join the main airflow released from the conventional air purifier, as illustrated below in FIG. 5. In another embodiment, the air-purifier of the invention may operate independently while including an internal HEPA filter, as described below in the embodiment of FIGS. **16*a*-16*p***.

Accordingly, the air drawn into the gas/liquid contactor (where the $MOH/H_2O_2$ reagent is placed) is a filtered air stream resulting from passing indoor air through a filter that captures particles.

A specific aspect of the invention is a method for improving indoor air quality, comprising the steps of:

- drawing indoor air and passing same, at a first flow rate, across a filter to capture airborne particles and produce a main filtered air stream;
- diverting a portion of the main filtered air stream to generate a secondary filtered air stream flowing at a second flow rate, forcing said secondary filtered air stream into a gas/liquid contactor charged with the $MOH/H_2O_2$ reagent, where the filtered air, in the form of bubbles, is contacted with the $MOH/H_2O_2$ reagent;
- withdrawing filtered and decontaminated air stream from said gas/liquid contactor; and
- joining said filtered and decontaminated air stream with the main filtered air stream.

Characteristic flow rates for the main filtered air stream and secondary filtered air stream may be from 500 to 8000 L/min and 80 to 1,000 L/min, respectively.

BRIEF DESCRIPTION OF THE DRAWINGS

In the drawings:

FIG. 1 schematically illustrates a general structure of a traditional (prior art) home air purifier;

FIG. 2 schematically illustrates a general structure of an air treatment unit as disclosed by WO 2018/002710;

FIG. **3*a*** shows a stand-alone home air purifier according to an embodiment of the present invention;

FIGS. **3*b* and 3*c* are two side-views of the home air purifier presented in FIG. 3*a***;

FIG. 4 illustrates a reactor structure according to a second embodiment of the invention;

FIG. 5 illustrates an integration between a traditional filter-based home air purifier and the air purifier of the invention;

FIG. 6 shows a structure of a mobile home air purifying system, according to an embodiment of the invention;

FIG. 7 shows an exemplary configuration of the system of FIG. 6 for the elimination of bio-hazards; and FIG. 8 shows an exemplary docking station and a mobile purifier according to an embodiment of the invention.

FIG. 9 shows an experimental set-up used for testing removal of formaldehyde from the air, with the aid of $NaOH/H_2O_2$ reagent.

FIG. 10 shows formaldehyde concentration versus time plot.

FIG. 11 shows formaldehyde concentration versus time plot, measured in the incoming (contaminated) and outgoing (treated) air streams.

FIG. 12 shows an experimental set-up used for testing removal of $CO_2$ from the air with the aid of $NaOH/H_2O_2$ reagent.

FIG. 13 shows $CO_2$ concentration versus time plot, measured in the incoming (contaminated) and outgoing (treated) air streams.

FIG. 14 shows oxygen concentration versus time plot, measured in the incoming (contaminated) and outgoing (treated) air streams.

FIG. 15 shows an experimental set-up used for testing the removal of bacteria from the air with $NaOH/H_2O_2$ reagent aid.

FIGS. **16*a*-16*p* illustrate a structure of a home-purifier according to a third embodiment of the invention. FIGS. 16*b* and 16*c* are schematic diagrams. FIGS. 16*h*, 16*i*, and 16*j* provide partial illustrations, respectively, of the home-purifier. FIGS. 16*e*, 16*f*, and 16*g* provide cross-sectional views of the home-purifier. FIGS. 16*k*-16*n* describe the structure of the perforated membrane of the home-purifier, and FIGS. 16*o* and 16*p*** describe the improved effect of bubble creation obtained by the perforated membrane of the invention, compared to a conventional perforated membrane;

FIG. 17 shows an experimental set-up used for testing the removal of bacteria from the air with NaOH/H2O2 reagent aid;

FIGS. **18*a*-18*d*** describe a fourth embodiment of the home purifier; and

FIG. 19 is a bar diagram showing the performance of different types of perforated membranes.

FIGS. 20-21 show another design of an air purifier of the invention, based on a battery consisting of a solid $CO_2$ sorbent and the $MOH/H_2O_2$ reactor.

DETAILED DESCRIPTION OF PREFERRED EMBODIMENTS

FIG. 1 schematically illustrates a general structure of a traditional (prior art) home (domestic) air purifier 100. The purifier generally includes a stand (base) S, an air inlet 110, an air blower B, a set of one or more filters F (typically High-efficiency particulate HEPA-type filters), a control unit C, a control panel P, one or more sensors 112, and an air outlet 114. In operation, blower B (the term "blower" is also referred to herein as "air sucking component") continuously sucks via inlet 110 contaminated air 120 from the room and directs the air through a set of one or more filters F. Filters F capture contaminating particles suspended in the air, forming a purified airflow 122, which is returned into the room via outlet 114. Typically, home air purifier 100 also includes at least one sensor 112 for sensing the level of contaminants in the air in the room, and the level of air quality is indicated on a display within control panel P. The control panel P typically includes said display and controls for selecting a desired operational mode of the device and a level of a necessary purification (for example, in terms of airborne particle concentration). Home air purifier 100 is capable of efficiently removing only solid particles of dimensions typically as small as 0.3 µm, as its filtering capability solely depends on passive filters F. This type of home air purifier, however, is incapable of removing neither biological agents (such as viruses and small bacteria, etc.) nor hazardous gases.

FIG. 2 schematically illustrates a general structure of the air treatment unit 200 of WO 2018/002710. The air treatment unit includes a reaction reservoir 220, which contains a purifying solution 238. The solution is fed, when necessary, from 3 sub-reservoirs: a first sub-reservoir 226 containing a first reagent (in liquid or solid form), a second sub-reservoir 228 containing a second reagent (in liquid or solid form), and optionally a third sub-reservoir 230 containing water ($H_2O$). It should be noted that in some cases, each of the reagent's reservoirs may contain the respective reagent dissolved in water—therefore, a separate reservoir for water may not be necessary. When mixed in specific proportions, the substances stored in the three sub-reservoirs form the purifying liquid 238 within the reactive reservoir 220. More than one of the reagents may be supplied to the reaction reservoir as necessary in response to information obtained from one or more sensors (not shown). Air treatment unit 200 includes a controller 234 and one or more sensors, including, for example, air sensors, a pH sensor, and fluid level sensor to measure the level of fluid within the reaction reservoir, etc. Controller 234 initiates, using blower B (or an air pump or a similar device) a flow of contaminated room-air 242. The room air, entering through inlet 224, is pushed against a perforated membrane 236. The perforated membrane converts the air stream to bubbles 222 that are introduced into the purifying solution 238 within reservoir 220. While flowing through the purifying solution, the contaminated air in the form of bubbles interacts with the reservoir's liquid 238 and is enriched with oxygen. The oxygen-enriched air is then returned to the room as purified air 246 via outlet 232. WO 2018/002710 discusses various embodiments and parameters of unit 200 and, in particular, demonstrates how the air treatment unit 200 can purify air that is heavily contaminated due to fire. However, purification in the case of fire is substantially different in several aspects from the purification of an everyday condition air in a room, as discussed by the present invention. More specifically: (a) WO 2018/002710 lacks detailed discussion nor demonstrates how airborne bio-hazards can be eliminated; (b) the concentration rate of airborne bio-hazards in typical room air (as dealt by the present invention) is several orders lower than the concentration of noxious gases in a case of a fire; (c) there is no discussion in WO 2018/002710 as to the system's compactness to a room purifier, nor to a possibility of its integration with traditional home air purifiers; and (d) there is no discussion as to how a single home air purifier of the invention can eliminate bio-hazards from a plurality of rooms. Additional aspects that differentiate between WO 2018/002710 and the present invention are discussed hereinafter.

Figure 3B:
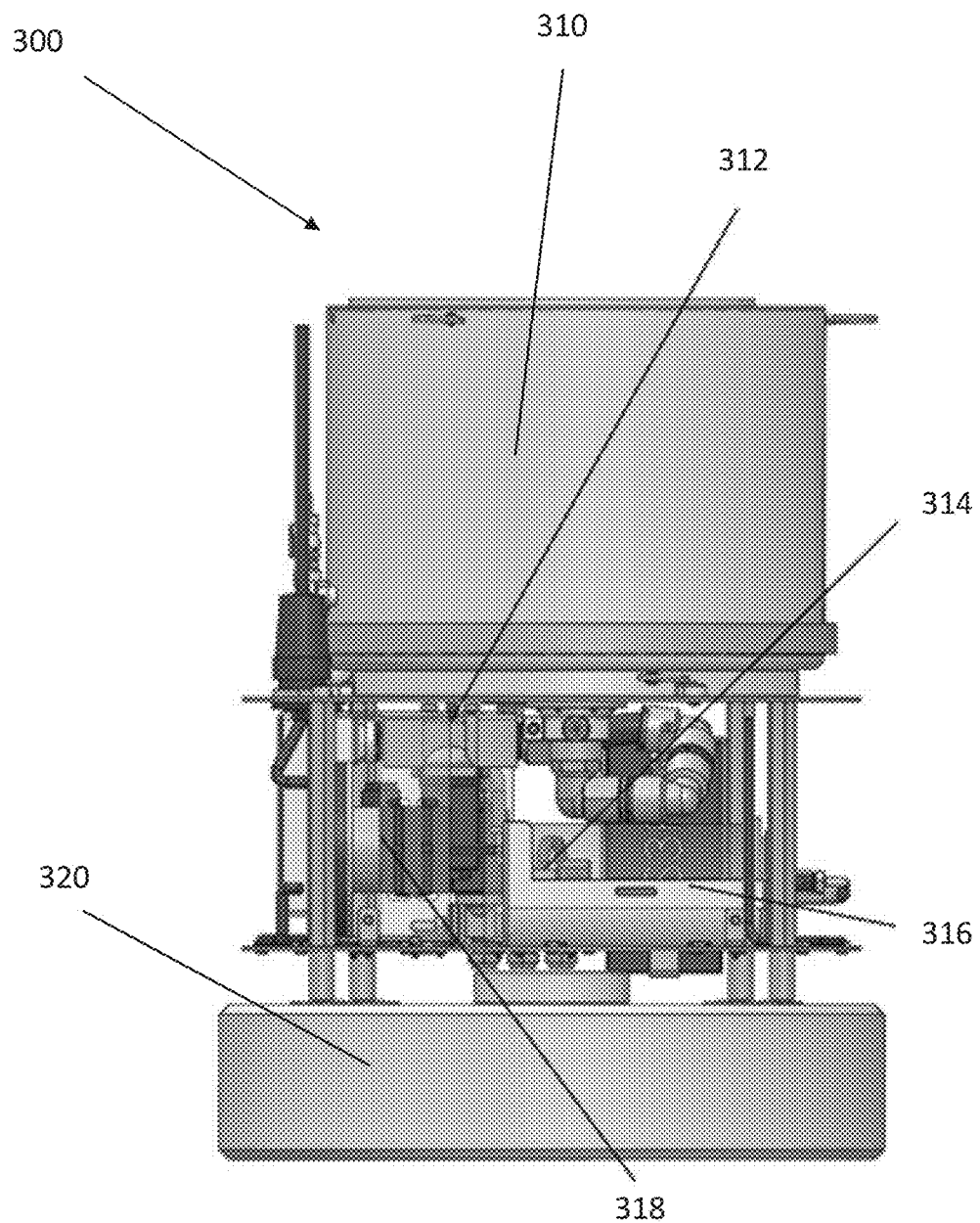
Figure 3C:
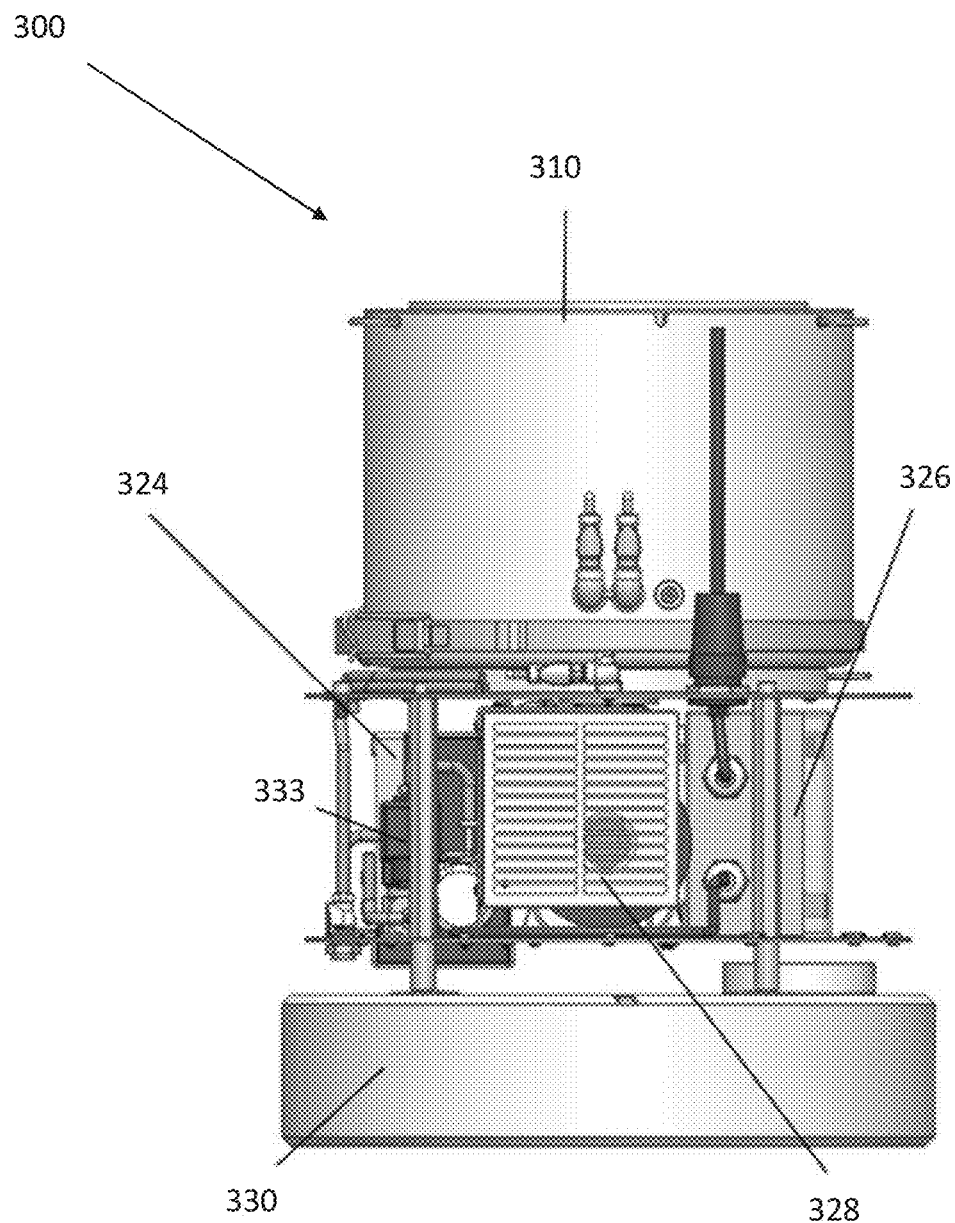

FIG. 3a shows a stand-alone home air purifier according to an embodiment of the present invention. FIGS. 3b and 3c are two side-views of the home air purifier presented in FIG. 3a. The reactor 310 is similar in structure to the reactor R of WO 2018/002710, with modifications (such as in holes size and inter-hole distances) to efficiently eliminate bio-hazards. FIGS. 3a to 3c show several additional components of the system, as follows: an optional HEPA filter 342, a safety valve 312, a cartridge 316 for reagent B in liquid form ($H_2O_2$ solution; a similar cartridge for reagent A (MOH) is not shown), a pump 314 for reagent B (similar pump for reagent A is not shown), a blower 318, electronics box 326, valve 333, battery 324, and a stand 330. The dimensions of the stand-alone bio-hazards purifier are typically on the order of: diameter 20-40 cm and height 70-140 cm. In this purifier structure, the reagent cartridges may suffice, for example, for several months operation period (the actual duration depends on the pollution level). The optional inclusion of a HEPA filter 342 within the stand-alone home air purifier 200 (having a reaction reservoir 220) provides the elimination of small particles, in addition to the elimination of airborne bio-hazards. While the reaction reservoir 220 can also eliminate particles (in addition to eliminating bio-hazards and undesired gases), the tandem structure and separation of the two tasks are more efficient and cost-effective.

In the structure presented in FIGS. 3a-3c, the contaminated air is injected from the bottom into reactor R, through the perforated membrane 236, as also shown in FIG. 2. The reactor's capability to efficiently eliminate bio-hazards (as well as other gases and solid particles) is proportional to the time of exposure of the bubbles 222 to the purifying solution 238. In a reactor into which the air is fed through the bottom (see FIG. 2 and FIGS. 3a-3c), the duration of exposure of each bubble to the reactive solution is the time it takes a bubble to stay in the liquid, namely from the time it leaves the perforated membrane 236 to the time it reaches the top surface of the liquid 238 (the time it takes the bubbles to travel the distance d in FIG. 2). This exposure period enforces a minimal depth of liquid 238 within the reactor for the process to be effective and, in turn, enforces a minimal height of the purifier device 300.

FIG. 4 illustrates a reactor 400 with a structure that provides an extended exposure time of bubbles for a given amount of purifying solution, according to the invention's second embodiment. The reactor 400 has a top inlet 424 for the contaminated air. Blower 456 sucks contaminated air into an air channel 458, which ends with a funnel 452 at its bottom. A perforated membrane 436 positioned within funnel 452 is always dipped in the purifying solution 438 during operation. The flow of contaminated air 422, upon interaction with the perforated membrane 436, produces bubbles below the funnel. Naturally, the bubbles try to escape from solution 438. A backward (upward) passage of bubbles through the perforated membrane 436 is blocked by downward air pressure due to the contaminated airflow. A suitable downward air pressure (above a certain threshold) causes the bubbles to go down and out of the periphery of funnel 452 and then go upward towards the top of solution 438. This non-direct passage that each bubble makes within the purifying solution 438 is a substantially longer passage than the direct passage d that the bubbles make in reactor R presented in FIG. 2. Therefore, a more efficient purification can be obtained by a given level of liquid, a fact that enables reduction of the dimensions of the liquid reservoir 462 and enables compactness of the entire device, as is preferable. Before leaving the purifier 400 through outlet 432, the air passes through a demister 446, which removes from the air residues of aerosol and droplets of reactive liquid that the airflow may carry. Cartridge 410 contains the $H_2O_2$ solution (reagent B), and cartridge 412 contains the MOH solution (reagent A). In this specific case, cartridge 412 disperses the MOH solution into the incoming airflow 466 rather than directly to the purifying solution 438. Dosing pumps 446 and 448 drive the liquids from cartridges A and cartridge B, respectively, using valves 414, for closing or opening the cartridge supply. These pumps are used to maintain the desired proportion of mixture within solution 438 and to adjust this proportion based on real-time measurement of the contamination level in the room air or according to the user's preferences. The literature attests that there is a correlation between the amount of $CO_2$ in a room and the level of airborne bio-hazard contaminants in that room. Therefore, purifier 400 determines the level of bio-hazards in the room using a relatively simple and inexpensive $CO_2$ sensor 464. Controller 435 may use a predetermined lookup table or alternative means to translate the $CO_2$ concentration to the expected concentration of airborne bio-hazards. Controller 435 may also use another lookup table to define the proportions of the ingredients in the reactive solution (and possibly other operational parameters).

In one embodiment of the invention, controller 435 may periodically drain the entire purifying solution 438 into a waste container 454 and renew the solution by fresh content from cartridge A, Cartridge B, and water. In some cases, one or more of the cartridges contains aqueous MOH and/or aqueous $H_2O_2$. Therefore a separate cartridge for water may not be necessary.

The inventors have found that the structure presented in FIG. 4 with the top feeding of contaminated air provides an additional advantage compared to the bottom-feeding structure presented in FIG. 2. It was found that during extended use, bicarbonate accumulates on the perforated membrane 236, which therefore requires periodical cleaning or replacement. This phenomenon has been eliminated or significantly reduced in the top feeding structure presented in FIG. 4. Moreover, it has been found that the top-feeding structure is quieter compared to the bottom-feeding structure presented in FIG. 2.

Also shown in FIG. 4:

a. Electronic unit 434, which includes, among other components, a controller 435, a control panel, a display, and a power supply. The Electronic unit may also include a Wi-Fi transceiver to allow a remote control via a smartphone, tablet, etc.;
b. Sensor 464 to measure the concentration of $CO_2$ in the room, whose level measurement assists the controller in deciding when to activate or deactivate the operation;
c. Casing 450; and
d. Some additional sensors, e.g., P (pressure fall), T (temperature), RH (room humidity) sensors, etc.

FIG. 5 illustrates an integration of the airborne bio-hazards purifier 600 of the invention with a traditional filter-based home air purifier 100, to form a unified air purifier 700. The bio-hazards purifier 600 has a configuration of any of the inventive structures of the invention described above, including at least the reactor R and its associated components. The main air blower $B_1$ of a traditional air purifier 100, built to remove airborne particles, sucks air from the room via inlet 610 and directs it towards filter F of the traditional purifier 100, which in turn captures the particles using its HEPA filters. Blower $B_2$ within the airborne bio-hazards purifier 600 of the invention sucks air from air-channel 610*a* into purifier 600 via the air channel 620, branching out from channel 610*a*. The air coming from branch 620 is then purified by reactor R in the manner described above. The air purified by reactor R is outputted into branch 620*b*, directed into the main channel 610*b*, and combined with the flow of purified air produced by the traditional purifier 100. The combined airflow returns double-purified air through air-channel 610*b* to the room. The two air purifiers 100 and 600 may be positioned within the same casing or in two separate casings. The structure presented in FIG. 5, therefore, enables the use of a relatively small air blower $B_2$ (for example, 100-1000 liters per minute) in the bio-hazards air purifier 600, utilizing the massive air blower $B_1$ of the traditional air purifier 100 (which typically produces an airflow of 1000-6000 liters per minute), for the distribution of the purified air to all parts of the room. Alternatively, the purifier of the invention may operate independently, while including an internal HEPA filter, as described below in the embodiment of FIGS. 16*a*-16*p*.

The airborne bio-hazards purifier of the invention was tested. The purifier of the invention significantly reduces the level of bio-hazards (such as viruses and bacteria) in the air and reduces other toxic gases, such as $CO_2$, CO, formaldehyde, etc.

FIG. 6 shows a mobile home air purifying system, according to another embodiment of the invention. The system includes a mobile air purifier 710, a docking station 712, a plurality of room sensing units 714, a home Wi-Fi router 716, and an optional application in a user's smartphone 720. Each sensing unit 714 is installed in a single room of the house, measuring the air contamination level within that room. The measured contamination level may relate to an undesired amount of any gas, particles, airborne bio-hazards, etc., and these levels of contaminants may either be measured directly or deduced indirectly based on any given conversion method. Each sensing unit reports, for example, via a Wi-Fi network, the level of contamination it measures to the docking station 712, which in turn collects these measurements, and compares them to one or more predefined thresholds. The docking station includes predefined rules for activating the mobile air purifier. These rules may apply to all rooms, or specific rules may apply to different rooms. The mobile purifier 710 includes a navigation system, enabling the purifier to automatically navigate to any of the rooms based on commands received from the docking station. For example, the docking station may convey a command to the mobile purifier to move to a bedroom, work there for 60 minutes, and then return to the docking station. Following the reception of such command, the mobile purifier automatically navigates to the specified room, operates for the prescribed duration, and returns autonomously to the docking station. The docking station may also define for the mobile air purifier any specific mode of operation and may also send commands to the purifier while in operation. The docking station may also serve as a recharger for the mobile purifier's 710 battery. The air purifier may include one or more types of purification units, such as, for example, one or more HEPA filters and the bio-hazards purification system of the invention as described above.

FIG. 7 shows an exemplary configuration of the system of FIG. 6 for the elimination or reduction of bio-hazards. The mobile air purifier 710 is preferably made as compact as practically possible. Therefore, mobile air purifier 710 may include a minimal amount of purification solution within a compact-size reservoir 738. The docking station may include one or more tanks for water and reagents A (MOH) and B ($H_2O_2$), for draining the purification reservoir 738, and refilling it from the tanks. In the exemplary configuration presented in FIG. 7, the docking station includes a filling tank 742 for water and a filling tank 744 for reagent A (MOH). Thanks to its small volume, tank 746 of reservoir B ($H_2O_2$) is entirely contained within the mobile purifier 710.

Periodically, or based on any other definition, the docking station 712 is activated to drain the existing liquid from reservoir 738 of the mobile air purifier into sewage tank 748, and refill reservoir 738 with new liquids (or solids, as is applicable) from tanks 742, 744, and 746 (in predetermined proportions). The docking station and the mobile air purifier include additional components, such as pumps, valves, etc., to perform these tasks. The mobile air purifier also includes a blower for circulating air into the reservoir (in the form of bubbles, as described) and release it into the room.

The components that are required for the navigation may be divided between the mobile purifier and the docking station in various possible configurations. In one embodiment, the mobile purifier 710 maintains a full navigation capability (i.e., map of the house, etc.). The docking station can indicate the targeted room, and based on this indication, the mobile purifier navigates autonomously to the targeted room. In another configuration, the navigation capabilities are maintained within the docking station 712, while it sends real-time direction commands, such as right, left, forward, backward, move, stop, etc., to the mobile purifier.

The system may also include a remote control (for example, user smartphone 720). The remote control may define various parameters of the system.

As noted, the system preferably utilizes the Wi-Fi router of the house for communication between all its components. Other types of wireless networks may be used. Moreover, a central computer, which may be separate from the docking station, may be utilized to receive sensors' data and send commands to the mobile device. In such a case, the docking station serves only as a recharging station for the mobile air purifier.

Figure 7:
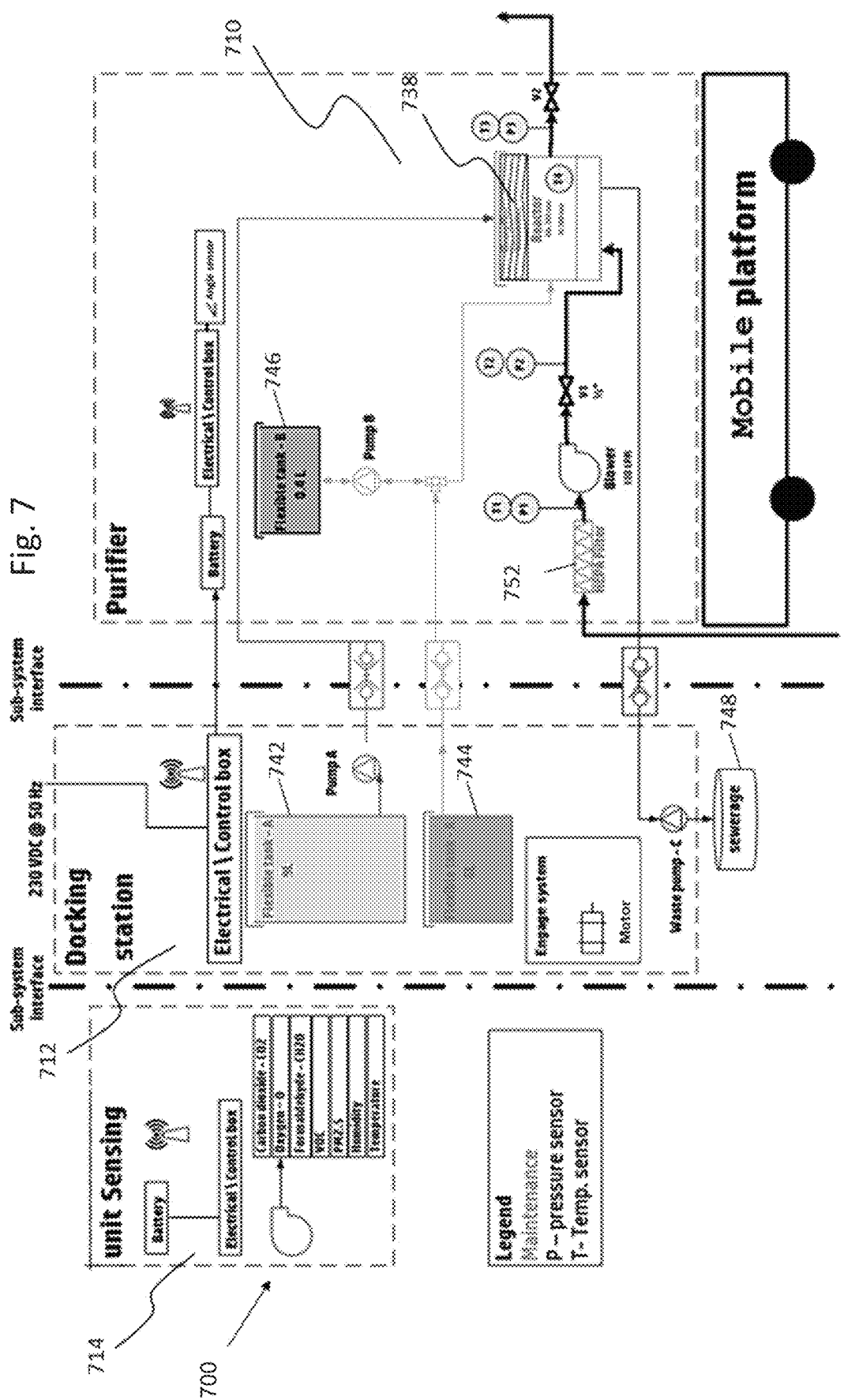

FIG. 7 shows a configuration that is specifically designed to purify airborne bio-hazards. This configuration also includes an optional HEPA filter 752. In other embodiments, the mobile purifier 710 may include only airborne bio-hazards purifying capabilities or only HEPA filters for eliminating solid particles from the air.

Figure 8:
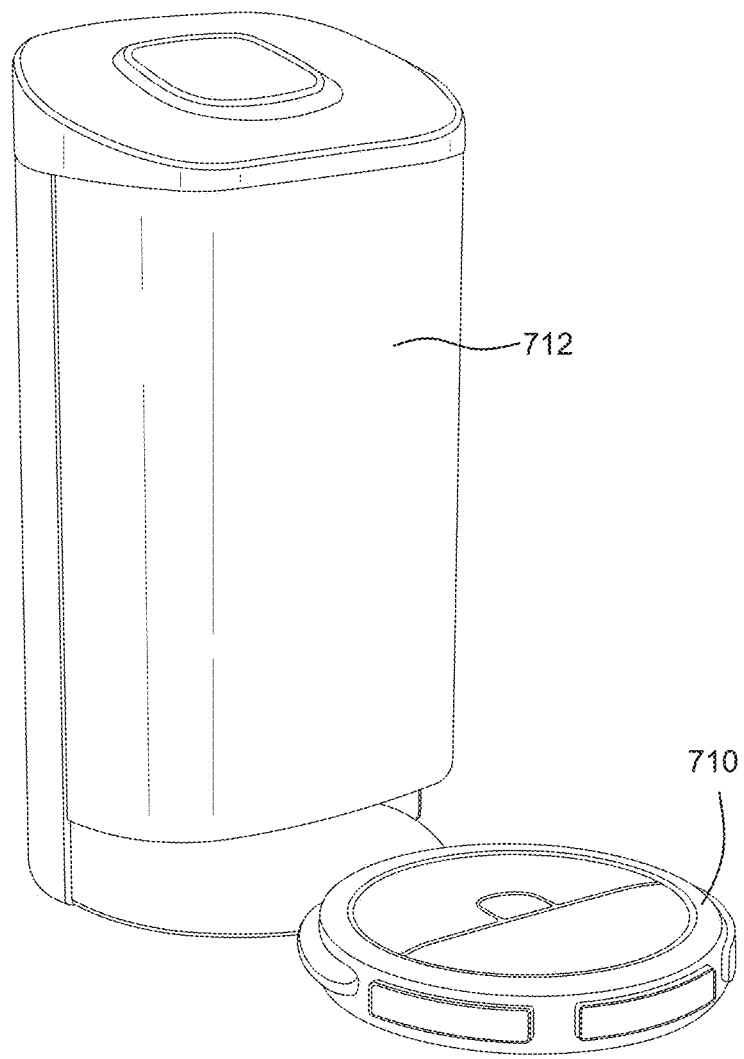

FIG. 8 shows an exemplary docking station 712 and a mobile purifier 710. The relative dimensions may vary.

Figure 16C:
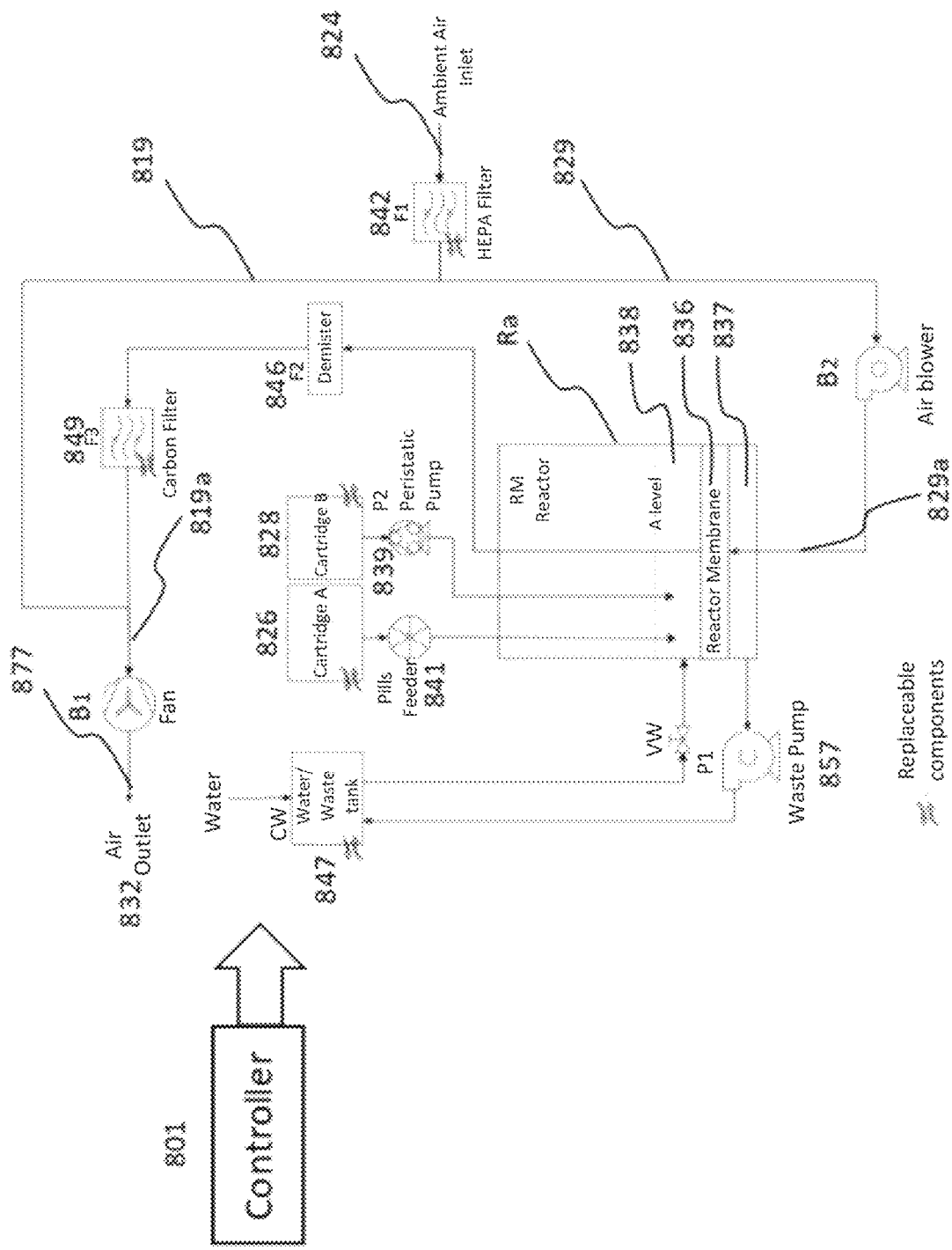

FIGS. 16a-16p illustrate a structure of a home-purifier 800, according to a third embodiment of the invention. FIGS. 16b and 16c are schematic diagrams. FIGS. 16h, 16i, and 16j provide partial illustrations, respectively, of the home-purifier. FIGS. 16e, 16f, and 16g provide cross-sectional views of the home-purifier. FIGS. 16k-16n describe the structure of the perforated membrane of the home-purifier 800, and FIGS. 16o and 16p describe the improved effect of bubble creation obtained by the perforated membrane of the invention compared to a conventional perforated membrane.

FIG. 16a shows the external shape of the home-purifier 800 (this external shape is provided as an example, for illustration only). FIG. 16b generally illustrates the operation of the reactor Ra of the home-purifier 800. The general structure and operation of reactor Ra are somewhat similar to the structure and operation of the bottom-fed prior art reactor R of FIG. 2 (similar references within the figures relate to similar elements)—the differences between the two reactors are elaborated below. However, while in reactor R of FIG. 2, the contaminated air inlet 224 is positioned at the bottom of the reactor, the respective air inlet 824 of reactor Ra is positioned at the top of the purifier. The contaminated air is received at top inlet 824 and conveyed downwards via air pipe 827 into a sump 837. Air pipe 827 arrives at the sump via a central opening at the perforated membrane 836. The contaminated air is pressurized within the sump, passing bottom-up through the perforated membrane 836, causing bubbles within the solution 838. The bubbles interact with the reservoir's liquid 838 and are enriched with oxygen. The oxygen-enriched air is then returned via a demister and carbon filter (not shown) to the room as purified air 877 via outlet 832.

Figure 5:
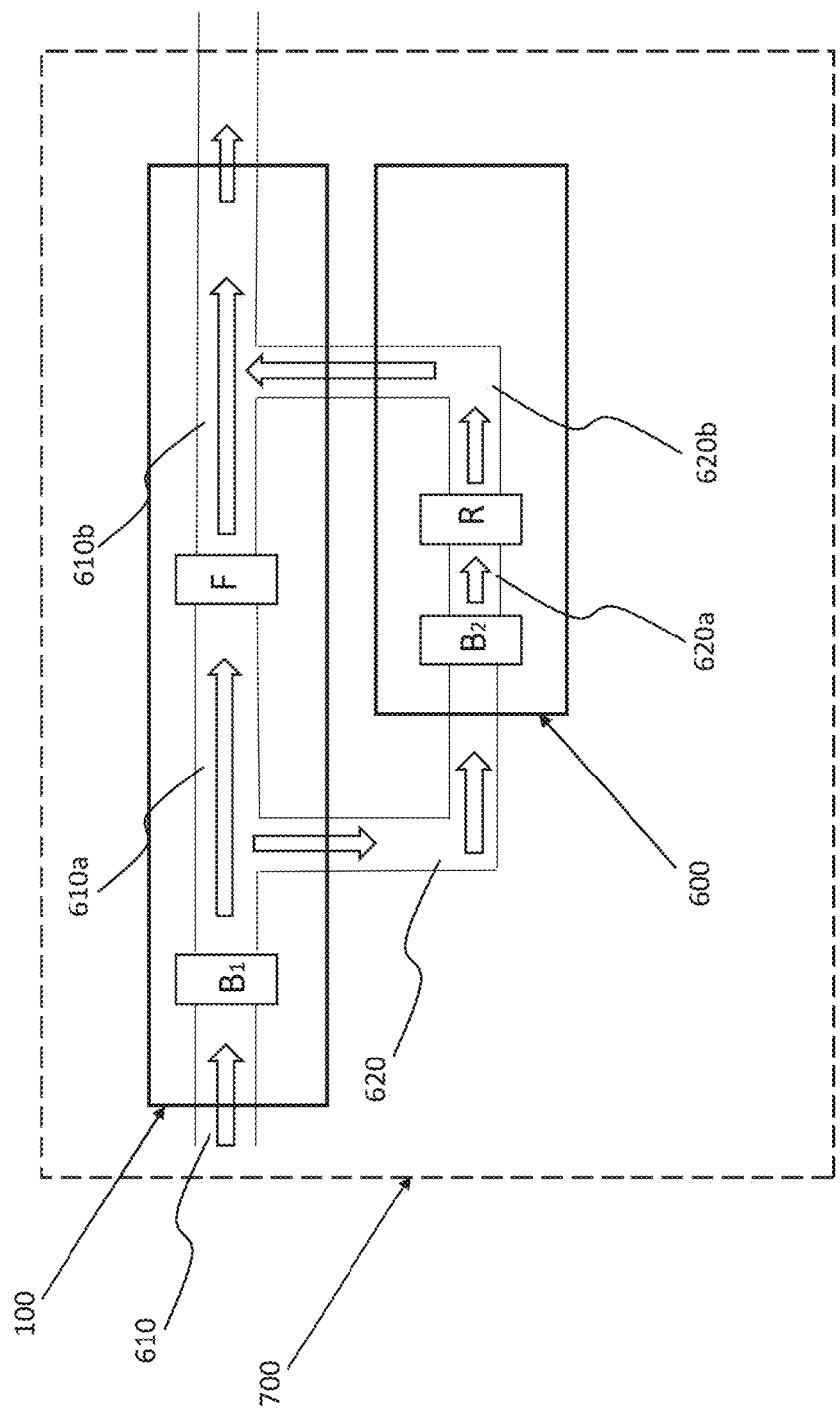
Figure 6:
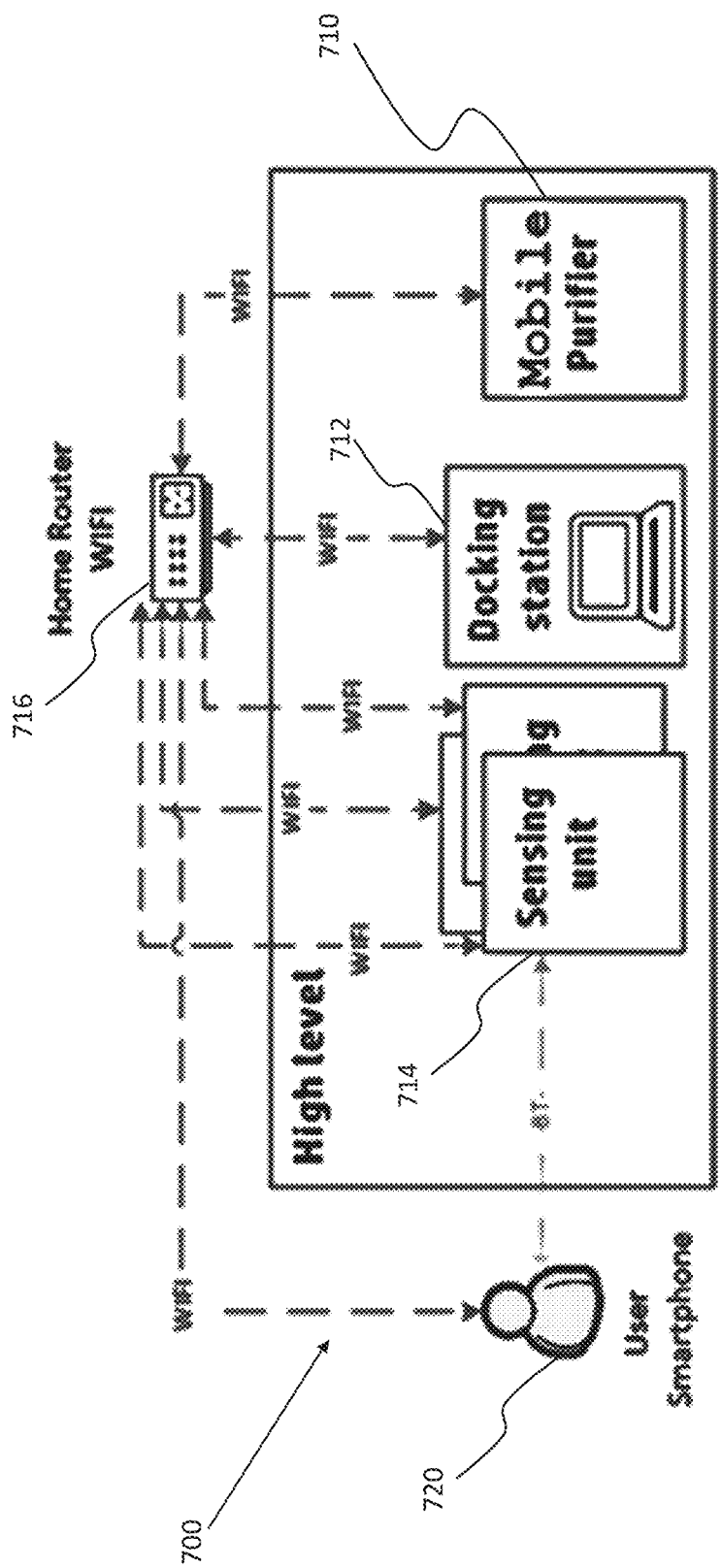

FIG. 16c schematically illustrates the structure of purifier 800. In similarity to the scheme of FIG. 5 (similar references relate to similar components), Blowers $B_1$ and $B_2$ simultaneously suck contaminated air from the room via inlet 824. After passing a Hepa filter 842, the airflow is divided into air channels 819 and 829, respectively. Air channel 819 returns Hepa-filtered air to the room in similarity to a conventional filtering device (via blower B1), while air channel 829 conveys air into reactor Ra (via blower B2) for purification. The contaminated air, which is top-to-bottom conveyed into sump 837 (see FIG. 16b), passes from the sump in an upward direction via the perforations of perforated membrane 836, creating bubbles within solution 838, performing purification following interaction between the bubbles and the solution (in a manner as described above). Solution 838 occupies a portion of the space of the reactor compartment (above the solution, there is a gas space). Following the purification, the purified air passes first through demister 846, which removes from the purified air residues of aerosol and droplets of the reactive liquid that the airflow may carry. From the outlet of demister 846, the purified air is conveyed to optional carbon filter 849, which removes smells from the air. From the outlet of the carbon filter, the purified airflow merges with the Hepa-filtered airflow 819 to form a unified airflow 819a, which is conveyed to the outlet 832 (i.e., back to the room). Cartridge A (alkali hydroxide, e.g., sodium or potassium hydroxide) is provided in a tablet form; each tablet is individually dropped into solution 838 by a tablets-feeder 841. A liquid (hydrogen peroxide) contained within cartridge B is fed into solution 838 utilizing (peristaltic) first pump 839. The feeding of the cartridges' contents into the solution may be performed, respectively, either periodically or every predefined period of the reactor operation. The purifier further includes a clean/waste water container 847. Initially, cleaned water is filled into container 847 and conveyed into reactor Ra to form solution 838. Periodically, or after a predefined period of operation, solution 838 is pumped utilizing second pump 857 into container 847 for removal from the device and solution refreshment. The Hepa filter 842, clean/waste water container 847, carbon filter 849, cartridge A 826, and cartridge B 828 are removable/replaceable components. The entire system is controlled by controller 801.

Figure 16D:
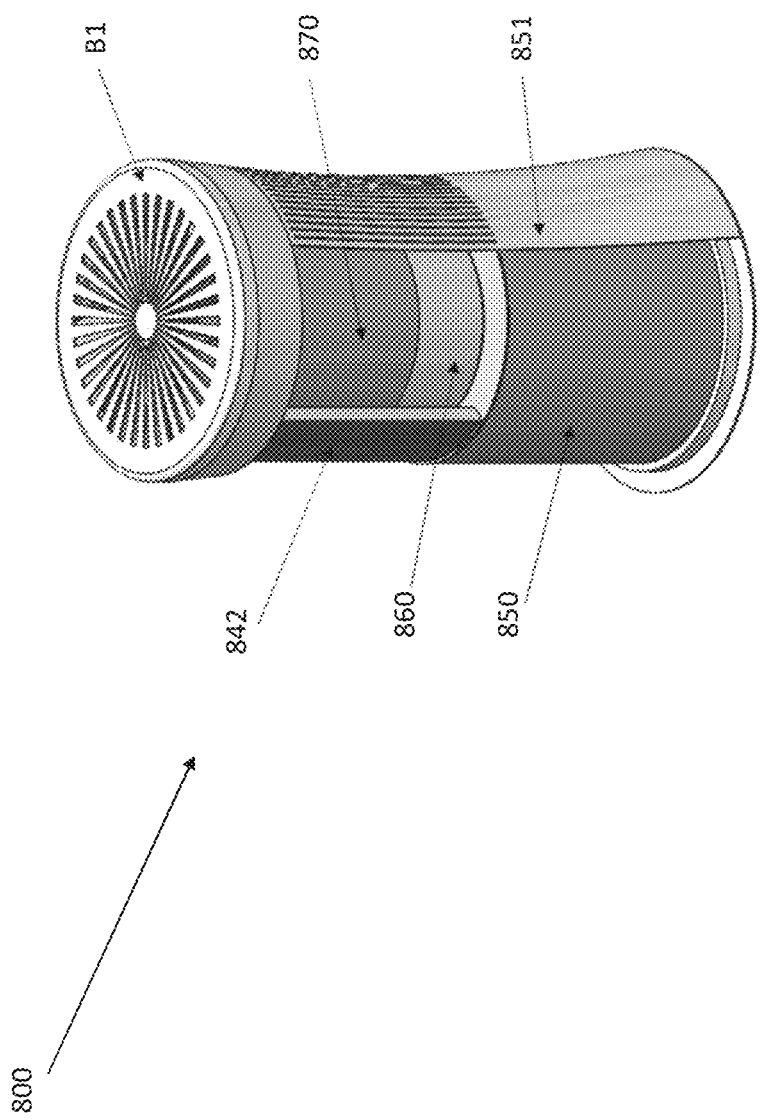
Figure 16E:
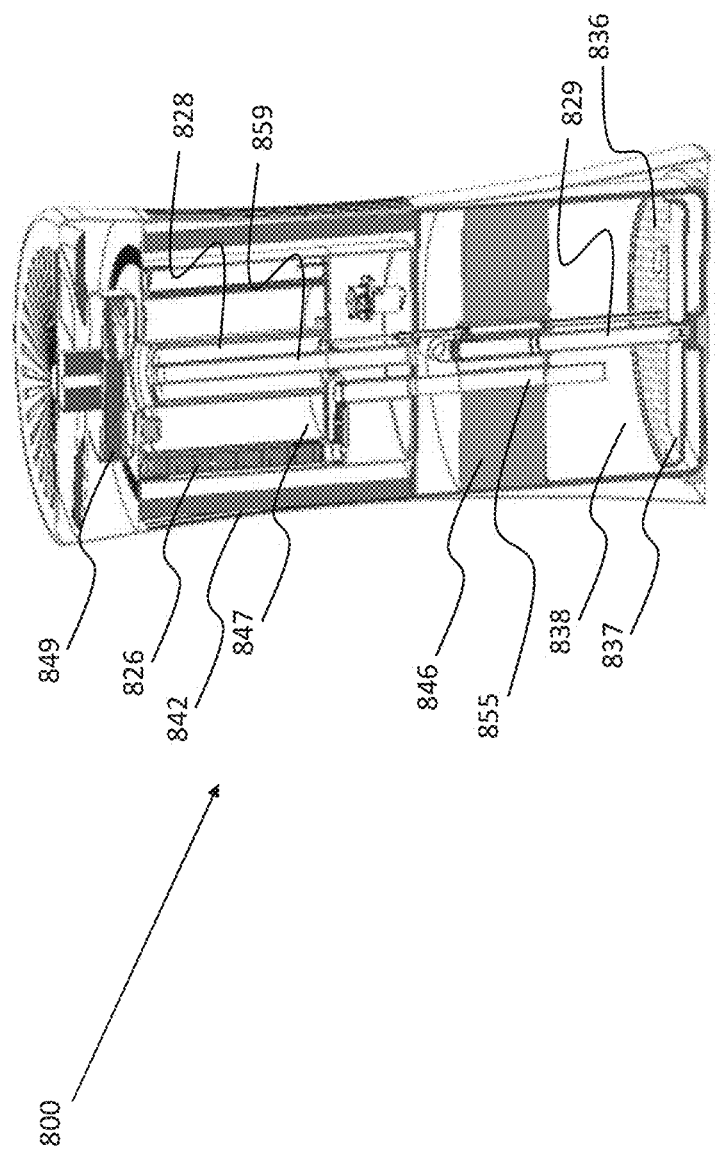
Figure 16F:
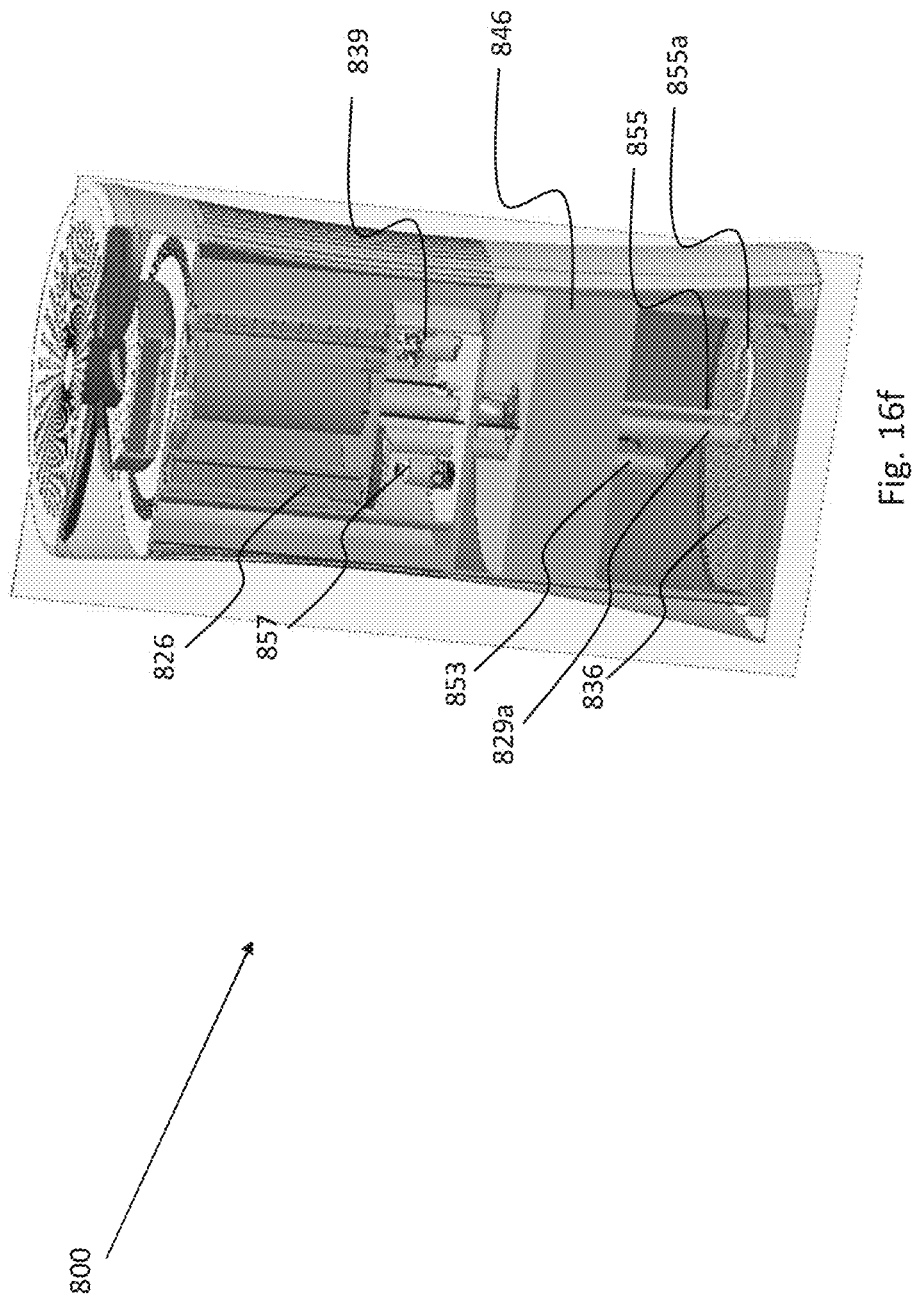
Figure 16H:
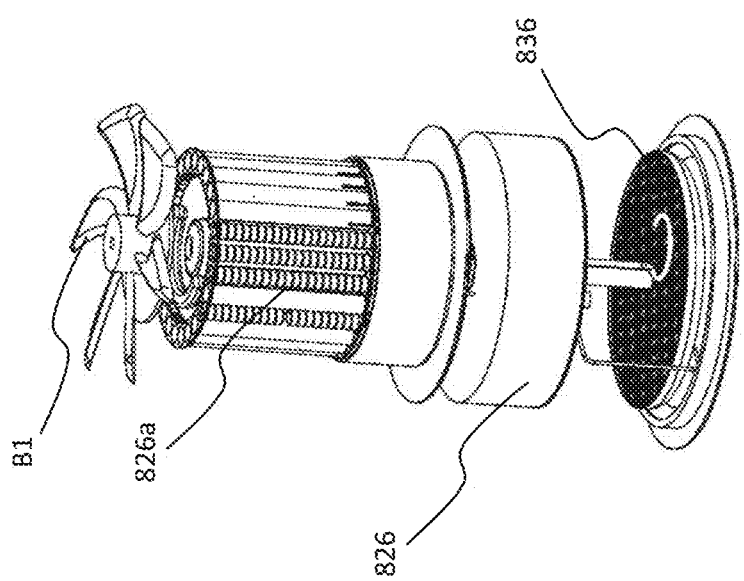
Figure 16J:
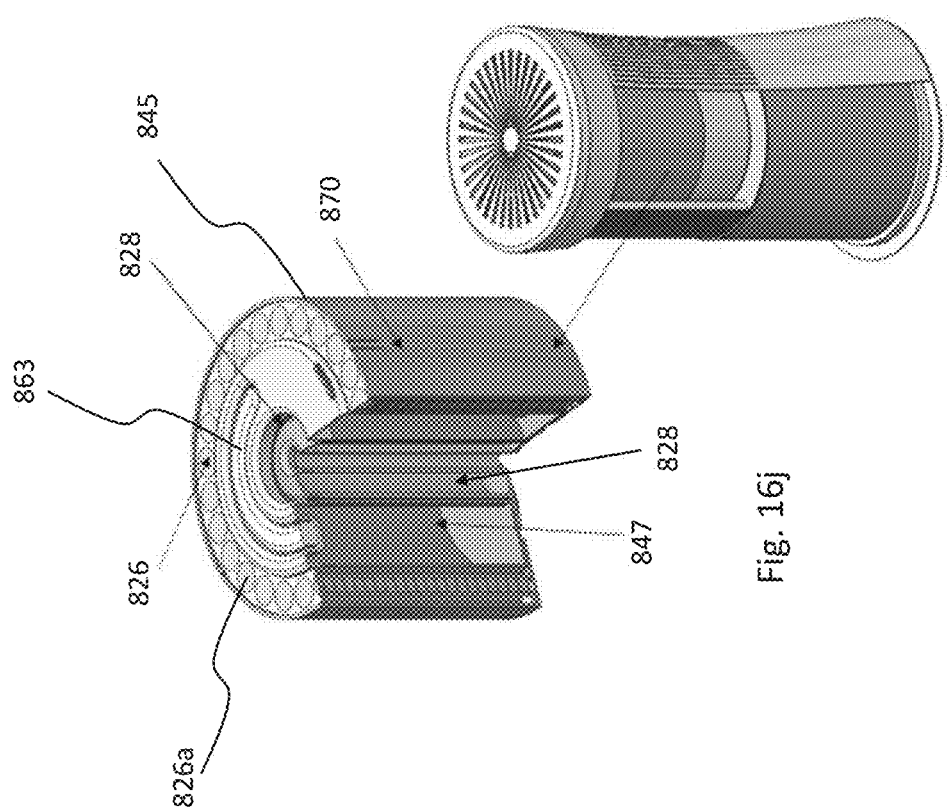

FIG. 16d shows the general assembly structure of purifier 800. The purifier generally has a cylindrical configuration, and it includes (from bottom to top) a reactor unit 850, operational unit 860, and storage unit 870. Also shown are Hepa filter 842, main blower B1, and cover 851.

Reference is now made particularly to FIGS. 16e, 16h, and 16j. The storage unit 870 is removable, containing the solution ingredients, such as (a) tap water, (b) alkali hydroxide (potassium hydroxide or sodium hydroxide, respectively) in a solid form (or otherwise), and (c) $H_2O_2$ (hydrogen peroxide) in liquid form. The storage unit (in this specific example) includes 3 concentric containers, as follows: Cartridge A container 826 for the alkali hydroxide (NaOH, KOH or both, (in a tablet form), water container 847, and $H_2O_2$ container (cartridge B) 828. Cartridge A is divided into a plurality of column cylinders 826a, each containing a plurality of tablets. In an embodiment of the invention, the plurality of hollowed column cylinders 826a are arranged in a revolving drum 826. To add a tablet to solution 838, a motor (not shown) rotates the drum 845 to angularly position a tablets' column 626a above opening 859 (best shown in FIG. 16g), permitting one tablet to fall into solution 838 gravitationally. The structure of the reactor is shown mainly in FIGS. 16e, 16f, and 16i, and the structure of the perforated membrane 836 is shown mainly in FIGS. 16k, 16l, and 16n.

For example, the weight of each tablet may be about 5 to 100 g, e.g., from 15 to 30 g, and 2 to 100 tablets may be included within cartridge 826. The water container may contain 1 to 10, e.g., 2 to 6 liters, and the hydrogen peroxide container may include between 250 ml and 10 liter. Initially, the user removes the storage unit using handle 863 and fills it with the solution ingredients. Upon filling the water container with tap water, and filling cartridges A 826 and B 828 with tablets and liquid, respectively, and remounting the storage unit at the purifier, the device is ready for operation. The water is poured down to the reactor via pipe 853, and one tablet (or more, if necessary) is dropped down to the solution via opening (and respective pipe) 859. A dose of the hydrogen peroxide is conveyed periodically into proximity of the perforated membrane utilizing pump 839, pipe 855 (one or more pipes may be used), and respective perforations (not shown) on tube 855a (FIG. 16f). It has been found that supplying the hydrogen peroxide near the outlets of the membrane-perforations 836a is preferable, as it significantly reduces, even eliminates clogging of the membrane perforations due to carbonates that accumulate in the solution during the process. Membrane 836 is positioned slightly above the bottom-internal surface of the device, creating a sump 837 (see FIGS. 16b and 16e) below the membrane. The contaminated airflow, as sucked from the room by blower B2 (FIG. 16c is conveyed via intake pipe 829, arriving at sump 837 via central opening 836b of membrane 836.

During the process, air from the sump penetrates solution 838 via the membrane's 836 perforations, creating bubbles that interact with the solution as described above. The bubbles leave the solution as a purified air. The purified air passes through demister 846, which removes from the purified air residues of aerosol and droplets of the reactive liquid that the airflow may carry. The outlet of the demister includes a funnel (not shown), which is connected to a pipe (not shown) leading to the carbon filter 849.

After some period of operation, the effectiveness of solution 838 reduces to a degree requiring entire replacement by fresh water and ingredients from cartridges A and B, respectively. When such a necessity arose, pump 857 pumps and conveys the entire liquid content of compartment 820 (FIG. 16b) to the waste/clean water container 847. The "waste" liquid is typically rich in potassium carbonate (not a hazardous material). The user may then remove the storage unit 870 and may either: (a) use the "waste" liquid to fertilize his garden; (b) pour the liquid into the sewerage; or (c) return the liquid to the ingredients' supplier for further processing.

The inventions' process is optimized when as small as possible and as many as possible bubbles are simultaneously created. This configuration maximizes the overall interaction surface between the bubbles and solution 838. However, it has been found that a membrane with too close perforations results in vast merges of proximate bubbles, as illustrated in the prior art membrane 896 of FIG. 16o. The inventors have found that the difficulty that individual bubbles face (in prior art membranes) when trying to separate from the membrane top facet towards the solution increases the size of the bubbles, leading to a merge between proximate bubbles. This delay of separation increases the size of individual bubbles to a situation where proximate bubbles merge.

FIG. 16n shows a cross-section of membrane 836, resolving the above problem of the merge between bubbles. In contrast to a cylindrical perforation' cross-section, as existing in typical membranes, each perforation of the invention's membrane includes two sections, a lower cylindrical section 836c and an upper frustoconical section 836d expanding towards the top surface of the membrane. More specifically, the bottom-to-top airflow first faces a small-diameter cylindrical perforation, and then the perforation diameter expands towards the top surface of the membrane. Such a perforation configuration eases the separation of each bubble from the perforation, thereby significantly reduces merges between bubbles for a given perforation-dimension and perforations density. FIG. 16p illustrates such an improved result compared to the cylindrical configuration of FIG. 16o. As shown, in the cylindrical configuration of FIG. 16o, proximate bubbles 836g tend to merge before their release to the solution. On the contrary to the cylindrical configuration of FIG. 16o, in the combined cylindrical-frustoconical configuration of FIG. 16p, the occurrence of merges between bubbles 936g is reduced, even eliminated.

Figure 16M:
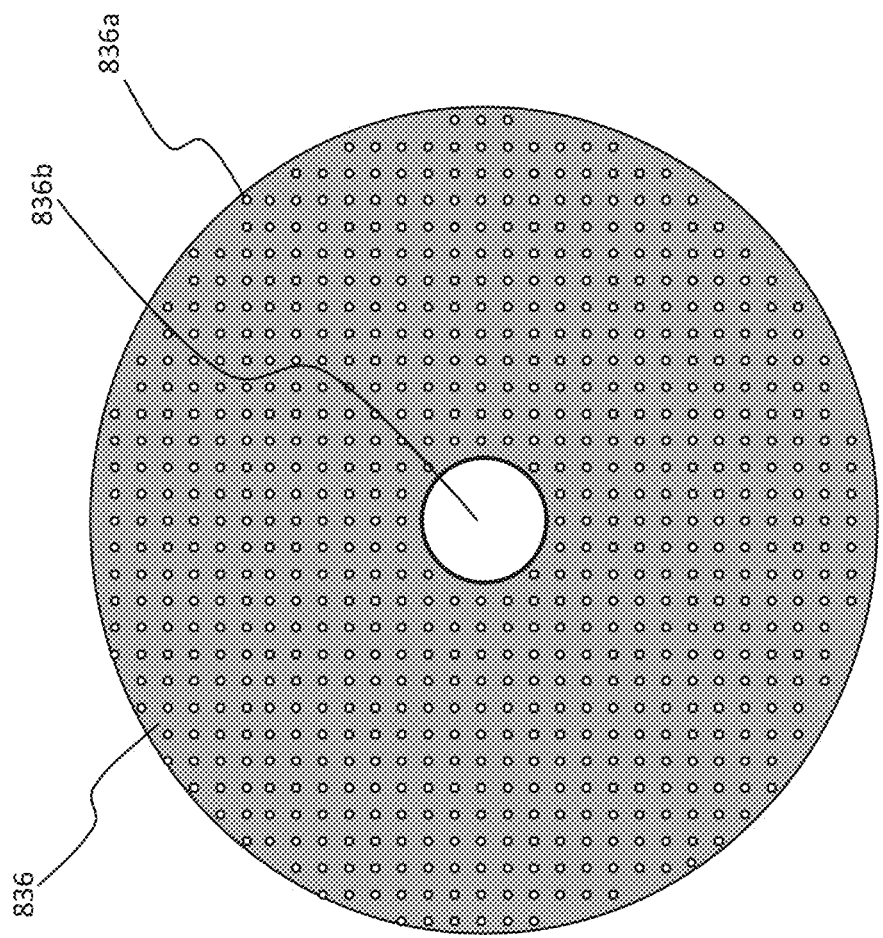

In some cases, the height of the lower cylindrical section of the perforation is reduced (compared to the upper conical section's height). In some other cases, the lower cylindrical section of the perforation may be eliminated, resulting in a truncated cone cross-section. FIG. 16k shows a top view of membrane 836, FIG. 16l shows the membrane in perspective view, and FIG. 16m shows a bottom view of the membrane. As can be seen, each perforation at the bottom side of the membrane has a smaller diameter compared to its respective diameter at the top side. For example, the diameter at the bottom surface of the membrane may be between 0.08-1 mm. The perforation's diameter at the top surface may be 1.3 to 2.0 larger than the bottom diameter. The distance between individual perforations is in the range of 2-50 of the perforation's diameter at the upper surface of the membrane. The above-described flat perforated membrane, with the combined geometry of perforation shaped as cylindrical sections joining frustoconical sections, forms another aspect of the invention. It can be produced by 3D printing.

Purifier 800 may be stationary, mobile (in similarity to embodiment 700), or manually carried from one room to another.

Figure 18A:
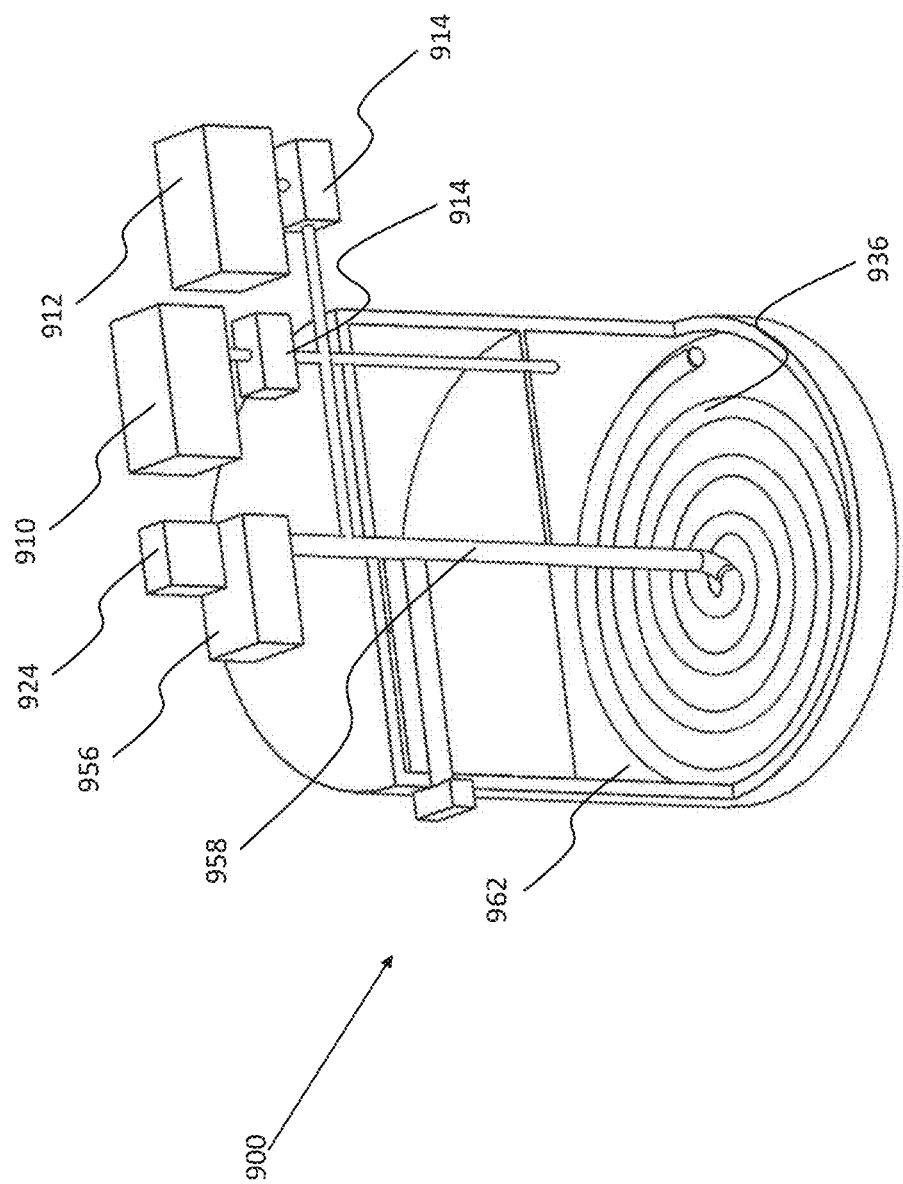
Figure 18B:
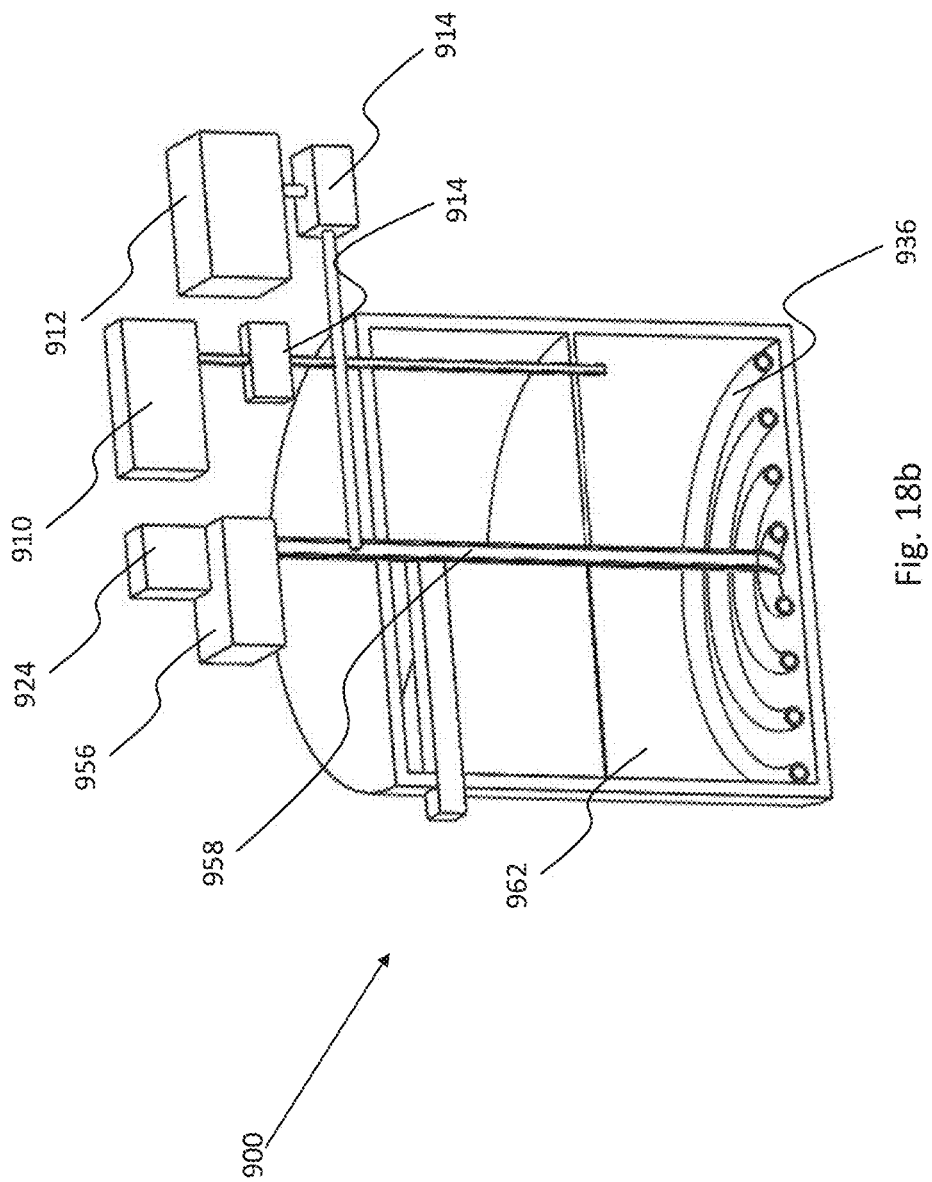
Figure 18D:
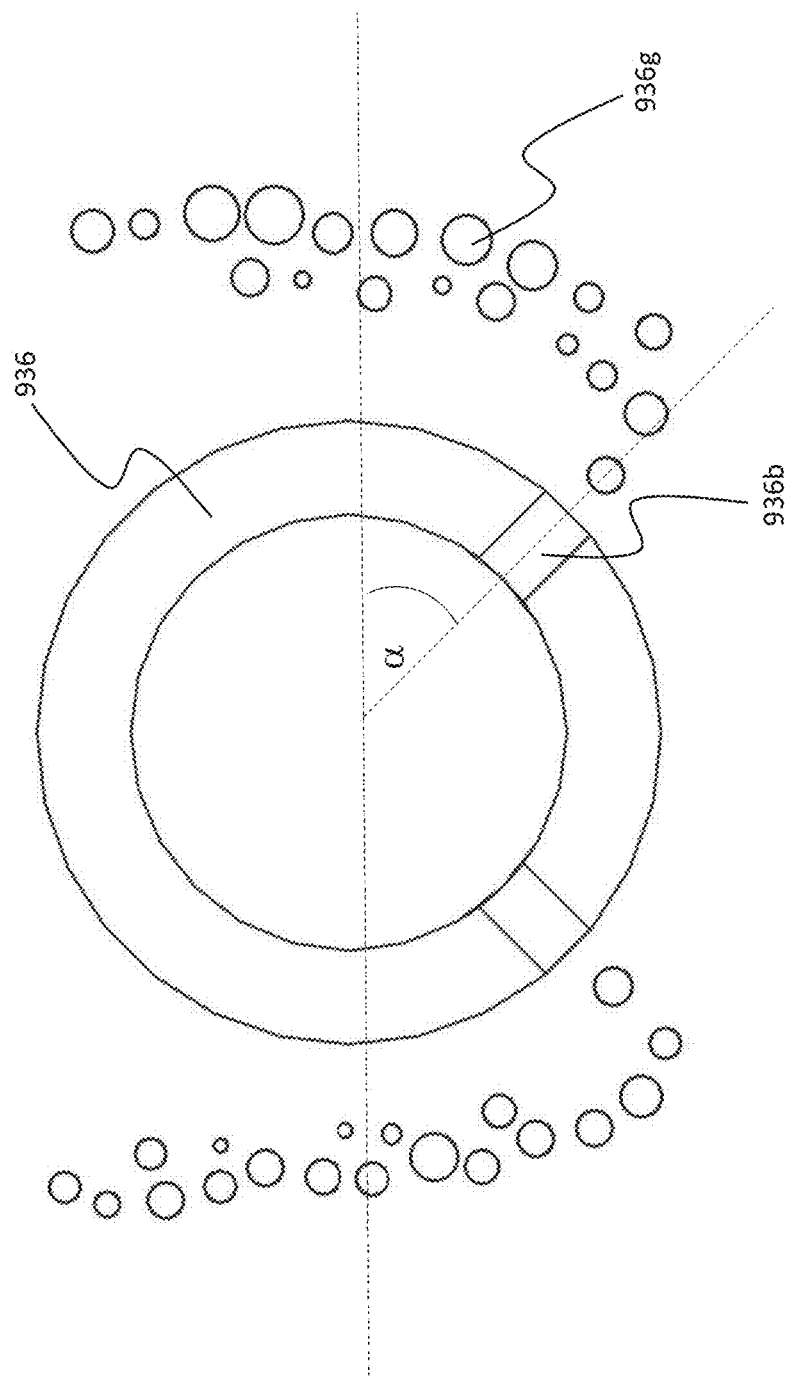

FIGS. 18a-18d show a fourth purifier embodiment 900 of the invention. This embodiment is somewhat similar to the embodiment of FIG. 4, where similar references within figures respectively refer to similar elements. For the sake of brevity, those similar elements and functionalities are repeated herein. In similarity to the embodiment of FIG. 4, contaminated air is fed via inlet 924 into inlet air channel 958. The inlet air channel leads into horizontally-disposed spiral perforated tubing 936, positioned proximate to the bottom of the liquid reservoir compartment 962, however, somewhat spaced apart from the bottom of the reservoir. The perforations 936b along the spiral tubing 936 have a diameter in the range from, e.g., 0.08 mm to 1.0 mm and distance between individual perforations in the range of 2-50 of the perforations diameter. FIGS. 18c and 18d show a cross-section of one tube of perforated spiral tubing 936. The perforations 936b are located along the periphery of the tube in cross-section at an angle $\alpha$ typically greater than 30° downwards relative to the horizontal. As a result of this arrangement, the bubbles are "injected" from the spiral tubing 936 to the solution in a downwards direction. Therefore, before going upwards towards the top surface of the solution, each bubble 936g first goes downwards. This arrangement, therefore, increases the route and respective interaction period between each bubble and the solution, before the bubble is released from the solution. In such a manner, the purification efficiency of the reactor is improved, and this feature is particularly important in a home purifier having small dimensions and a limited amount of a purifying solution.

Another aspect of the invention involves modifying the indoor air treatment program offered by the MOH/$H_2O_2$ reactor described above, by incorporating a $CO_2$ adsorption scrubber upstream of the MOH/$H_2O_2$ reactor. A battery consisting of $CO_2$ adsorption scrubber and MOH/$H_2O_2$ reactor offers greater versatility in coping with changes in $CO_2$ levels in the room, and better management of alkali hydroxide and hydrogen peroxide feed supply to the reactor, because the battery can switch between different modes of operation, depending chiefly on factors such as $CO_2$ level in the room and presence of occupants in the room. The $CO_2$ adsorption scrubber and MOH/$H_2O_2$ reactor may be designed to operate with airflows supplied at different volumetric rates (high and low, respectively).

Reduction of $CO_2$ levels in indoor air can be achieved in different ways using a battery consisting of $CO_2$ adsorption scrubber and MOH/$H_2O_2$ reactor:

1) by the action of adsorption scrubber alone: indoor air is passed through the scrubber; $CO_2$ is captured and held for some time in the scrubber. During that period of time, air with improved quality is supplied to the room from the scrubber. The scrubber is discharged by releasing $CO_2$ to the room, e.g., overnight.
2) by the action of MOH/$H_2O_2$ reactor alone: indoor air is guided directly to the MOH/$H_2O_2$ reactor, bypassing the adsorption scrubber; $CO_2$ is transformed into harmless carbonate/bicarbonate salts; air with improved quality is supplied to the room from the reactor.
3) by a combined mode of operation: indoor air flows through the scrubber over a period of time during which the MOH/$H_2O_2$ reactor is at rest. $CO_2$ is captured and held in the scrubber but after a while the MOH/$H_2O_2$ reactor enters into service such that $CO_2$ discharged from the scrubber is directed to, and mineralized in, the MOH/$H_2O_2$ reactor.

Accordingly, one aspect of the invention relates to the combined mode of operation outlined above, i.e., by capturing and holding $CO_2$ is an adsorption scrubber, and after a while, discharging the $CO_2$ from the scrubber and mineralizing the $CO_2$ in the MOH/$H_2O_2$ solution, i.e., to a method of improving indoor air quality, comprising:

providing airflow through $CO_2$ adsorption scrubber over a first period of time to capture $CO_2$ by an adsorbent in the scrubber while reintroducing $CO_2$-depleted air from the scrubber into a room; desorbing $CO_2$ from the adsorbent during a second period of time (for example, by heating the adsorption scrubber to reach desorption temperature) while guiding air laden with the desorbed $CO_2$ from the scrubber into a gas/liquid contactor charged with aqueous alkali hydroxide/$H_2O_2$ solution, passing the $CO_2$-laden air through a perforated membrane installed in the gas/liquid contactor below the surface level of the aqueous alkali hydroxide/$H_2O_2$ solution, such that bubbles produced travel through said solution, and getting treated air with reduced $CO_2$ level from said gas/liquid contactor.

Another aspect of the invention is an air purifier based on a battery consisting of $CO_2$ adsorption scrubber and MOH/$H_2O_2$ reactor, which can improve indoor air quality by the three options set out above. In its most general form, the air purifier comprises:

a device used to move air, e.g., a blower or a fan, for supplying continuous air flow through the air purifier;
$CO_2$ adsorption scrubber;
a gas/liquid contactor located downstream of the scrubber;
an outlet pipe to release air from the air purifier to the room; a first airflow line connecting the blower or the fan, to the outlet pipe, configured to direct incoming air stream to the adsorption scrubber, and outgoing air stream from the scrubber to the outlet pipe;
a second air flow line connecting the blower or the fan to the outlet pipe, configured to direct incoming air stream to the gas/liquid contactor, and outgoing air stream from the gas/liquid contactor to the outlet pipe; and
a third air flow line connecting the blower or the fan to the outlet pipe, configured to direct incoming air stream to the adsorption scrubber, and outgoing air stream from the scrubber to the gas/liquid contactor;
an array of valves to guide the moving air through said first, second or third air flow lines;
and optionally a heater positioned downstream to the adsorption scrubber.

Figure 20:
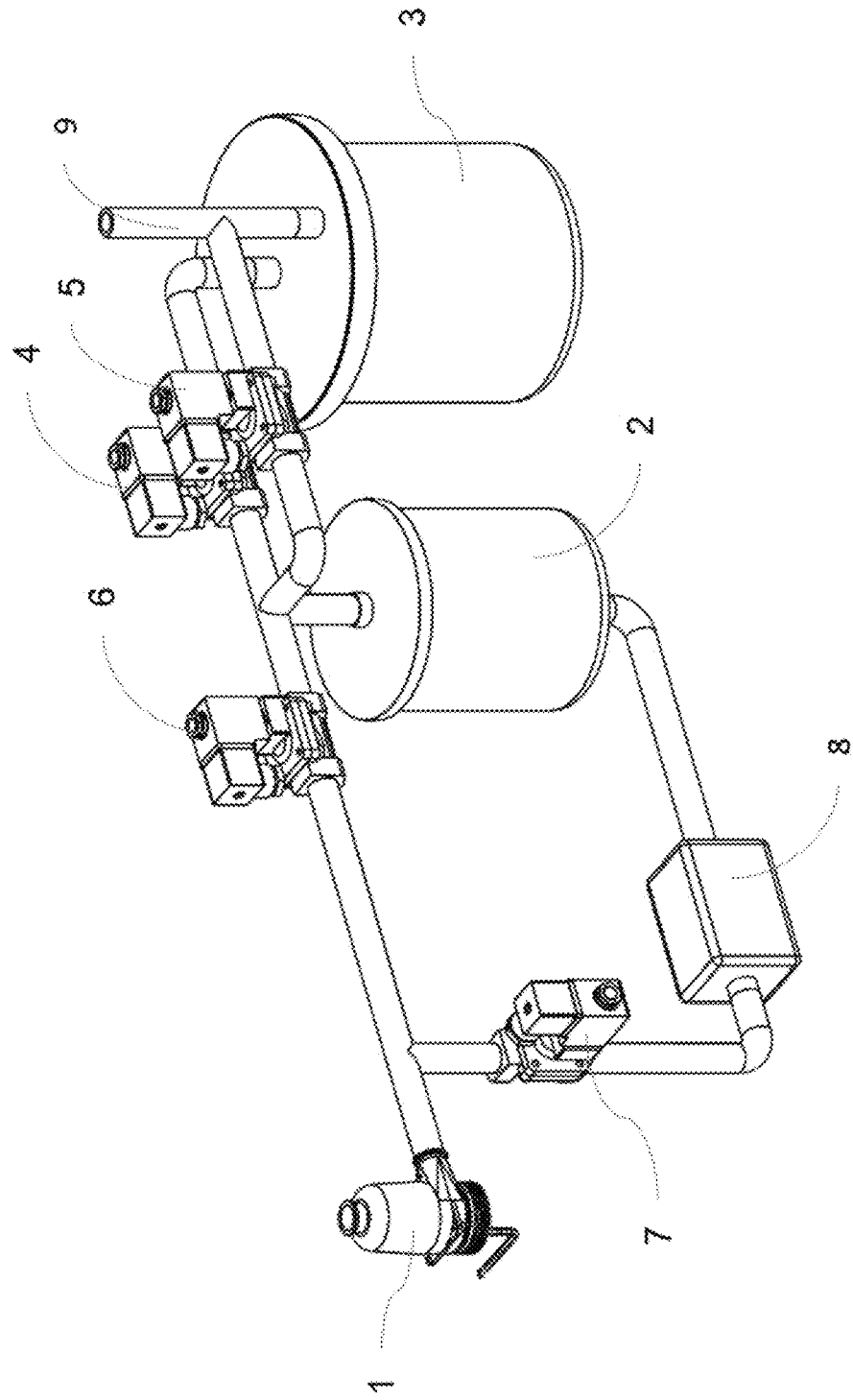

FIG. 20 shows a preferred design of an air purifier of the invention. The method of operation will be described in reference to FIG. 21, which shows the same elements of FIG. 20.

A blower (1) provides airflow through the air purifier, capable of supplying volumetric flow rate of 100-2000 litre/min, adjusted to fit the selected mode of operation, as explained below. The airflow moves via, e.g., 15-50 mm diameter conduits installed in the air purifier, and is directed to the air outlet (9) via a path regulated by the states of valves (4), (5), (6) and (7), i.e., after the airflow was passed through the adsorption scrubber (2) or the gas/liquid contactor (3).

$CO_2$ adsorption scrubbers (2) suitable for use in the invention exist in the marketplace, utilizing physisorption or chemisorption-based sorbents. A simple design is of a fixed-bed scrubber, usually a vertical cylindrical fixed-bed scrubber, as shown in FIG. 20. The fixed bed is based of material(s) known to adsorb $CO_2$, e.g., materials possessing high specific surface area and porous structure, such as activated carbon [including activated carbon which was surface-modified to incorporate functional groups with basic character, that is, nitrogen-containing functionalities, as described in Journal of Analytical and Applied Pyrolysis 89 (2010), p. 143-151)], carbon fibres, zeolites, molecular sieves, metal organic frameworks, highly porous polymers and amine-incorporated clay minerals, used in a granular or pellet forms (e.g., mm size), supported on grids and sometimes covered by a mesh, e.g., single or multilayer structure.

The air purifier may include a heating unit (8) positioned downstream to $CO_2$ adsorption scrubber (2), in the form of a convection heater in which an electric heating coil is installed, operating at 100-3000 watt. To goal served by heating unit (8) is to enable $CO_2$ adsorption scrubber (2) to switch from adsorption to desorption, i.e., to regenerate the sorbent material after it reached saturation or nearly saturation, by passing heated air through the scrubber. Rise in temperature causes $CO_2$ molecules to detach from the sorbent surface. In the embodiment of the invention shown in FIG. 21, a single supply line is used to direct incoming air from blower (1) to the adsorption scrubber (2), with heater (8) being positioned on that line. However, a subsidiary pipe may be installed, creating a separate path for the heated airflow for the desorption/regeneration phase, controlled by an additional two-way valve (not shown). But anyhow, heating unit (8) positioned externally to scrubber (2) is not at all mandatory as some adsorption scrubbers are fitted with suitable means to elevate the temperature in the adsorption scrubber, to switch to desorption mode. Also, more sophisticated designs based on moving bed or rotating bed configurations, as shown in US 2021/025451, can be used.

HEPA filter (not shown) is placed downstream to blower (1) or upstream to air outlet (9). Whereas blower (1), $CO_2$ adsorption scrubber (2) and heating element (8) are fairly conventional, the gas/liquid contactor (3) has unique configuration which was described in detail above.

FIGS. 2 and 16B schematically illustrate the key components and features associated with the gas/liquid contactor (3). The major difference between the configurations shown in FIGS. 2 and 16B resides in the positions of the air inlet and air outlet and hence the direction of the airflow through the gas/liquid contactor (upward versus downward air flow in FIGS. 2 and 16b, respectively).

Perforated membrane is mounted at the lower part of the reactor, below the surface level of the $MOH/H_2O_2$ aqueous solution. One useful design of the perforated membrane is shown in FIGS. 16k-16p.

FIG. 16k shows a top view of membrane and holes, FIG. 16l shows the membrane in perspective view, and FIG. 16m shows a bottom view of the membrane. As can be seen, each perforation at the bottom side of the membrane has a smaller diameter compared to its respective diameter at the top side. For example, the diameter at the bottom surface of the membrane may be between 0.08 and 1 mm. The perforation's diameter at the top surface may be 1.3 to 2.0 times larger than the bottom diameter. The distance between individual perforations is in the range of ½ to 1/50 relative to diameter of the perforation at the upper surface of the membrane. The role of central opening is explained below.

The unique geometrical motifs of membrane (836) and their useful effect are perhaps better illustrated in FIGS. 16n, 16o and 16p. FIG. 16n shows a cross-section of membrane (836); rather than having cylindrical cross-section with constant diameter across the membrane thickness, like in typical membranes, each perforation in membrane (836) consists of two sections, a lower cylindrical section (836b) and an upper frustoconical section (836d) expanding towards the top surface of the membrane. More specifically, the bottom-to-top airflow first faces a small-diameter cylindrical perforation, and then the perforation diameter expands towards the top surface of the membrane. Such a perforation configuration facilitates the departure of bubbles (836g) from the perforation, and significantly reduces merges between adjacent bubbles for a given perforation-dimension and perforations density. FIG. 16p illustrates such an improved result achieved thanks to the combined cylindrical-frustoconical configuration, that is, occurrence of merges between bubbles is reduced, even eliminated.

Turning back to FIGS. 2 and 16b, a vertical cylindrical gas/liquid contactor (3) is provided with horizontally-mounted membrane (836). As shown by the schematic illustrations of FIGS. 2 and 16b, the $MOH/H_2O_2$ solution is supplied by a water tank, a $H_2O_2$ solution tank (826), and MOH (828). For example, an aqueous alkali hydroxide/$H_2O_2$ solution is supplied to the gas/liquid contactor either by feeding an alkali hydroxide solution prepared beforehand, or by dissolving solid alkali hydroxide (e.g., in a tablet or granular form) in water supplied separately to the gas/liquid contactor, with continuous or periodic addition of hydrogen peroxide solution to the alkali hydroxide solution. There are benefits to using solid forms of alkali hydroxide and some setups to enable the addition of MOH tablets into the aqueous solution, e.g., with the aid of MOH tablet cartridge mounted in the gas/liquid contactor, are described below. Controller (834) is connected to one or more sensors, e.g., a pH sensor and fluid level sensor to measure the level of solution (838), to control feeding rates of the reagents, etc.

In the variant of FIG. 2, air inlet (224) and air outlet (232) are placed at the bottom and top sections of the gas/liquid contactor, respectively; a different arrangement is seen in FIG. 16b, where both gas inlet (824) and gas outlet (832) are placed at the top section of the reactor. In FIG. 16b, $CO_2$-laden air enters gas/liquid contactor via top inlet (824) and is moved downwards through pipe (827) into a sump (837). Air pipe (827) arrives at sump (837) via a central opening (836d) at perforated membrane (836), which is best seen in FIGS. 16k-16m. The incoming air is pressurized within the sump, passing bottom-up through the perforated membrane (836), creating bubbles (822) within the solution (838). The bubbles interact with the $MOH/H_2O_2$ reagent and are enriched with oxygen. The oxygen-enriched air is then returned via a demister and carbon filter (not shown) to the room via outlet (832).

FIGS. 16d, 16e and 16j show the incorporation of a water tank, $H_2O_2$ tank and MOH tablets' cartridge into a gas/liquid contactor (800) possessing essentially cylindrical symmetry. It is seen that it is partitioned into a lower portion (850) and an upper portion (870). The lower portion of the gas/liquid contactor (800) is a gas/liquid contacting unit (850) as previously described, i.e., the reaction zone in which $CO_2$ mixes with the $MOH/H_2O_2$ solution to undergo mineralization, with membrane (836) installed at the bottom and downwardly extending pipe (829) arriving at sump (837) via central opening located in membrane (836), have already been described.

The upper portion of the gas/liquid contactor (870) consists of a storage unit which includes three concentric containers, as follows: Cartridge A container (826) for the alkali hydroxide (NaOH, KOH or both, (in a tablet form), water container (847), and $H_2O_2$ container (cartridge B) (828). Cartridge A is divided into a plurality of column cylinders (826a), each containing a plurality of tablets. In an embodiment of the invention, the plurality of column cylinders (826a) are arranged in a revolving drum (845). To add MOH tablet to the reaction zone, a motor (not shown) rotates the drum 845 to angularly position a tablets' column (826a) above opening accessing the reaction zone, enabling one or more tablet(s) to fall into the reaction zone (850). Hydrogen peroxide is supplied using a pump, via pipe (828p), below the level of the solution (838). Demister (846) is also included.

For example, the weight of each tablet may be about 5 to 100 g, e.g., from 15 to 30 g, and 2 to 100 tablets may be included within cartridge (826a). The water container may contain 1 to 10, e.g., 2 to 6 liters, and the hydrogen peroxide container may include between 250 ml and 10 liter.

Turning back to FIG. 21 to describe the operation of the air purifier, there are in fact three major alternatives.

According to the first mode of operation, blower (1) supplies airflow through $CO_2$ adsorption scrubber (2) and moves depleted-$CO_2$ airflow which exists the scrubber via air outlet (9) to be reintroduced into the room, by keeping two-way valves (7) and (5) open and two-way valves (6) and (4) closed. The air purifier switches to such mode of operation in response to detecting increased $CO_2$ levels in the room, or is programmed to operate likewise during time periods at which relatively high $CO_2$ levels are anticipated, e.g., when a large number of attendees is expected, such as when a meeting takes place in the room. Because only the $CO_2$ adsorption scrubber is at service while the gas/liquid is disconnected, the air purifier can operate with the blower (1) supplying airflow at a fairly high volumetric flow rate, over short time periods, i.e., a couple of hours or so. When the sorbent material becomes saturated, or after the people (e.g., workers, meeting participants) have left the room, the scrubber regeneration phase may start, e.g., heating unit (8) is turned on so as to feed the scrubber with hot air and release air laden with $CO_2$ through air outlet (9). It is noted that this mode of operation largely deals with peak $CO_2$ levels in the room, to produce and constantly reintroduce $CO_2$-depleted airflow to the room when it occupied by people, without chemically eliminating the $CO_2$ molecules.

According to the second mode of operation, blower (1) supplies airflow through gas/liquid contactor (3), i.e., bypassing scrubber (2) and moves depleted-$CO_2$ airflow which exists the gas/liquid contactor (3) via air outlet (9) to be reintroduced into the room, by keeping two-way valves (6) and (4) open and two-way valves (7) and (5) closed. Volumetric flow rates received by the gas/liquid contactor are generally lower than those received by the scrubber, just holding $CO_2$ temporarily in the scrubber (2).

According to the third mode of operation, blower (1) supplies airflow through $CO_2$ adsorption scrubber (2) and moves depleted-$CO_2$ airflow which exists the scrubber via air outlet (9) to be reintroduced into the room over a period of time $t_1$ during which the $MOH/H_2O_2$ reactor (3) is at rest, by opening two-way valves (7) and (5) and closing two-way valves (6) and (4). During $t_1$, $CO_2$ is captured and held in the scrubber but after a while the $MOH/H_2O_2$ reactor enters into service. That is, $CO_2$ is discharged from the scrubber (2) and is directed to, and mineralized in, the $MOH/H_2O_2$ reactor (3), by keeping two-way valve (7) open, turning on the heater to supply hot air thereby promoting the desorption process of the $CO_2$ molecules from the sorbent in scrubber (2), to produce $CO_2$-laden airflow. Two-way valve (5) and (6) are closed whereas two-way valve (4) is open, such that the $CO_2$-laden airflow is passed through gas/liquid contactor (3).

$CO_2$-laden air delivered to gas/liquid contactor (3) over a period of time $t_2$, and is forced to flow across the membrane (236) to create bubbles which are caused to travel through the alkali hydroxide solution (e.g., NaOH or KOH, or their mixture), to which $H_2O_2$ stream is periodically or continuously added (for example, by injection beneath the level of the alkali hydroxide solution, in close proximity to the perforated membrane, i.e., in the vicinity of the perforations). Concentration of the alkali hydroxide solution varies from 5% to 481-50% by weight, e.g., from 10 to 48%-50% by weight. The concentration of the hydrogen peroxide solution added to the alkali hydroxide solution is from 3%, 4%, or 5% up to 35% by weight, e.g., from 10 to 30% by weight. Acceptable addition rate of the $H_2O_2$ stream may vary from 0.01 ml/min to 10 ml/min, e.g. up to 2, 3 or 4 ml/min. The volumetric ratio between the solutions in the range of 2:1 to 10:1 in favor of the alkali hydroxide solution. In the combined mode of operation ($CO_2$ capture in scrubber (2), $CO_2$ mineralization in reactor (3)), $t_1 < t_2$, that is, the scrubber captures $CO_2$ during relatively short time periods at $CO_2$ peak hours, whereas reactor (3) runs the chemical elimination of $CO_2$ with low volumetric flow rate over an extended time period.

EXAMPLES

Example 1

Removal of Formaldehyde Vapours from Air by Absorption to Aqueous Solution of Sodium Hydroxide and Hydrogen Peroxide The goal of the study was to test the ability of the aqueous $NaOH/H_2O_2$ reagent to remove formaldehyde vapors from air that is passed/bubbled through the reagent and decompose the formaldehyde, challenging characteristic formaldehyde indoor loading and maintaining adequate formaldehyde conversion rates over a couple of hours.

Figure 9:
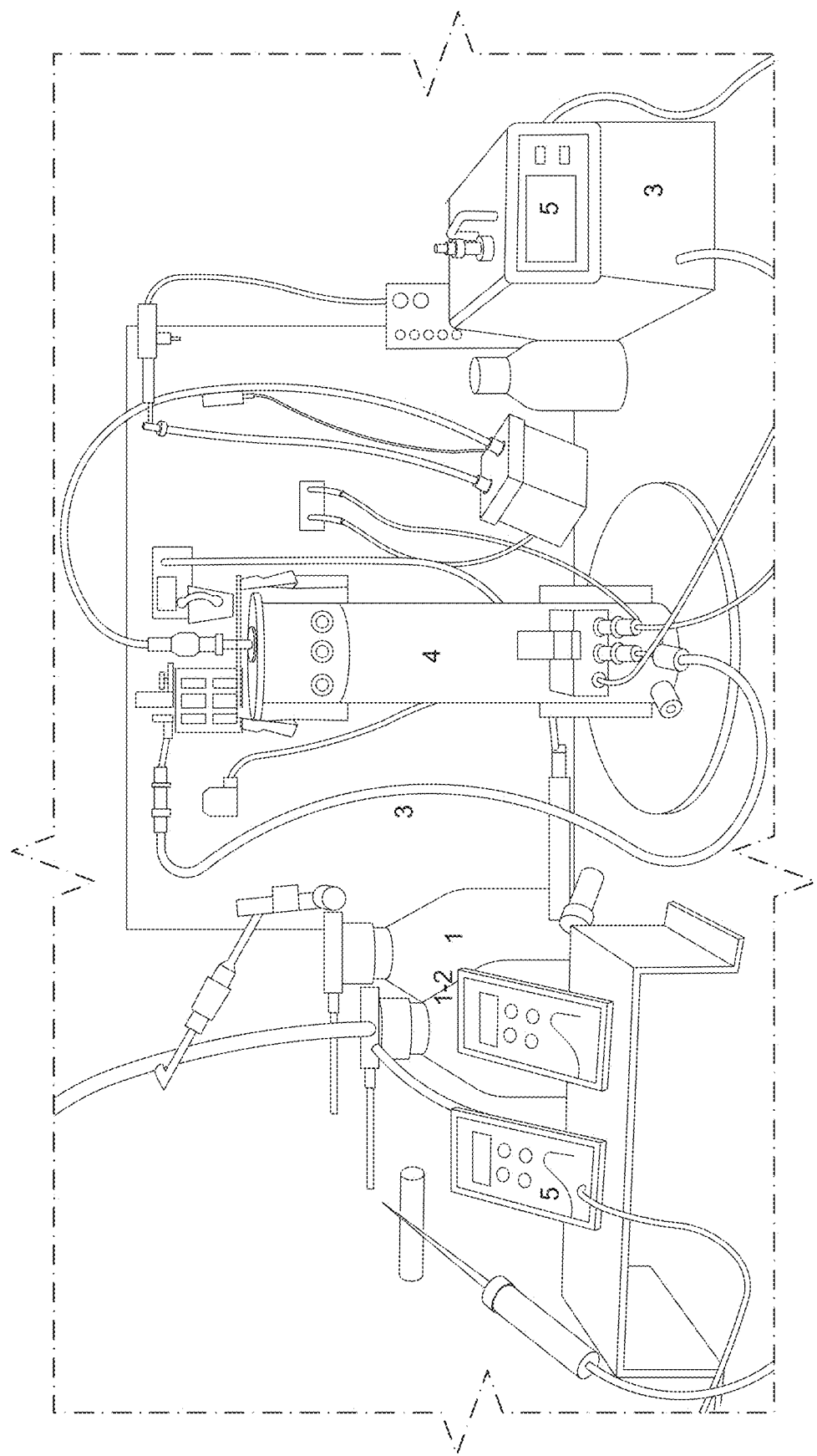

The experimental set-up is shown in FIG. 9. Aqueous formaldehyde solution (100 ml of 37 wt. % solution, stabilized with methanol) was charged into a round bottom flask (1). A cylindrical reactor (4) was charged with 150 ml of sodium hydroxide solution 30 wt %. The $H_2O_2$ solution was added slowly to the sodium hydroxide solution, at a rate flow of 1 ml/min, over the two hours test period, such that the total amount of the $H_2O_2$ solution added was 120 ml. Reactor (4) is substantially tubular in shape (inner diameter: 9 cm; height: 40 cm). 5 mm thick stainless-steel membrane is mounted horizontally inside the reactor, about 2.5 cm from the bottom of the reactor. The pore size of the membrane was 147 μm; center to center distance between adjacent pores is ~50 μm. The level of the liquid in the reactor was 7 cm, i.e., the membrane was submerged about 4.5 cm below the surface level of the solution.

The formaldehyde solution was vaporized using hot plate (2) with an average temperature of 35° C. and the vapors were led to reactor (4). The peristaltic pump (3) used was operated at 1 $m^3$/min flow rate. The formaldehyde concentration in the incoming stream was adjusted to 0.2-0.3 $mg/m^3$ in air, representing typical contamination level in residential areas, based on WHO guidelines for Indoor Air Quality. A pair of formaldehyde detectors (5-formaldemeter htv-m, manufactured by PPM technology Ltd., UK) connected to the incoming (contaminated) and outgoing (purified) streams were used to measure the concentration of formaldehyde, respectively.

Figure 10:
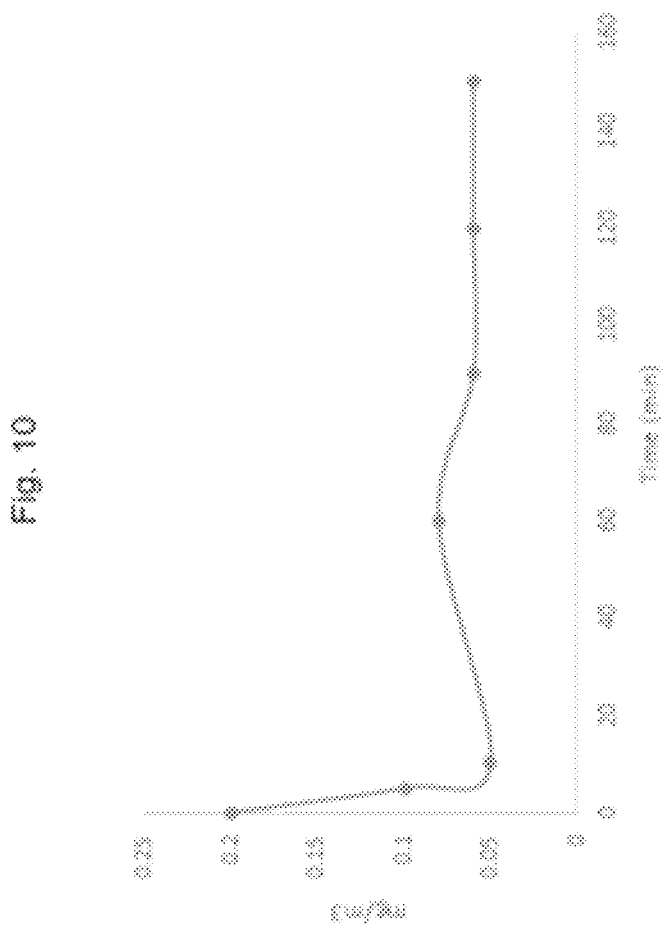
Figure 11:
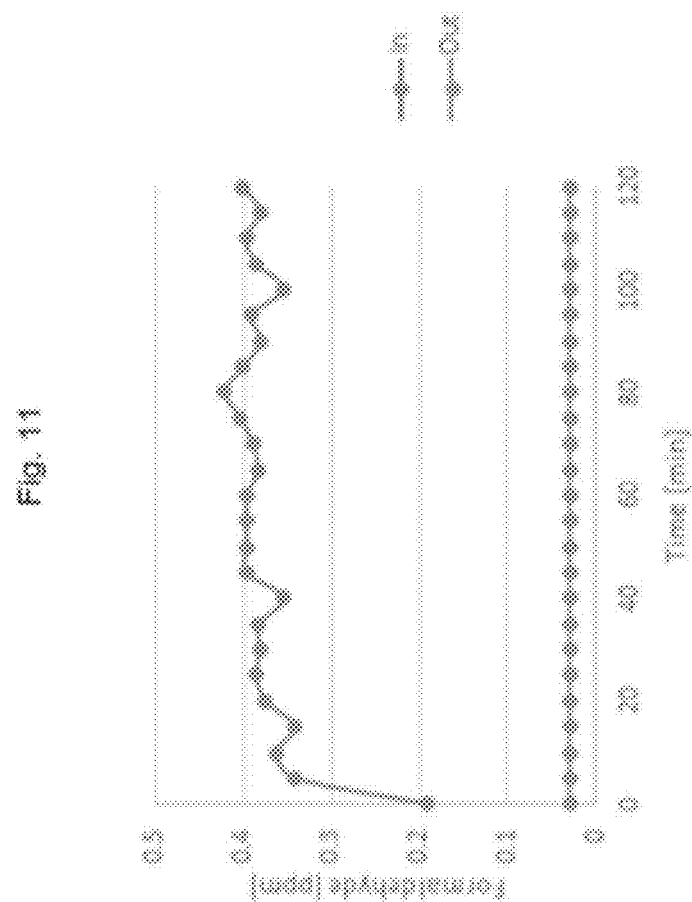

Results of characteristic experiments are shown graphically in FIGS. 10 and 11. FIG. 10 is formaldehyde concentration versus time plot, measured for the outgoing treated air stream (concentration is expressed as $mg/m^3$). FIG. 11 is formaldehyde concentration versus time plot, measured for the incoming (contaminated) and outgoing (treated) air streams (concentration is expressed in ppm). The results indicate stable absorption and conversion rate of formaldehyde with the aid of the $NaOH/H_2O_2$ reagent over test period of about two hours.

Example 2

Treatment of Low Concentration $CO_2$-Bearing Air by Absorption to Aqueous Solution of Sodium Hydroxide and Hydrogen Peroxide The goal of the study was to test the ability of the aqueous $NaOH/H_2O_2$ reagent to remove $CO_2$ from air that is passed/bubbled through the reagent, when the air is loaded with low $CO_2$ concentrations, challenging characteristic $CO_2$ indoor loading and maintaining adequate $CO_2$ conversion rates over a couple of hours.

Figure 12:
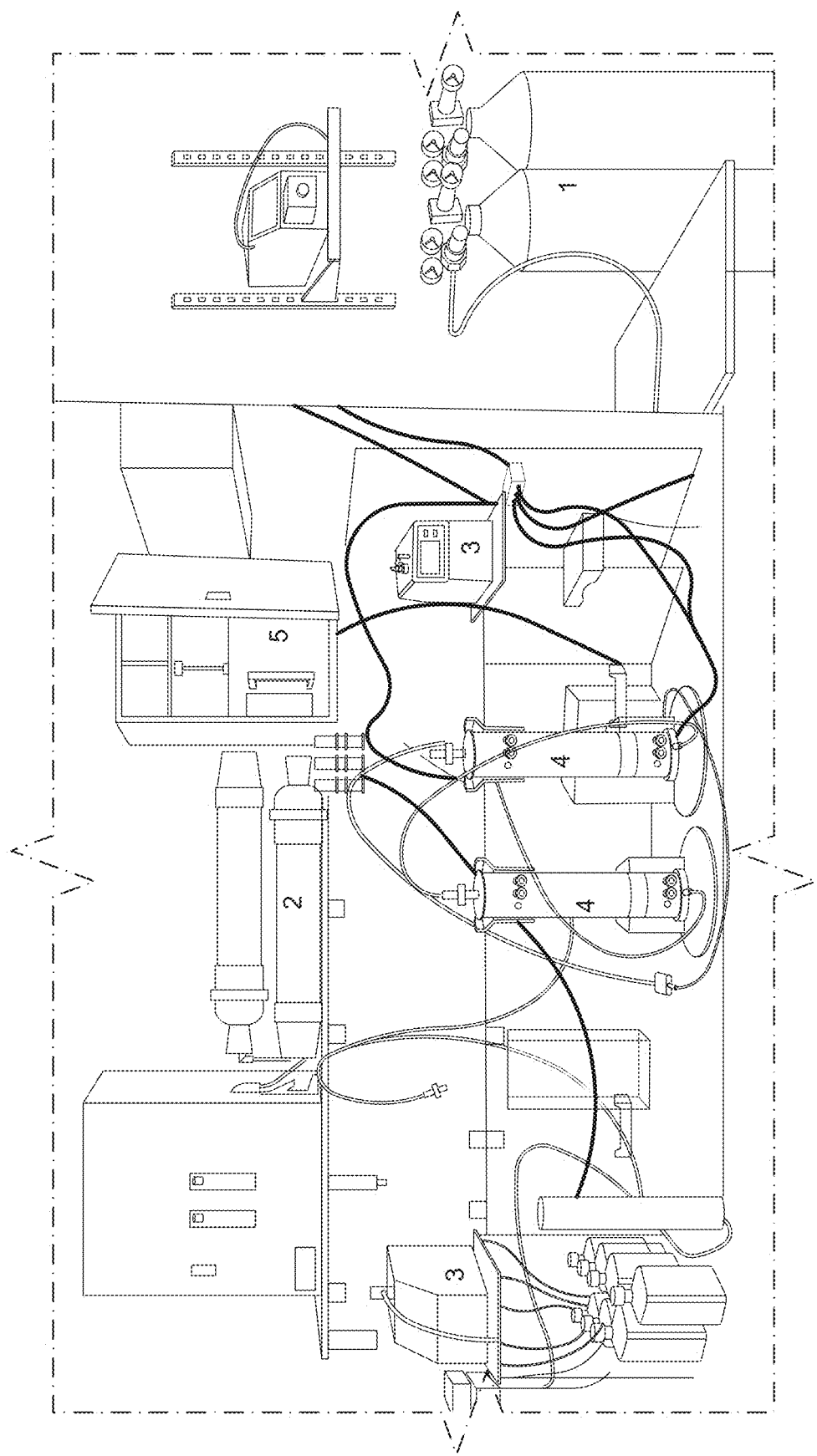

The experimental set-up is shown in FIG. 12. The CO$_2$ source was a commercial 100% CO$_2$ held in gas cylinder (1). Pumps (3) made CO$_2$ from cylinder (1) and air from cylinder (2) to flow and mix to create a combined stream of 1200 ppm-CO$_2$ bearing air, which was directed to reactor (4) (as previously described) at a flow rate of 13 L/min, where the NaOH/H$_2$O$_2$ reagent was held (the reagent was charged to the reactor by first adding 250 ml of 30 wt % of NaOH solution, and slow continuous addition of hydrogen peroxide solution (10%) at a flow rate of 0.1 ml/min over the test period. A pair of CO$_2$ detectors (5-BGA-EDG-MA, Emproco Ltd., Israel) connected to the incoming (1200 ppm-CO$_2$ bearing air) and outgoing (purified) streams were used to measure the concentration of CO$_2$, respectively.

Figure 13:
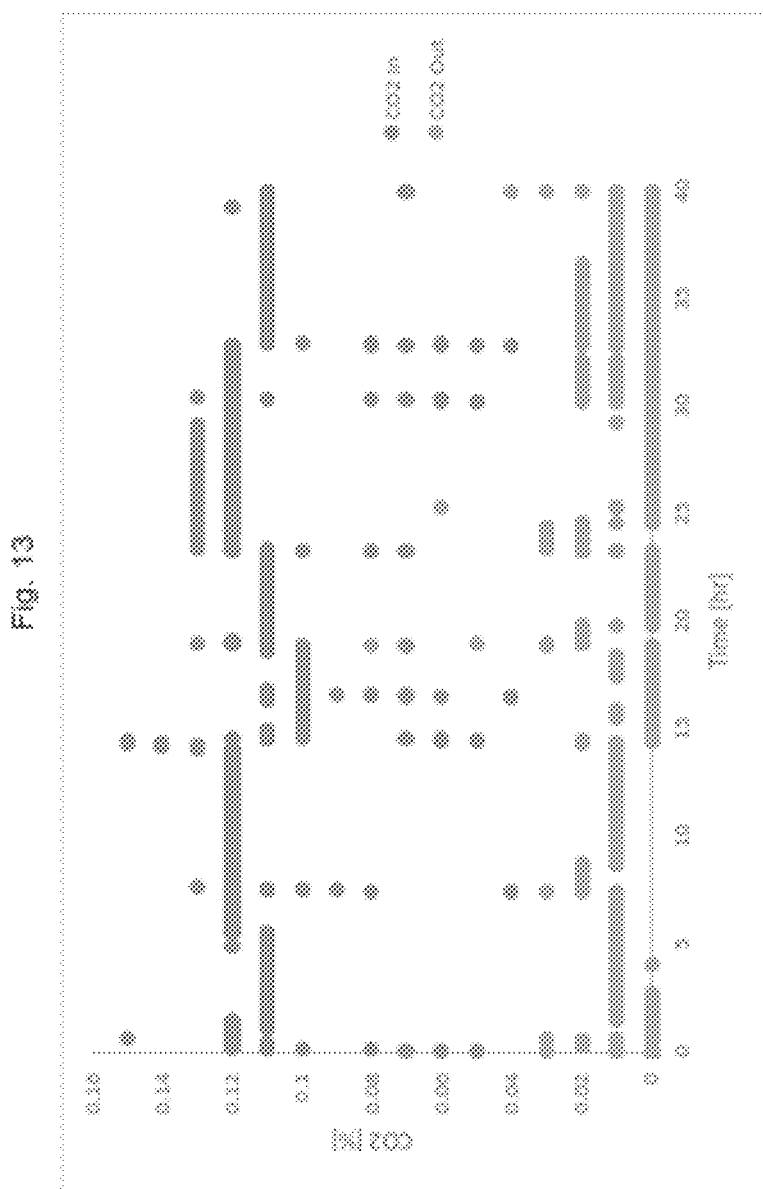

CO$_2$ levels in the incoming and outgoing streams were recorded continuously over forty minutes. The results are presented graphically in FIG. 13. It is seen that high conversion percentage of CO$_2$ was maintained over the forty minutes test period, reaching 90-100%.

Reaction of CO$_2$ with alkali hydroxide alone would merely result in formation of the corresponding carbonate, as shown by the following reaction equation:

$$CO_2 + 2MOH \rightarrow M_2CO_3 + H_2O$$

In contrast, reaction of carbon dioxide with the superoxide leads to formation of oxygen:

$$2MO_2 + CO_2 \rightarrow M_2CO_3 + 1.5O_2$$

Figure 14:
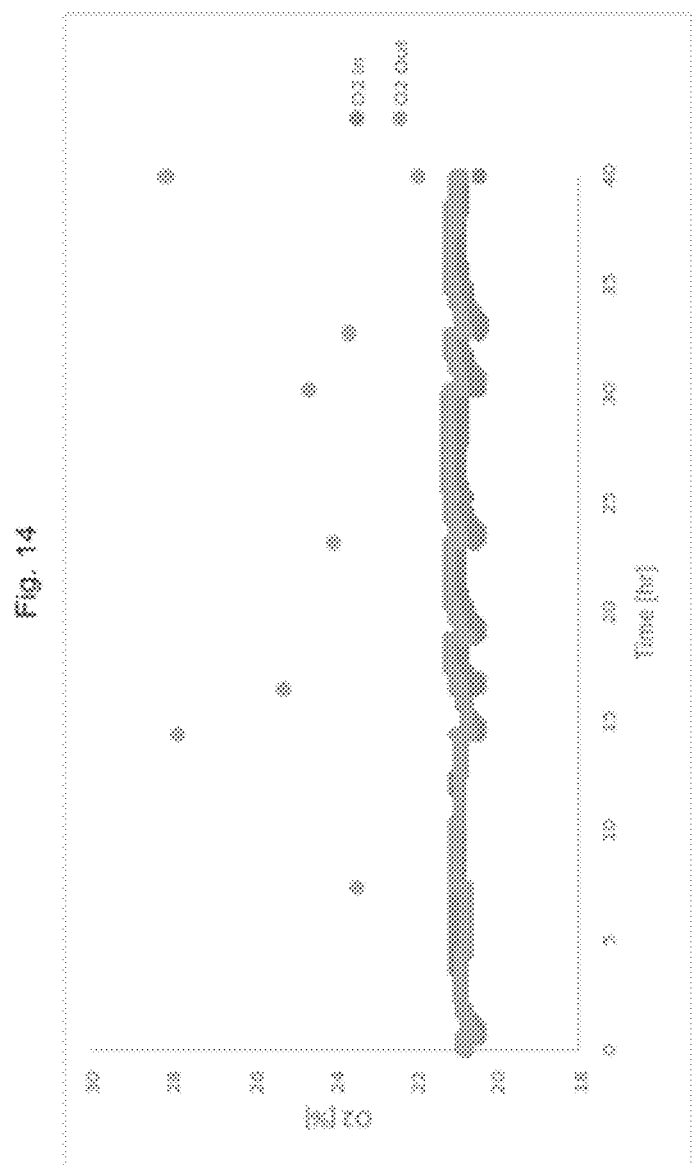

Hence, the involvement of the superoxide radical in decomposing of CO$_2$ is demonstrated by evolution of O$_2$. That is, enrichment of the outgoing air stream with oxygen. Oxygen levels in the incoming and outgoing streams recorded over forty minutes indeed indicate oxygen evolution and creation of oxygen-rich outgoing air stream, as shown by the O$_2$ concentration versus time plot of FIG. 14, indicating from 22 to 28% oxygen level.

Example 3

Reduction of Microbial Load in Air with the Aid of Aqueous Solution of Sodium Hydroxide and Hydrogen Peroxide The goal of the study was to investigate the biocidal action of NaOH/H$_2$O$_2$ reagent on contaminated air, that is, to achieve reduction of microbial load of indoor air, e.g., by removing bacteria such as *Micrococcus luteus, Bacillus* and *Clostridium*. The initial load was 1*10$^8$ CFU/ml for each of the bacteria species tested (which is approximately equal to 400 CFU/plate contaminated air).

Figure 15:
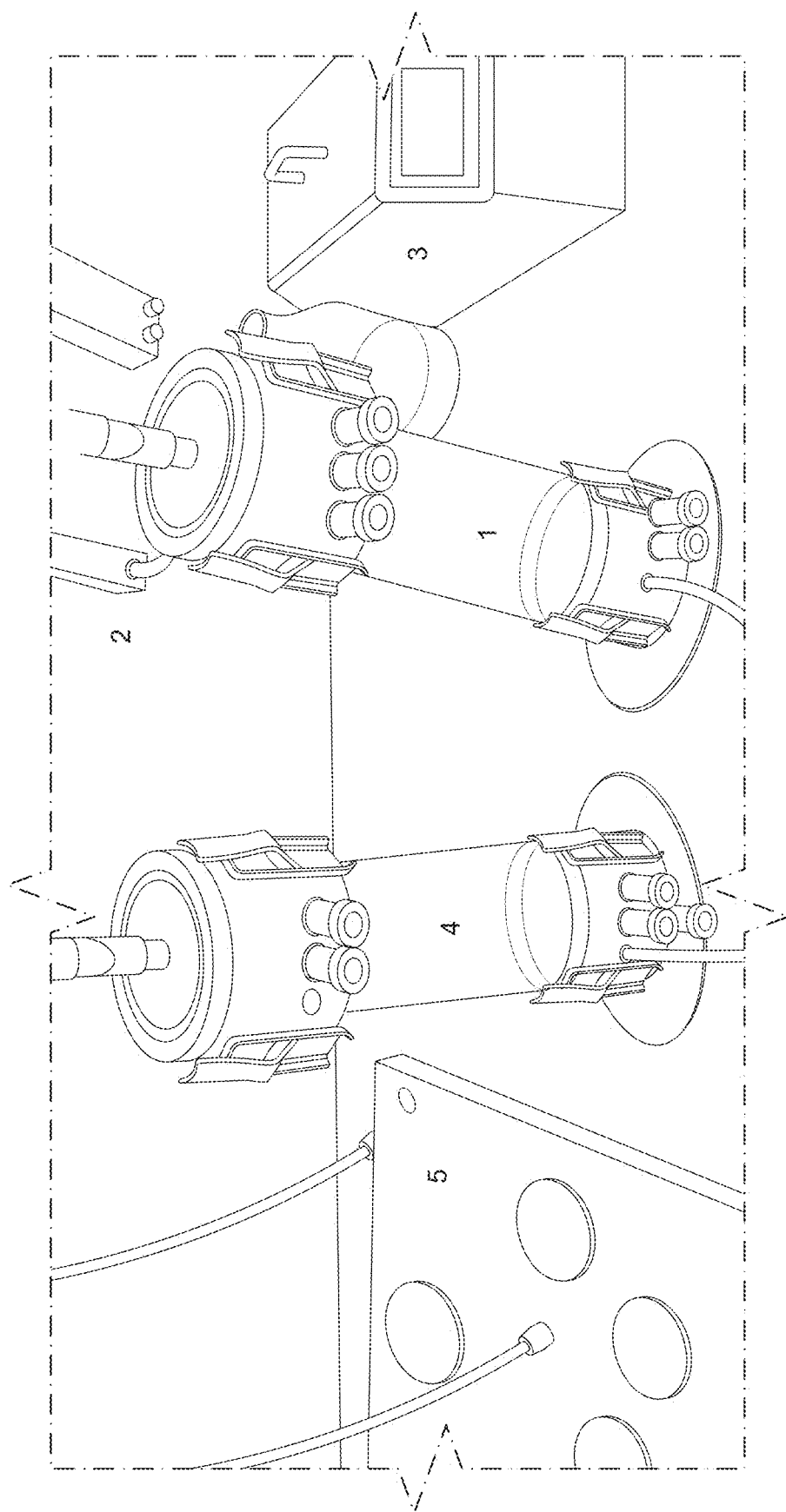

The Experimental set-up is shown in FIG. 15. Reactor (1) is loaded with dissolved bacteria (received from Aminolab). Reactor (4) (as previously described) is charged with the NaOH/H$_2$O$_2$ reagent. The reagent was introduced into reactor (4) by addition of 100 ml of NaOH (30 wt %), and slow addition of 40 ml H$_2$O$_2$ (at a rate of ~2 ml/min, over the test period). The pair of reactors were identical in shape and size: both were cylindrically shaped with length of 50 cm and diameter of 10 cm, designed to enable upwardly flowing air to pass therethrough. Air was made to flow by pump (3) from air chamber (2) at flow rate of 13 L/min through reactor (1), to produce an outgoing contaminated air stream that was guided to, and forced to bubble through, the aqueous reagent in reactor (4) (the height of the liquid in the column is 7 cm).

Biocide contact time was fifteen minutes. A sealed container accommodating six petri dishes was used to receive the treated air existing reactor (4) after the fifteen minutes elapsed. It was found that 15 minutes of exposure to the superoxide radical (active solution) achieved reduction of bacteria concentration to 2 CFU/plate, indicating conversion rate of 99.51.

Example 4

Figure 17:
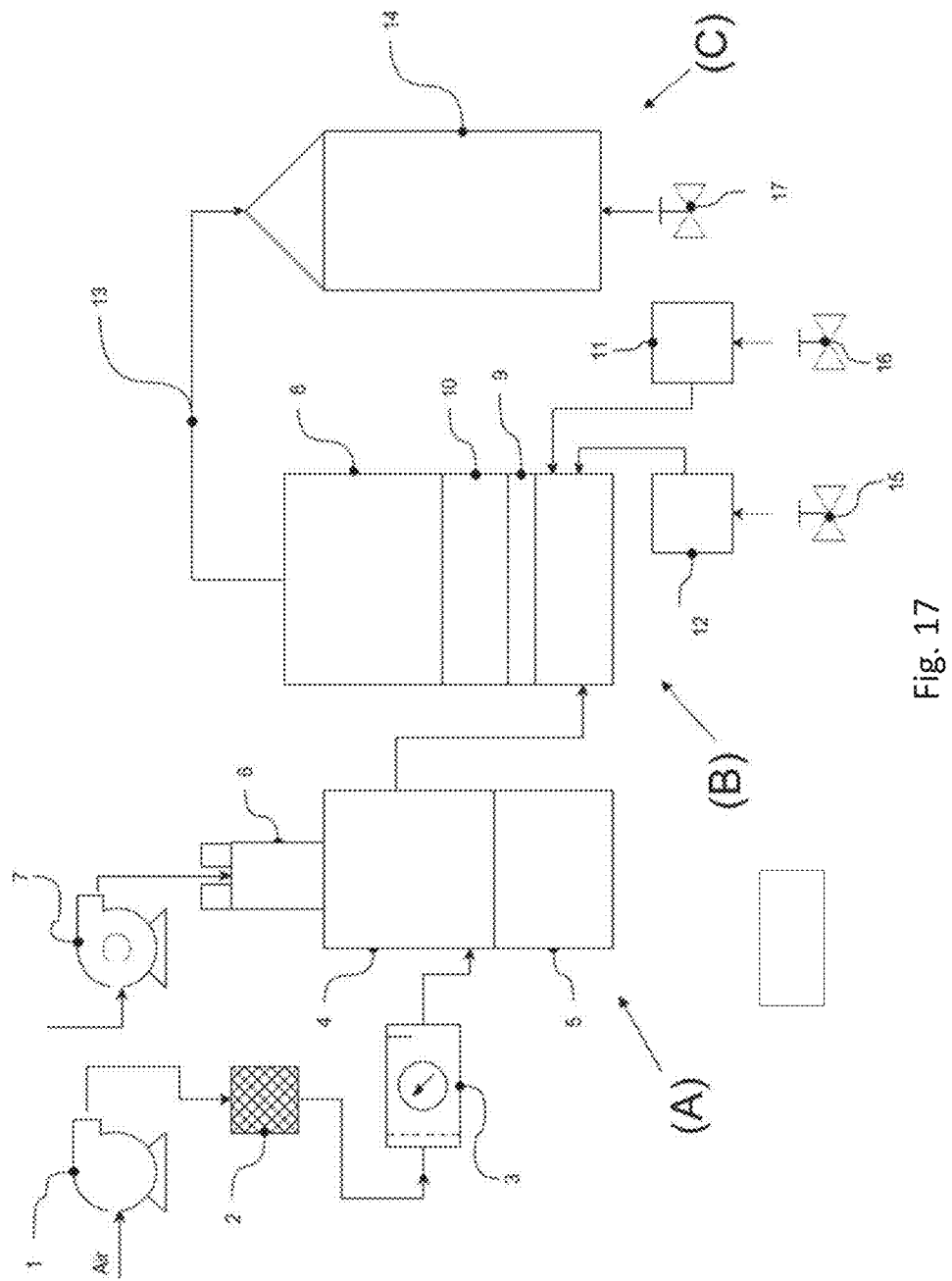

Reduction of Microbial Load in Air with the Aid of Aqueous Solution of Sodium Hydroxide and Hydrogen Peroxide Experimental Set-Up The experimental set-up is shown in FIG. 17. It consists of three major parts:

(A) a mixing unit, where an air stream is loaded with biological contamination.

(B) a treatment unit, i.e., a gas-liquid contactor, where the biologically contaminated air stream is treated with the aqueous MOH/H$_2$O$_2$ solution.

(C) a filtration and sampling unit, where condensable samples are collected; the so-formed solutions are then analysed (to count the microorganisms that survived the treatment).

The Mixing Unit (A)

Air stream from an air compressor (1) is passed through an air filter (2) before it enters a mixing chamber (4) at a pressure of 5 bars (flow rate of about 100 L/min). The air feed line is equipped with a regulator and a flowmeter (3) to adjust the air flow rate. Syringe pump (7; NE-300 Just-Infusion™, by New Er Pump Systems Inc.) delivers a microbial suspension to a bioaerosol generator (6; Blaustein atomizer (BLAM), a multi-jet model by CH technologies), where it becomes small and light enough to be carried on air. The BLAM atomizer is installed inside mixing chamber (4), discharging the bioaerosol at the lower portion (5) of mixing chamber (4), at a flow rate of 6 L/min, where the bioaerosol is loaded onto the compressed air fed to chamber (4), creating biologically contaminated air stream. Chamber (4) is also provided with a jet nozzle port (not shown) to introduce a disinfectant (6-10% hydrogen peroxide solution) and a secondary air stream, creating a disinfectant aerosol to clean the interior of chamber (4) between the tests. An outgoing, biologically contaminated air stream flows from chamber (4) to the treatment zone at about 106 L/min.

The Treatment Zone (B)

A reactor, i.e., a gas-liquid contactor, where the biologically contaminated air is mixed with the aqueous reagents MOH/H$_2$O$_2$, is indicated by numeral (8). Reactor (8) is tubular in shape (inner diameter: 9 cm; height: 40 cm). 5 mm thick stainless steel membrane (9) is mounted horizontally inside the reactor, about 2.5 cm from the bottom the reactor. The pore size of the membrane was 147 μm; centre to centre distance between adjacent pores is ~50 μm. Sodium hydroxide (30% by weight solution) and hydrogen peroxide (10%-30% by weight solutions) are held at tanks (11) and (12), and are supplied to reactor (8) using peristaltic pumps operated under controllers 15 and 16. The NaOH and H$_2$O$_2$ aqueous streams enter the reactor (8) through openings located at the lateral surface of the reactor, below the level of the membrane (9). A third peristaltic pump C (not shown) is installed to discharge the exhausted aqueous reagent from the bottom of reactor (8) to a waste tank (not shown). Numeral (10) indicates the surface level of the aqueous reagent added to the gas-liquid contactor (8). An outgoing disinfected air stream (13) flows to the filtration and sampling unit.

The Filtration and Sampling Unit (c)

The filtration and sampling unit (3) consists of a dry filter air sampler (14); ACD-200 Bobcat). The air effluent of reactor (13) is passed through the Bobcat sampler (controlled by (17)) which generates liquid samples for analysis.

That is, the collected fluid is withdrawn from the Bobcat sampler and samples (5-7 ml) are incubated to detect and count the microorganism. The experimental set-up is mounted inside a hood, such that air sampler (14) is fed with the treated air stream (13) delivered from reactor (8) with minimal ambient air interference.

Experimental Protocol

The strain of bacteria chosen for the tests was *Kocuria rhizophila* (ATCC 9341). It is readily visible when grown on agar plate, owing to its spherical morphology and intense yellow color. TSB was used as a culture broth to grow the bacteria (overnight, at 30-35° C.).

Each session consisted of the following experiments:

One negative control experiment, in which purified water is injected from the syringe pump (7) to the aerosol generator (6), creating a sterile aerosol that is discharged to chamber (4), where it is mixed with incoming sterile air stream. The outgoing air/aerosol stream flows to reactor (8). Reactor (8) operates under dry conditions, i.e., the air stream is not contacted with a liquid whatsoever. The aerosol moves to the Bobcat sampler (14), condensed, collected and tested for the presence of the bacteria (no bacterial growth was to be detected in a successful run).

Two or more test experiment, in which a microbial suspension is injected from the syringe pump (7) to the aerosol generator (6), creating a bioaerosol that is discharged to chamber (4), where it was mixed with incoming sterile air stream. The air/bioaerosol stream from chamber (4) flows to reactor (8); it enters reactor (8) from the bottom, flows in an upward direction across the aqueous $NaOH/H_2O_2$ solution. The outgoing, disinfected air/aerosol stream flows from the top of reactor (8) to the Bobcat sampler (14), samples are condensed, collected and tested for the presence of the bacteria. The combinations of $NaOH/H_2O_2$ aqueous solutions added to reactor (8) are tabulated below:

TABLE 1

| Treatment | A1 | A2 |
|---|---|---|
| NaOH 30% solution | 3.0 liter | 3.0 liter |
| $H_2O_2$ 10% solution | 0.3 liter | |
| $H_2O_2$ 30% solution | | 0.3 liter |

One positive control experiment, which only differs from the test experiment in that reactor (8) was filled with purified water in place of the active $NaOH/H_2O_2$ solution. The positive control experiment showed that the system does not block the passage of microorganism and functioned as the positive baseline to which each test was com-pared to, on each session, to evaluate the efficacy of the treatment. Positive control runs were performed once per session, usually after the test experiments.

System disinfection was performed at the beginning of each session and after each test involving the passage of microorganisms into the system (see the 6-10 H2O2 disinfectant arrangement mentioned above); i.e., reactor (8) was drained to discharge the exhausted aqueous reagent, and the system was cleaned and disinfected. Samples collected were diluted (e.g., $10^{-5}$ dilution), disposed on agar plates to enable CFU counting.

Results

The concentration and total number of CU injected to create the contaminated biological air stream and removal rates measured (expressed by log reduction units, calculated based on total CFU injected and relative to the positive control base) are tabulated in Table 2.

TABLE 2

| Treatment | A1 | A2 |
|---|---|---|
| CFU injected | $8.1 \times 10^6$ CFU/ml | $5.3 \times 10^6$ CFU/ml |
| | Total: $4.05 \times 10^8$ CFU | Total: $2.65 \times 10^8$ CFU |
| Log reduction* | 3.3-3.9 | 5.6-8.4 |
| Log reduction** | 1.6-2.2 | 3.6-6.4 |

*calculated based on total CFU injected.
**calculated relative to positive control It is seen that the combined action of alkali hydroxide and hydrogen peroxide achieved high removal rates of the bacteria *Kocuria rhizophila* from air (>99.99% elimination).

Example 5

Inactivation of Human Coronavirus OC43(hCoV-OC43) by the Action of Sodium Hydroxide and Hydrogen Peroxide The goal of the study was to evaluate the effect of direct contact of $NaOH/H_2O_2$ aqueous solution on hCoV-OC43, over different exposure times.

Pre-Test Preparations

Biological samples: A549 cells (Colon; ATCC, Cat. #CCL-185) were grown in 96-well plates (96-well plate, Greiner Bio One) in F-12K growth medium (ATCC, Cat. #30-2004) supplemented with 2 mM L-Alanyl-L-Glutamine solution (200 mM; Biological Industries, Cat. #03-022-1B), 1% Penicillin-Streptomycin solution (Biological Industries, Cat. #03-031-1B) and 10% Fetal Bovine Serum (FBS; Biological Industries, Cat. #04-127-1A), at 37° C. and 5% $CO_2$.

Chemical samples: 300 µl of $H_2O_2$ 10% solution were added to 9 ml of NaOH 30% solution, to form 9.3 ml samples of the active reagent.

Experimental Protocol

Test A: Negative Control—Cytotoxic Effect of $NaOH/H_2O_2$ Solution

Two experiments were conducted to determine the cytotoxicity of the $NaOH/H_2O_2$ solution.

In experiment 1-310 µl sterile growth medium were added to 9.3 ml of the $NaOH/H_2O_2$ solution and incubated for 60 seconds, followed by preparation of 10-fold serial dilutions (1:10, 1:100, 1:1000, 1:10000, 1:100000 and 1:1000000), and adding 150 µl/well from each dilution to the cells in 4 replicate wells.

In experiment 2-500 µl sterile growth medium were added to 500 µl of the $NaOH/H_2O_2$ solution, and incubated for 10 seconds, followed by preparation of 10-fold serial dilutions (1:10, 1:100, 1:1000, 1:10000, 1:100000 and 1:1000000) and adding 150 µl/well from each dilution to the cells in 4 replicate wells.

Test B—Antiviral Effect of $NaOH/H_2O_2$ Solution

Two experiments were conducted to assess the antiviral effect of the of the $NaOH/H_2O_2$ solution.

In experiment 1—310 µl of stock hCoV-OC43 were added to 9.3 ml of the $NaOH/H_2O_2$ solution, and incubated for 13, 30 and 60 seconds (total 3 test samples), followed by preparation of 10-fold serial dilutions (1:10, 1:100, 1:1000, 1:10000, 1:100000 and 1:1000000) and adding 150 µl/well from all dilutions produced at each incubation duration, to the cells in 4 replicate wells.

In experiment 2—500 µl of stock hCoV-OC43 were added to 500 µl of the $NaOH/H_2O_2$ solution and incubated for 2, 5 and 10 seconds (total 3 test samples), followed by preparation of 10-fold serial dilutions (1:1000, 1:10000, 1:100000 and 1:1000000) and adding 150 μl/well from all dilutions produced at each incubation duration, to the cells in 4 replicate wells.

Viral Standard Curve Preparation for Stock Titration:

Untreated hCoV-OC43 stock was diluted in 10-fold serial dilutions in sterile growth medium supplemented with 2% FBS, and 150 μl/well were applied from each dilution to the cells in 4 replicate wells.

Four (4) additional wells were used as calibration curve negative control (cNC), in which sterile medium containing no hCoV-OC43 was applied onto the cells.

The A549 96-well plate was incubated for 6 days at 35° C. and 5% CO2, and cells were daily monitored for cytopathic and/or cytotoxic effects under the microscope.

Results

Viral Standard Curve

Viable and uninfected/contaminated cells were observed in all cNC wells in both experiment 1 and 2.

In experiment 1 standard curve titration calculated using the Reed and Much titration formula was: $2.11 \cdot 10^6$ $TCID_{50}$/ml.

In experiment 2 standard curve titration calculated using the Reed and Much titration formula was: $3.09 \cdot 10^7$ $TCID_{50}$/ml.

The results indicate that the virus stock used in each experiment stands in the calibration range of our viral stocks and is reliable for experimentation.

Test A: Negative Control—Cytotoxic Effect of NaOH/$H_2O_2$ Solution

Cytotoxicity leading to cell death within hours was observed in both experiments for all replicates of dilutions 1:10 and 1:100. At dilution 1:1,000 and above, no cell death, and no difference in cell appearance were observed, compared to untreated cells incubated in growth medium and no chemical treatment.

The antiviral experiment was conducted accordingly, referring to the 1:1,000 viral dilution as a baseline for CPE monitoring and $TCID_{50}$ calculations.

Test B—Antiviral Effect of NaOH/$H_2O_2$ Solution

No cytotoxic effect was observed for dilutions of 1:1,000 and above of the NaOH/$H_2O_2$ solution, no viral infection was observed for all test samples in all wells infected by treated virus containing these dilutions. That is, hCoV-OC43 infectivity by at least ≥99.9%, already at 2 seconds of contact with the virus. These percentages can be interpreted based on Table 5, for the calculated −3.7 viral log reduction obtained as the result for the 3 Test samples (Table 4).

Since no $TCID_{50}$ could be calculated in any of the 3 test sample wells, calculation of the viral log reduction was based on the delta between the calculated $TCID_{50}$ units that were inoculated (following incubation with the chemical mixture) into each well of the 1:1,000 dilutions, and the end-point viral titer obtained (0). The $TCID_{50}$ inoculated into the wells was calculated based on the standard curve samples.

TABLE 3

| antiviral activity experiment 1 | | | | |
|---|---|---|---|---|
| Sample | Initial viral $TCID_{50}$/well | Observed viral $TCID_{50}$ day 5 | Viral log reduction | % Virus reduction |
| TEST 13 s | 1.02E+01 | 0 | 1 | ≥90 |
| TEST 30 s | | 0 | 1 | ≥90 |
| TEST 60 s | | 0 | 1 | ≥90 |

TABLE 4

| Chemical mixture antiviral activity experiment 1 | | | | |
|---|---|---|---|---|
| Sample | Initial viral $TCID_{50}$/well | Observed viral $TCID_{50}$ day 7 | Viral log reduction | % Virus reduction |
| TEST 2 s | 4.64E+03 | 0 | 3.7 | ≥99.9 |
| TEST 5 s | | 0 | 3.7 | ≥99.9 |
| TEST 10 s | | 0 | 3.7 | ≥99.9 |

Legend for Table 3 and 4:

Initial viral $TCID_{50}$/well: the total amount of hCoV-OC43 inoculated into the 96-well plate and onto the cells, at dilution 1:1,000 of the chemical mixture following incubation for 13, 30 and 60 seconds (Table 3), and 2, 5 and 10 seconds (Table 4) of the virus in the aqueous NaOH/$H_2O_2$ solution. This value was calculated based on the titration of the viral standard curve wells, using the Reed and Much titration formula, and normalization to the total volume inoculated into the wells following the dilution (150 μl). The initial viral $TCID_{50}$/well was only calculated for the 1:1,000 sample dilutions, as up to 1:100 there was massive cell death not allowing for CPE (cytopathic effect) observation.

Observed viral $TCID_{50}$: the $TCID_{50}$ obtained for each sample at the experiment end-point (5 and 7 days post viral inoculations). As no CPE and infection were visible, all samples were assigned 0 $TCID_{50}$.

Viral log reduction: was calculated per the 1:1,000 sample dilutions as $\log_{10}$ from the initial viral $TCID_{50}$ per well).

TABLE 5

| Interpretation of results | |
|---|---|
| Log reduction | Percent (%) reduction |
| ≥1 | ≥90 |
| ≥2 | ≥99 |
| ≥3 | ≥99.9 |

CONCLUSION

In this study, a chemical mixture of 9 ml NaOH solution and 300 μl $H_2O_2$ solution was tested for its ability to hamper the infectivity of hCoV-OC43 by direct contact of the solution and virus. Results of the three tests performed, for three different contact durations, indicate that the tested NaOH/$H_2O_2$ solution abolished virus infectivity as soon as 2 seconds following the direct exposure. Since there was cytotoxic effect of the NaOH/$H_2O_2$ solution to the cells at up to 1:100 dilution, in these wells CPE observations were not possible. As to 1:1,000 dilution and above, we can conclude that the NaOH/$H_2O_2$ solution indeed reduced ≥99.9% the viral load capable of infecting the cells, compared to the load first introduced into the wells of this dilution following incubation in the mixture. This reduction can be assessed as at least −3.7 log reduction in hCoV-OC43 virus infectivity.

Example 6

Treatment of Low Concentration $CO_2$-Bearing Air by Absorption to Aqueous Solution of Potassium Hydroxide and Hydrogen Peroxide The goal of the study was to examine the performance of two types of perforated membranes which differ from one another in the geometry of their holes. In one membrane, the diameter of the holes does not vary across the membrane thickness, i.e., the air flows through passages which are cylindrically in shape, with constant diameter of 600 μm. The other membrane that was tested was perforated with holes with unique geometry, as the air flows through passages consisting of a cylindrical section joining an inverted frustoconical section: to move across the membrane, the air flows through the cylindrical section, with diameter of 300 μm, then through the frustoconical section, whose small base is contiguous with the cylindrical section (they are equal in diameter). The large base of the frustoconical section, with diameter of 900 μm, is the opening of the hole in the side of the membrane facing the bulk solution.

The experimental set-up was similar to the one described in Example 2, but was larger in scale. Also, this time potassium hydroxide solution 50% was used. 1.1 L of the KOH solution was charged to a tubular reactor with diameter of 26.5 cm. The membrane tested was installed 2.5 cm from the bottom of the tubular reactor. $H_2O_2$ solution (10%) was added at a flow rate of 10 ml/hour over the test period, by intermittently operating the pump delivering the $H_2O_2$ solution. $CO_2$ feed and its mix with an air stream to create a combined stream of 1200 ppm-$CO_2$ bearing air were carried out as described in Example 2; this stream was fed at a flow rate of 120 L/min to the reactor, where the KOH/$H_2O_2$ reagent was held.

Figure 19:
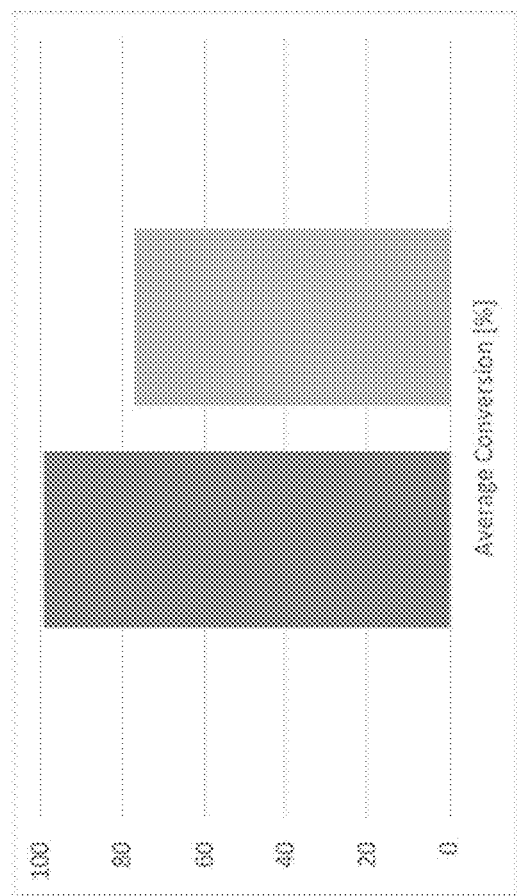

$CO_2$ levels in the incoming and outgoing streams were recorded periodically over one hour by the arrangement described in Example 2, and conversion rates were calculated. The results are shown in the form of a bar diagram in FIG. 19, illustrative of the test period. Good conversion percentages (~80%; right bar) were measured for the membraned perforated with 600 μm holes. As to the geometrically-modified perforated membrane, it is seen that almost 100% conversion percentage of $CO_2$ was maintained over the one-hour test period (left bar).

The invention claimed is:

1. An air purifier for eliminating chemical and biological pollutants from a room, comprising:
   an inlet air channel;
   one or more air sucking components configured to direct air from the room into said inlet channel, and to direct the air via said air channel into a perforated membrane mounted in a chemical and biological pollutants-elimination reactor; and
   an outlet air channel configured to receive treated air from the reactor;
   wherein the reactor comprises a reservoir configured to contain a purifying aqueous alkali hydroxide/$H_2O_2$ solution;
   wherein during the purifier's operation, said perforated membrane is positioned below a surface level of the solution such that air passing through the perforated membrane is converted into bubbles that travel through the solution and towards said outlet channel;
   wherein the air purifier further comprises a removable storage unit positioned above the reactor, said removable storage unit is configured to contain and supply alkali hydroxide, hydrogen peroxide, and optionally water to said reactor; and
   wherein said inlet air channel conveys air in a downwards direction, the inlet air channel passes through an opening in said perforated membrane towards an air compartment located below the perforated membrane.

2. The air purifier according to claim 1, wherein each perforation at the membrane has a diameter in the range of between 40 μm and 1200 μm.

3. The air purifier according to claim 1, wherein the perforated membrane has perforations with top and bottom openings, respectively, at top and bottom surfaces of the perforated membrane, and wherein the diameter of said top opening is larger than a diameter of said bottom opening.

4. The air purifier according to claim 3, wherein each of the perforations is divided into two sections in cross-section, a lower section having a cylindrical shape, and an upper section having a frustoconical shape.

5. The air purifier according to claim 1, wherein said storage unit comprises an alkali hydroxide container, a $H_2O_2$ container, and optionally a water container.

6. The air purifier according to claim 1, further comprising a blower and a HEPA filter fitted in the inlet channel upstream to the reactor.

7. The air purifier according to claim 1, being integrated with a domestic room purifier having a HEPA filter, wherein the inlet air channel is a branch from an inlet air channel of the domestic room purifier diverging downstream to the HEPA filter, and wherein the outlet channel joins an outlet channel of the domestic room purifier.

8. The air purifier according to claim 1, further comprising a sensor configured to measure a concentration of $CO_2$ at the room-air, and wherein a schedule and a period of operation of the device is based on $CO_2$ measurements by said sensor.

9. An air purifier for eliminating chemical and biological pollutants from a room, comprising:
   an inlet air channel;
   one or more air sucking components configured to direct air from the room into said inlet channel, and to direct the air via said air channel into a perforated membrane mounted in a chemical and biological pollutants-elimination reactor; and
   an outlet air channel configured to receive treated air from the reactor;
   wherein the reactor comprises a reservoir configured to contain a purifying aqueous alkali hydroxide/$H_2O_2$ solution;
   wherein during the purifier's operation, said perforated membrane is positioned below a surface level of the solution such that air passing through the perforated membrane is converted into bubbles that travel through the solution and towards said outlet channel;
   wherein the air purifier further comprises a removable storage unit positioned above the reactor, said removable storage unit is configured to contain and supply alkali hydroxide, hydrogen peroxide, and optionally water to said reactor; and
   wherein a bottom outlet of said inlet air channel is sealed against a top surface of the perforated membrane, so as to allow passage of air from the inlet air channel only through the perforations of the membrane towards a section of the reservoir below the membrane, and wherein the diameter of said membrane is smaller than the diameter of said reservoir of alkali hydroxide/$H_2O_2$ solution.

10. An air purifier for eliminating chemical and biological pollutants from a room, comprising:
    an inlet air channel;
    one or more air sucking components configured to direct air from the room into said inlet channel, and to direct the air via said air channel into a perforated membrane mounted in a chemical and biological pollutants-elimination reactor; and
    an outlet air channel configured to receive treated air from the reactor;

wherein the reactor comprises a reservoir configured to contain a purifying aqueous alkali hydroxide/$H_2O_2$ solution;

wherein during the purifier's operation, said perforated membrane is positioned below a surface level of the solution such that air passing through the perforated membrane is converted into bubbles that travel through the solution and towards said outlet channel;

wherein the air purifier further comprises a removable storage unit positioned above the reactor, said removable storage unit is configured to contain and supply alkali hydroxide, hydrogen peroxide, and optionally water to said reactor; and wherein a bottom outlet of said inlet air channel is configured to lead contaminated air to a perforated membrane, said perforated membrane having a spiral tubing configuration and being positioned at a lower portion of said purifying solution's reservoir.

11. The air purifier according to claim 10, wherein each said perforations is positioned at a lower portion of the tubing in cross section, so as to direct air outlet through the perforation downwards.

12. The air purifier according to claim 11, wherein each of said perforations is positioned at least 30° lower than the tubing horizontal diameter in cross-section.

13. The air purifier according to claim 10, wherein each of said perforations has a diameter in the range of between 40 μm and 1200 μm.

14. The air purifier according to claim 10, wherein a distance between each two perforations is in the range of 2-50 of the perforation's diameter.

15. An air purifier for eliminating chemical and biological pollutants from a room, comprising:
an inlet air channel;
one or more air sucking components configured to direct air from the room into said inlet channel, and to direct the air via said air channel into a perforated membrane mounted in a chemical and biological pollutants-elimination reactor; and
an outlet air channel configured to receive treated air from the reactor;
wherein the reactor comprises a reservoir configured to contain a purifying aqueous alkali hydroxide/$H_2O_2$ solution;
wherein during the purifier's operation, said perforated membrane is positioned below a surface level of the solution such that air passing through the perforated membrane is converted into bubbles that travel through the solution and towards said outlet channel;
wherein the air purifier further comprises a removable storage unit positioned above the reactor, said removable storage unit is configured to contain and supply alkali hydroxide, hydrogen peroxide, and optionally water to said reactor;
wherein said storage unit comprises an alkali hydroxide container, a $H_2O_2$ container, and optionally a water container; and
wherein the air purifier has an essentially cylindrical shape, wherein said alkali hydroxide container, said $H_2O_2$ container, and said water container are arranged concentrically within the storage unit.

16. The air purifier according to claim 5, wherein the alkali hydroxide container is configured to contain alkali hydroxide tablets in a releasable arrangement.

17. The air purifier according to claim 16, wherein said alkali hydroxide container comprises a plurality of columns, each column is configured to store alkali hydroxide tablets.

18. The air purifier according to claim 17, wherein said hydroxide container is configured to angularly revolve, so as to position a single column above an opening to a passage leading to said solution reservoir, so as to allow a periodical feeding of the solution by hydroxide tablets.

19. A home air purifying system, comprising:
a plurality of air-quality sensors, each sensor being positioned at another room of the home;
a mobile air purifier; and
a docking station which is configured to:
host the mobile air purifier;
receive air quality measurements from all said plurality of sensors, and determine when a level of contamination at a room exceeds a predefined contamination threshold; and
communicate with said mobile air purifier, and at least send to it an indication of a room in which a contamination above said predefined contamination threshold has been detected;
wherein said mobile air purifier is configured to:
communicate with said docking station, and at least receive from it an indication of the room in which the contamination above said predefined contamination threshold has been detected; and
upon receipt of said indication, navigate to the contaminated room, operate there to purify the room, and upon completion, return to the docking station;
wherein said mobile air purifier comprises:
an inlet air channel;
one or more air sucking components configured to suck air from the room into said inlet channel, and to direct the air via said air channel into a perforated membrane mounted at a bio-hazards elimination reactor; and
an outlet air channel configured to receive treated air from the reactor, and to return the treated air into the room;
wherein the bio-hazards elimination reactor comprises a reservoir configured to contain a purifying aqueous alkali hydroxide/$H_2O_2$ solution;
wherein during the purifier operation said perforated membrane is positioned below a surface level of the solution such that air passing through the perforated membrane is converted into bubbles that travel through the solution and towards said outlet channel; and
wherein the air purifier further comprises a removable storage unit positioned above the reactor, said removable storage unit is configured to contain and supply alkali hydroxide, hydrogen peroxide, and water to said reactor.

20. The system according to claim 19, wherein said contamination comprises one or more chemical and biological contaminants.

21. A method of improving indoor air quality, the method comprising:
providing airflow through $CO_2$ adsorption scrubber over a first period of time to capture $CO_2$ by an adsorbent in the scrubber while reintroducing $CO_2$-depleted air from the scrubber into a room;
desorbing $CO_2$ from the adsorbent during a second period of time while guiding air laden with the desorbed $CO_2$ from the scrubber into a gas/liquid contactor charged with aqueous alkali hydroxide/$H_2O_2$, solution;
passing the $CO_2$-laden air through a perforated membrane installed in the gas/liquid contactor below the surface level of the aqueous alkali hydroxide/$H_2O_2$ solution, such that bubbles produced travel through said solution, solution; and getting treated air with reduced $CO_2$ level from said gas/liquid contactor.

22. An air purifier comprising:

a device used to move air for supplying air flow through the air purifier;

$CO_2$ adsorption scrubber;

a gas/liquid contactor located downstream of the scrubber;

an outlet pipe to release air from the air purifier to the room;

a first air flow line connecting said device to the outlet pipe, configured to direct incoming air stream to the adsorption scrubber, and outgoing air stream from the scrubber to said outlet pipe;

a second air flow line connecting said device to the outlet pipe, configured to direct incoming air stream to the gas/liquid contactor, and outgoing air stream from the gas/liquid contactor to the outlet pipe;

a third air flow line connecting said device to the outlet pipe, configured to direct incoming air stream to the adsorption scrubber, and outgoing air stream from the scrubber to the gas/liquid contactor;

an array of valves to guide the moving air through said first, second or third air flow lines; and optionally a heater positioned downstream to the adsorption scrubber.

* * * * *